US010678620B2

(12) United States Patent
Sudhaus et al.

(10) Patent No.: US 10,678,620 B2
(45) Date of Patent: Jun. 9, 2020

(54) WATCHDOG FOR MONITORING A PROCESSOR

(71) Applicant: Elmos Semiconductor AG, Dortmund (DE)

(72) Inventors: Andre Sudhaus, Dortmund (DE); Tan Subijanto, Dortmund (DE)

(73) Assignee: Elmos Semiconductor AG, Dortmund (DE)

( * ) Notice: Subject to any disclaimer, the term of this patent is extended or adjusted under 35 U.S.C. 154(b) by 0 days.

(21) Appl. No.: 16/332,278

(22) PCT Filed: Sep. 19, 2017

(86) PCT No.: PCT/EP2017/073589
§ 371 (c)(1),
(2) Date: May 15, 2019

(87) PCT Pub. No.: WO2018/050908
PCT Pub. Date: Mar. 22, 2018

(65) Prior Publication Data
US 2020/0125436 A1    Apr. 23, 2020

(30) Foreign Application Priority Data

Sep. 19, 2016   (DE) .......................... 10 2016 117 566
Sep. 19, 2016   (DE) .......................... 10 2016 117 567
(Continued)

(51) Int. Cl.
*G06F 11/00* (2006.01)
*G06F 11/07* (2006.01)
*B60R 21/01* (2006.01)

(52) U.S. Cl.
CPC ...... *G06F 11/0757* (2013.01); *G06F 11/0721* (2013.01); *B60R 21/01* (2013.01); *B60R 2021/01286* (2013.01)

(58) Field of Classification Search
CPC combination set(s) only.
See application file for complete search history.

(56) References Cited

U.S. PATENT DOCUMENTS

| 4,594,685 A | 6/1986 | Owens |
| 7,671,627 B1 | 3/2010 | Somani et al. |
(Continued)

FOREIGN PATENT DOCUMENTS

| DE | 4234910 A1 | 4/1994 |
| DE | 10056408 C1 | 3/2002 |
(Continued)

OTHER PUBLICATIONS

International Search Report and Written Opinion for PCT/EP2017/073589 dated Dec. 19, 2017 (21 pages; with English translation).

*Primary Examiner* — Charles Ehne
(74) *Attorney, Agent, or Firm* — Bejin Bieneman PLC

(57) ABSTRACT

The disclosure relates to a watchdog for monitoring a processor. The watchdog sends messages to the processor which subsequently sends back its own status information and optionally the status information of system components and the test results thereof at predetermined times as answers to the watchdog. The watchdog comprises at least one result memory in the form of, e.g., a shift register in which the watchdog records the history of the answers and examines patterns in erroneous answers. The recording is generated by a trigger event which can be the reception of individual answers and/or the end of scheduled reception time periods. According to the patterns, signalizations are carried out on the processor and/or other system components, which optionally introduce measures and adapt their structure and/or the implemented programs and/or the priority of said implementations.

40 Claims, 9 Drawing Sheets

(30) Foreign Application Priority Data

Sep. 19, 2016 (DE) .......................... 10 2016 117 568
Sep. 19, 2016 (DE) .......................... 10 2016 117 569
Sep. 19, 2016 (DE) .......................... 10 2016 117 571

(56) References Cited

U.S. PATENT DOCUMENTS

2013/0067287 A1* 3/2013 Yoshikawa ......... G06F 11/0757
                                                     714/47.1
2016/0077799 A1* 3/2016 Matsui ................ G06F 11/0745
                                                     714/56

FOREIGN PATENT DOCUMENTS

| DE | 102004009359 A1 | 9/2004 |
| DE | 102006028992 B4 | 11/2012 |
| EP | 0174540 A2 | 3/1986 |
| WO | 2011072662 A1 | 6/2011 |

\* cited by examiner

WATCHDOG FOR MONITORING A PROCESSOR

CROSS-REFERENCE TO RELATED APPLICATIONS

This application is a national stage of, and claims priority to, Patent Cooperation Treaty Application No. PCT/EP2017/073589, filed on Sep. 19, 2017, which application claims priority to German patent applications 10 2016 117 566.8 of 19 Sep. 2016, 10 2016 117 567.6 of 19 Sep. 2017, 10 2016 117 569.2 of 19 Sep. 2016, 10 2016 117 571.4 of 19 Sep. 2017 and 10 2016 117 568.4 of 19 Sep. 2017, which applications are hereby incorporated herein by reference in their entireties.

The disclosure relates to a watchdog for monitoring a processor. The watchdog evaluates answers of a processor and in doing so takes into consideration the historic development of these answers, more specifically in particular by recognising patterns. In particular, the disclosure relates to methods for monitoring a processor by means of a watchdog, in particular with pattern recognition for recurring load situations, wherein the method is controlled either on the basis of an answer-reception model or on the basis of an answer-reception time period model.

GENERAL INTRODUCTION

In the use of processors for controlling safety-relevant devices in vehicles (for example an airbag), the monitoring of the correct program sequence is of key importance for the safety of the applications in question. In this regard, numerous publications can be found under the keyword "watchdog". The objective of a watchdog is to evaluate the temporal behaviour of the processor on the basis of characteristics and signalization and to prompt the processor as necessary, by sending back suitable signals, to take countermeasures if its behaviour deviates from what is expected.

PRIOR ART

A watchdog of this kind is known from DE-C-10 056 408. This device is used to monitor a processor, wherein the watchdog transmits an error message to the processor in the event of at least one identified error and increments an error counter.

This mere incrementation has the disadvantage that it, in itself, is suitable only for systems that must never display an error. More complex systems, however, require a load control. Thus, an upward/downward counter is often used. This, however, has the disadvantage that the counter acts in an integrating manner and thus similarly to a low-pass filter in the case of fluctuating, but nevertheless poor results. Such fluctuating results are present for example if successive examination results are repeatedly sometimes good and sometimes poor.

Further watchdog concepts are described in DE-B-10 2006 028 992, DE-A-10 2004 009 359, DE-A-42 34 910 and U.S. Pat. No. 4,594,685.

Problem Addressed by the Disclosure

The problem addressed by of the disclosure is therefore to create a solution that does not have the above disadvantages of the prior art and has further advantages. This problem is solved by systems and methods as disclosed below.

Solution to the Problem According to the Disclosure

The disclosure relates to a method for monitoring a processor (PC). It typically comprises a watchdog (WDG) comprising a clock generator (CTR) as part of this watchdog (WDG). The processor (PC) should be connectable to the watchdog (WDG) for monitoring. The clock generator defines a scheduled reception time period (b) in which the watchdog (WDG) expects predeterminable answers (ANS) from the processor (PC) to questions directed from the watchdog (WDG) the processor (PC). In contrast to the prior art, the method according to the disclosure now comprises a result memory (ES) in the Watchdog (WDG) as part thereof, which result memory is preferably formed as a shift register (SR). This result memory now preferably comprises n result memory cells, or in the case of the shift register (SR) n shift register cells. Here, n is a positive integral number larger than 1. The shift register cells may be storage cells which for example can store only one bit per result memory cell or shift register cell. However, more information items are preferably stored in a result memory cell or shift register cell. A result memory cell or shift register cell thus stores a data structure which in the simplest case may be an individual bit per result memory cell or shift register cell and in other cases may comprise more complex data structures. Not all information portions of the information items stored in these data structures must always be used. However, it is important that in the data structure of the result memory cell or shift register cell there is always a memory space provided for a first information portion, the function of which will be explained later. In the n result memory cells or n shift register cells of the result memory (ES) or the shift register (SR), there are now n buffered information items ($Inf_1$ to $Inf_n$). These n buffered information items ($Inf_1$ to $Inf_n$) each have the aforementioned data structure and each comprise at least the said first information portion. These n buffered information items ($Inf_1$ to $Inf_n$) are stored in the result memory (ES) or the shift register (SR). The n result memory cells or n shift register cells of the result memory (ES) or the shift register (SR), and therefore also the n buffered information items ($Inf_1$ to $Inf_n$) stored therein, can now be continuously numbered from 1 to n. Each of the n buffered information items ($Inf_1$ to $Inf_n$) thus obtains a unique result memory position from n possible result memory positions, which are continuously numbered from 1 to n, or a unique shift register position from n shift register positions, which are continuously numbered from 1 to n. As already described, each of the n buffered information items ($Inf_1$ to $Inf_n$) comprises at least one first information portion and in the case of more complex data structures may comprise further information portions as appropriate. The watchdog comprises first stimulating means (QSTM), which can be used to transmit messages (MSG) from the watchdog (WDG) to the processor (PC). First stimulating means (QSTM) as used herein refers to a portion of the watchdog, which may include hardware such as electronic circuitry, one or more processors, and/or instructions stored in programming memory (software) for the processor and or circuitry. For example, the stimulating means can be simple lines, which can be laid at different potentials, or can be a complex serial bus system. The watchdog (WDG) evaluates answers (ANS) of the processor (PC) to the watchdog (WDG) to its questions to the processor (PC) with the aid of first evaluation means (AVAL), which are preferably part of the watchdog (WDG) and may include hardware such as electronic circuitry, one or more processors, and/or instructions stored in programming memory (software) for the processor and or circuitry. The watchdog (WG) transmits messages (MSG) the processor (PC) which can relate both to the processor (PC) itself, parts thereof, and further system components (SC). The processor (PC), the relevant parts of the processor (PC) and/or the further system components subsequently performed for example predeterminable tests with expected results. In simple cases, the tests may concern, for example, the determination of program counter states or the like. The processor (PC) then transmits its result to the watchdog (WG). This result is thus dependent on at least one previously received message (MSG). It is also conceivable that a plurality of messages (MSG) determine the content of the answer (ANS) of the processor (PC) to the watchdog (WG) or that a plurality of answers (ANS) are transmitted to the watchdog (WDG) on account of one or more received messages (MSG). When the answers (ANS) are transmitted by the processor (PC) however, the messages (MSG) determine not only the content, but also the time. The answers (ANS) are expected by the watchdog (WG) in a reception time period (b) scheduled therefor. By contrast, there is also a time period (a) or time in which or at which no reception of answers (ANS) is scheduled. This time period (a) preferably alternates cyclically with the scheduled reception time period (b). In addition, times/time periods (c) at which or in which there is no evaluation of answers are also conceivable. Here, "cyclically" does not mean that the temporal length of these time periods in their totality or individually always has to be the same. Rather, it may vary. The order of the time periods (a, b, c) may also vary. A cycle comprises at least one of the time periods (a, b, c). If the watchdog (WG) now receives an answer (ANS) from the processor (PC), the watchdog (WG) assesses the answer (ANS) of the processor (PC) as "correct" or "not correct" by means of the first evaluation means (AVAL). An answer (ANS) is then "correct" if the content thereof is correct, i.e. corresponds to an element or permitted amount of contents which can be precalculated or is calculated in advance. At the same time, for the evaluation as "correct" by the first evaluation means (AVAL), the answer (ANS) must be received by the watchdog (WDG) within the reception time period (b) predetermined for this answer (ANS). On the other hand, the first evaluation means (AVAL) of the watchdog (WG) assess the answer (ANS) as "not correct" if the content of the answer (ANS) is "not correct", i.e. if the content thereof does not correspond to an element of the permitted amount of contents, calculated in advance, at the reception time period. Preset expectation time periods (b) can thus be provided, which are dependent on the expected answer (ANS) and which may also overlap as appropriate. The first evaluation means (AVAL) of the watchdog (WDG) likewise assess the answer (ANS) as "not correct" if the answer (ANS) is not received by the watchdog (WDG) within the reception time period (b) predetermined for this answer (ANS), but in a time period (a) in which no reception of answers (ANS) is scheduled.

If the result memory (ES) is, for example, a shift register (SR), the n-th buffered information item ($Inf_n$) is deleted from the shift register (SR) with each reception of an answer (ANS) of the processor (PC) (in a first example of the disclosure) or temporally after the reception of an answer (ANS) by the watchdog (WDG) or temporally at the end of the scheduled reception time period (b) (in a second example of the disclosure), and each of the (n−1) buffered information items is shifted from the j-th shift register position ($p_j$, with $1 \leq j \leq (n-1)$) to the (j+1)-th shift register position ($p_j$, with $2 \leq j \leq n$). The first shift register position ($p_1$) that has then become free then fills the shift register (SR) at least with the result of the evaluation of the received answer (ANS) by the processor (PC) as new first information portion of the new 1-th buffered information item ($Inf_1$). This first information portion of the 1-th buffered information item ($Inf_1$) then corresponds to the logical value "correct" or "not correct" depending on the results of the previous evaluation.

However, there may also be a more general form of a result memory (ES). The result memory (ES) deletes at least one buffered information item (e.g. $Inf_n$) from a result memory cell of the result memory (ES) temporally after each reception of an answer (ANS) of the processor (PC) by the watchdog (WDG) or temporally at the end of the scheduled reception time period (b). At the same time or in conjunction therewith, the result memory (ES) shifts the remaining (n−1) not-deleted, buffered information items from the originally assigned logical result memory positions to other logical result memory positions. This can be implemented on the one hand by real displacement of the information data into other physical result memory cells of the result memory, or much more simply by reallocation of the logical result memory positions to the physical result memory positions and therefore to the result memory cells. In the simplest case just one write pointer is used, which defines which of the result memory cells is to be deleted next. One of the result memory cells then contains only the deletion value. The new information item (e.g. $Inf_1$) is then written into this result memory cell. This write process at the same time can represent the deletion process of the previous information item of this result memory cell. At least the first information portion of the information item is defined in the relevant result memory cell. Preferably, at least the result of the evaluation of the received answer (ANS) by the processor (PC) in correspondence to a logical value for "correct" or for "not correct" is used at least as new first portion of the new buffered information item (e.g. $Inf_1$) at the relevant result memory position into which none of the remaining (n−1) buffered information items has been shifted.

The watchdog according to the disclosure thus performs a method for monitoring a processor (PC). A clock generator (CTR) presets a scheduled reception time period (b) for an answer (ANS) of the processor (PC) to the watchdog (WDG). The watchdog (WDG) transmits one or more messages (MSG) to the processor (PC) with contents that they relate to the processor (PC) itself, parts thereof and/or further system components (SC). The processor responds to the message (MSG) or the messages (MSG) depending on at least the content of one of these messages (MSG) in the form of at least said answer (ANS) to the watchdog (WDG). The watchdog assesses at least one answer (ANS) of the processor (PC) is "correct" or "not correct" the purpose of generating an evaluation result.

In the method the content of the result memory (ES) is now modified temporally after the receipt of an answer (ANS) by the watchdog (WDG) or temporally at the end of the scheduled reception time period (b). As previously explained, the result memory (ES) has n result memory cells with n buffered information items ($Inf_1$ to $Inf_n$). Here, n is again an integral number larger than 1. Each result memory cell has a unique logical result memory position and an assigned unique physical result memory position, which do not have to be identical.

The content of the result memory (ES) is modified here by deleting at least one buffered information item ($Inf_k$) of the n buffered information items ($Inf_1$ to $Inf_n$) in an allocated result memory cell (here, for example, the k-th result memory cell). Furthermore, at least one logical result memory position of at least one buffered information item ($Inf_j$) of the n buffered information items ($Inf_1$ to $Inf_n$) in the result memory (ES) is changed. This can be implemented by real displacement of the at least one buffered information item ($Inf_j$) within the result memory (ES) also by modifying the addressing. In the last case, the contents are not shifted, but instead the logical result memory positions allocated to the result memory cells and therefore the buffered information items ($Inf_1$ to $Inf_n$) are modified. The results of the evaluation of the at least one received answer (ANS) is then stored and used by the watchdog (WDG) as new first information portion of a new buffered information item ($Inf_1$) in the result memory. As a simple case, a write pointer which always points to a result memory position can be considered. Temporally after the receipt of an answer (ANS) by the watchdog (WDG) or temporally at the end of the scheduled reception time period (b) or temporally after the receipt of an individual answer (ANS), the watchdog (WDG) overwrites the first information portion of the buffered information item ($Inf_k$) at the corresponding result memory position with the result of the evaluation of the at least one received answer (ANS) and jumps with the write pointer to the predetermined next result memory cell. The reception of an answer (ANS) by the watchdog (WDG) or the receipt of each answer (ANS) by the watchdog (WDG) or the end of the scheduled reception time period (b) thus represent a trigger event for the result memory (ES). The algorithm for calculating the next write pointer position of the next result memory cell of the result memory (ES) is designed here preferably such that the write pointer will have shown the result memory positions preferably of all result memory cells of the result memory once, before there is any repetition of the write pointer positioning.

In accordance with a first aspect of the disclosure an evaluation is made per response of the processor (PC) to a message of the watchdog (WDG) and is stored in the result memory. Here, a reaction can mean an answer or the absence of an answer.

In accordance with a second aspect of the disclosure an evaluation is made only once a preset reaction time period has elapsed, within which a plurality of reactions (i.e. for example answers or the absence of answers) are expected on the part of the processor (PC) to one or more messages of the watchdog (WDG)).

In both cases an expected reaction may consist of an answer or the absence of an answer. If the expectation is not satisfied, this can be considered to constitute an error (for example overload of the processor (PC)), however this does not necessarily have to lead to an error message; rather, this is dependent on the evaluation of the error or the constellation of recent errors (history).

The difference between both variants of the disclosure thus lies in the number of reactions of the processor (PC) involved in the evaluation of the watchdog (WDG). In the first case a reaction (answer or absence of the answer) is thus expected for each preset reception time period, and in the second case at least two reactions are expected by the processor to one or more messages (MSG) of the watchdog (WDG) to the processor (PC) as applicable. The evaluation in both cases is dependent, amongst other things, on whether the expected reaction is correct in terms of content and/or time.

Where reference is made above and hereinafter to an "answer" of the processor (PC), a reaction of the processor (PC) to a message of the watchdog (WDG) is or can be meant hereby, wherein the reaction can consist of an answer or the absence of an answer.

The storing of the evaluations in the result memory (ES) can consist of a successive "pushing through" of the evaluation results sequence, i.e. a shifting of evaluation result data or a shifting of pointers which point to the evaluation result data stored on the result memory (ES), wherein the storage space for this evaluation result data remains unchanged or is variable.

Advantage of the Disclosure

In contrast to the prior art, in accordance with the disclosure the evaluation results within the watchdog are not used immediately, but are stored. A watchdog of this kind makes it possible, at least in some examples, for these stored evaluations of the answers (ANS) to be used as a basis for further decisions. Fluctuating results can therefore be identified and used for corresponding warnings. The advantages, however, are not limited to this.

DESCRIPTION OF EXAMPLES

The disclosure relates to a watchdog for monitoring a processor (PC). The watchdog (WDG) sends messages (MSG) to the processor (PC), which then sends back to the watchdog (WDG), as answers (ANS) at predetermined times, status information pertaining to itself and possibly pertaining to system components (SC) and test results thereof. The watchdog (WDG) comprises at least one result memory (ES) in the form for example of a shift register (SR), in which the watchdog (WDG) records the history of the answers (ANS) and examines patterns in erroneous answers. The recording is prompted by a trigger event, which may be the reception of individual answers and/or the end of scheduled reception time periods. According to the patterns, signalizations are carried out on the processor and/or other system components, which optionally introduce measures and adapt their structure and/or the implemented programs and/or the priority of these implementations, etc.

In a first example of the disclosure the device according to the disclosure is provided with an additional second evaluation means (VAL) as part of the watchdog (WDG) and which may include hardware such as electronic circuitry, one or more processors, and/or instructions stored in programming memory (software) for the processor and or circuitry, and which is used to evaluate the buffered information ($Inf_1$ to $Inf_n$) of the shift register (SR). This second evaluation means (VAL) can generate at least one control signal (RES) depending on the content of the result memory (ES) or the shift register (SR), and said control signal can change the state of the processor (PC). For example, it is conceivable that various reset signals or interrupt signals are activated by the second evaluation means (VAL) depending on the identified pattern or number of "not correct" information items located in the result memory (ES) or in the shift register (SR), which signals have different effects on the processor (PC), program sequence thereof, parts thereof, or other system components (SC). It is sufficient if at least one such control signal (RES) can be generated from output signals of the second evaluation means (VAL).

This has the advantage that, even with fluctuating evaluation results, more complex situations can be identified and, depending on the situation, the processor (PC), and parts thereof or other system components (SC) can be prompted to perform a different program sequence or different measures by specific signalizations (RES). A situation identification of this kind is not known in the prior art.

In a further example of the disclosure the watchdog (WDG), by means of the first evaluation means (AVAL), assesses the answer (ANS) of the processor (PC) as "correct" or "not correct". This is generally an individual bit, which assumes the values zero or one, or is a line, which assumes a first potential or a second potential. Other examples are conceivable. This further example of the disclosure is characterized in that an answer (ANS) is assessed by the watchdog (WDG) as "correct" if the number of answers (ANS) received by the watchdog (WDG) within the predetermined reception time period (b) does not exceed, due to the answer (ANS) now received, a predetermined maximal number of to-be-received answers (ANS) or, at the end of the predetermined reception time period (b) the number of received answers (ANS) does not fall short of a predetermined minimal number of to-be-received answers (ANS). An answer (ANS) is additionally "not correct" if the number of answers (ANS) received by the watchdog (WTD) within the predetermined reception time period (b), due to the received answer (ANS), exceeds a predetermined maximal number of to-be-received answers (ANS) or the maximal expected number of answers, or at the end of the predetermined reception time period (b) falls short of a minimal number of to-be-received answers (ANS), predetermined at least for this predetermined reception time period (b), or the minimal expected number of answers.

This evaluation of the number of answers or of the answers themselves in the predetermined reception time period (b) enables further evaluations and accordingly more flexible reactions of the system.

In a further example of the disclosure the evaluation of the answer (ANS) of the processor (PC) by the first evaluation means (AVAL) of the watchdog (WDG) is preferably additionally depending on at least one, a plurality of, or all buffered information items $(Inf_j)$ of the n buffered information items $(Inf_j$ to $Inf_n)$ of the shift register (SR). This means that not only is the content of the answers (ANS) of the processor (PC) and time thereof in relation to the predetermined reception time period (b) evaluated, but that this data is also set in relation to the answers (ANS) already obtained. This has the advantage that for example the type of previously implemented measures can be stored in the result memory (ES) or the shift register as content of further information portions of the respective information items $(Inf_1$ to $Inf_n)$. For example, it may be that the measures themselves worsen the situation in the short-term as a result of additional efforts, before the desired "improvement" of the loading situation is identified. It may therefore be that answers that should actually be assessed as "not correct" can be assessed as "correct" as a result of the previously implemented measures, since this is what is expected.

In a further example of the disclosure the further evaluation means (VAL) are operative, depending on at least one buffered information item $(Inf_j)$ of the n buffered information items $(Inf_1$ to $Inf_n)$ of the shift register (SR) of the result memory (ES) or of the shift register (SR), to generate additionally at least one further evaluation. In this further example of the disclosure this further evaluation is likewise stored as further information portion of an information item in a memory cell of the result memory (ES) or of the shift register (SR). At least one buffered information item $(Inf_j)$ of the buffered information items $(Inf_j$ to $Inf_n)$ of the result memory (ES) or of the shift register (SR) thus comprises a buffered further evaluation of the second evaluation means (VAL) in addition to the various evaluations of the answers (ANS) of the processor (PC) by the first evaluation means (AVAL), which is stored in the first information portion of the corresponding buffered information item $(Inf_j)$ of the buffered n information items $(Inf_j$ to $Inf_n)$ of the result memory (ES).

In a further example of the disclosure the second evaluation means (VAL) is operative, depending on the occurrence of predetermined patterns among at least respectively one information portion of at least two different buffered information items $(Inf_j, Inf_k,$ with $1 \le j \le n$ and $1 \le k \le n$ and $j \ne k$)) of the buffered information items $(Inf_1$ to $Inf_n)$ of the result memory (ES) or the shift register, to generate additionally at least one second further evaluation. All information items $(Inf_1$ to $Inf_n)$ of the result memory (ES) or of the shift register (SR) are very particularly preferably included in an evaluation of this kind.

In a particularly preferred example of the disclosure the result memory is deleted at the end of the predetermined reception time period (b). Here, "deleted" can mean for example that, at the end of the predetermined reception time period (b), the first information portions of the buffered information items $(Inf_1$ to $Inf_n)$ of the shift register (SR) are set to a value corresponding to "not correct". However, "deleted" can also mean that instead, at the end of the predetermined reception time period (b), the first information portions of the buffered information items $(Inf_1$ to $Inf_n)$ of the shift register (SR) are set to a value corresponding to "correct". This is advantageous in particular when the device is embodied in two stages, as explained hereinafter.

In a further example of the disclosure the principle according to the disclosure is applied in multiple stages. Additional second evaluation means (VAL), which are part of the watchdog (WDG), evaluate the buffered information items $(Inf_1$ to $Inf_n)$ in the result memory (ES) or in the shift register (SR) as described previously. The evaluation results thus obtained, however, are now stored in at least one further result memory $(ES_B)$ or at least one further shift register $(SR_B)$. These are additionally now likewise part of the watchdog (WDG). The further result memory (ERB) consists of m (further) result memory cells, or the further shift register $(SR_B)$ consists of m (further) shift register cells. Here, m is a positive integral number larger than 1. There are m further buffered information items $(Inf_{1B}$ to $Inf_{mB})$ located in these further result memory cells or further shift register cells. The further logical and physical result memory positions or further logical and physical shift register positions that are associated with these m further results memory cells or further shift register cells can be continuously numbered from 1 to m. The m further buffered information items $(Inf_{1B}$ to $Inf_{mB})$ contained therein can thus also be continuously numbered from 1 to m accordingly. A unique logical and a unique physical result memory position from m result memory positions or a unique logical and a unique physical shift register position from m shift register positions, which are continuously numbered biuniquely from 1 to m, is thus then associated with each of the m further buffered information items $(Inf_{1B}$ to $Inf_{mB})$. As before, each of the m further buffered information items $(Inf_{1B}$ to $Inf_{mB})$ here as well again comprises at least a first information portion. As before in the one-stage solution, each of the m further buffered information items $(Inf_{1B}$ to $Inf_{mB})$ can comprise, as appropriate, further information portions pertaining to this first information portion. Here as well these are thus typically, but not necessarily, more complex data structures. In the simplest case it is a bit.

Further second evaluation means $(VAL_B)$, which are likewise preferably part of the watchdog (WDG) and which may include hardware such as electronic circuitry, one or more processors, and/or instructions stored in programming memory (software) for the processor and or circuitry, now evaluate these further buffered information items ($Inf_{1_B}$ to $Inf_{m_B}$) of the further result memory ($ES_B$) or the further shift register ($SR_B$). If the further reception memory ($ES_B$) for example is a further shift register ($SR_B$), the further shift register ($SR_B$) deletes the m-th further buffered information item ($Inf_{m_B}$) from the further shift register ($SR_B$) with each reception of an answer (ANS) of the processor (PC) (in a first fundamental example of this variant of the disclosure) or temporally after the reception of an answer (ANS) by the watchdog (WDG) or temporally at the end of the scheduled reception time period (b) (in a second fundamental example of the disclosure), and shifts each of the (m−1) further buffered information items from the j-th further shift register position ($p_{j_B}$, with $1 \leq j \leq (m-1)$) to the (j+1)-th shift register position ($p_{j_B}$, with $2 \leq j \leq n$). The first further shift register position that has then become free then fills the shift register ($SR_B$) at least with said evaluation result of the further evaluation of the n information items ($Inf_1$ to $Inf_n$) of the first result memory (ES) or the first shift register (SR) by the second evaluation means (VAL) as new first information portion of the new 1-th further buffered information item ($Inf_{1_B}$). This first information portion of the 1-th further buffered information item ($Inf_{1_B}$) then corresponds again to the logical value "correct" or "not correct" depending on the results of the previous evaluation of the n information items ($Inf_1$ to $Inf_n$) of the first result memory (ES) or the first shift register (SR) by second evaluation means (VAL).

However, it may also be a more general form of a further result memory ($ES_B$). The further result memory ($ES_B$) deletes at least one further buffered information item (e.g. $Inf_{m_B}$) from the further result memory ($ES_B$) temporally after each reception of an answer (ANS) of the processor (PC) by the watchdog (WDG) or temporally at the end of the scheduled reception time period (b). At the same time or in conjunction therewith, the further result memory ($ES_B$) shifts the remaining (m−1) non-deleted further buffered information items from the original associated logical further result memory positions within the further result memory ($ES_B$) to other logical further result memory positions. This can be implemented on the one hand by real displacement of the information data into other physical further result memory cells, or much more simply by reallocation of the logical further result memory positions to the further physical result memory positions and therefore to the further result memory cells. In the simplest case just one write pointer is used, which defines which of the further result memory cells is to be deleted next and overwritten. One of the further result memory cells then contains only the deleted value. The new further information item ($Inf_{1_B}$) is then written into this further result memory cell. This writing process can at the same time represent the deletion process of the previous information of this further result memory cell. The first information portion of the further information item is at least defined in the relevant further result memory cell. At least the result of the evaluation of the n information items ($Inf_1$ to $Inf_n$) of the first result memory (ES) or the first shift register (SR) in correspondence to a logical value for "correct" or for "not correct" is then preferably used at least as a new first portion of the new buffered further information item (e.g. $Inf_{1_B}$) at the relevant further result memory position into which none of the remaining (m−1) buffered further information items has been shifted.

at least the result of the evaluation of the received answer (ANS) by the processor (PC) in correspondence to a logical value for "correct" or for "not correct" is used at least as new first portion of the new buffered information item (e.g. $Inf_1$) at the relevant result memory position into which none of the remaining (n−1) buffered information items has been shifted The further second evaluation means ($VAL_B$), depending on these further buffered information items ($Inf_{j_B}$) of the m further buffered information items ($Inf_{1_B}$ to $Inf_{m_B}$) of the further result memory ($ES_B$) or of the further shift register ($SR_B$), now generate the control signal (RES), which likewise can change the state of the processor (PC), instead of the second evaluation means (VAL), which in a further variant likewise can generate a control signal (RES), or parallel thereto.

LIST OF THE DRAWINGS

The disclosure will be described hereinafter on the basis of examples and the drawings. The drawings specifically show:

FIG. 1 a rough, simplified schema of the cooperation of individual components provided in accordance with the disclosure, FIG. 2 the schema according to FIG. 1 with a shift register (SR) as result memory (ES), FIG. 3 a two-stage evaluation process, FIG. 4 a two-stage evaluation process according to FIG. 3, wherein the first result memory (ES) is a shift register (SR) and the further result memory (ESB) is a further shift register (SRB), FIGS. 5 to 7 schematically an exemplary, successive temporal behaviour of an exemplary one-step solution with a shift register (SR) corresponding to FIG. 2, FIG. 8 an exemplary two-step method corresponding to FIG. 4 and FIG. 9 a two-step method according to FIG. 2, wherein the pattern of the information stored in the shift register (SR) is evaluated.

Figure 1:
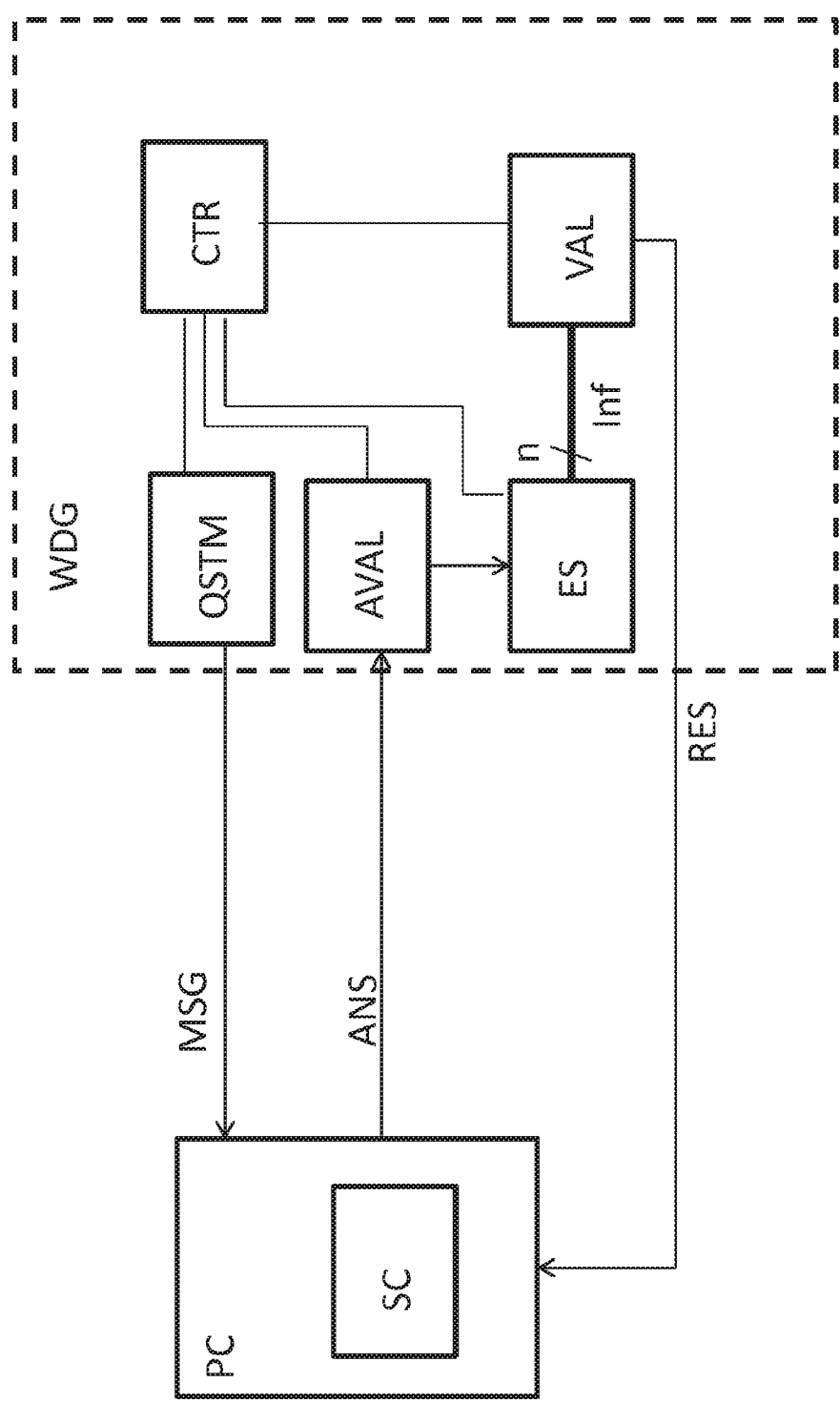
FIG. 1 shows a basic simplified schema of the cooperation of the individual components of the device according to the disclosure. The watchdog (WDG) comprises a stimulating means (QSTM), first evaluation means (AVAL), an internal clock generator (CTR), a first result memory (ES), and second evaluation means (VAL). The processor (PC) here comprises the further system components (SC). The first stimulating means (QSTM) send messages (MSG) from the watchdog (WDG) to the processor (PC), which then answers these with answers (ANS) at correct times and with expected contents and in the correct number, which can be checked by the watchdog (WDG). This check is performed by the first evaluation means (AVAL). The first evaluation means (AVAL) evaluate the answers (ANS) of the processor (PC) to the watchdog (WDG) prompted by said messages (MSG) which the first stimulating means (QSTM) sent from the watchdog (WDG) to the processor (PC) and which the processor should have answered with the aforesaid answers (ANS) at correct times and with expected contents and in the correct number, which can then be checked in turn by the first evaluation means (AVAL) of the watchdog (WDG). These evaluation results of the first evaluation means (AVAL) are buffered in the result memory (ES), which contains the history of these evaluations. The result memory (ES) consists of result memory cells. Each result memory cell of the result memory (ES) is continuously numbered by a number from 1 to n. This means that each result memory cell on the one hand has a real physical result memory cell position and on the other hand has a logical result memory cell position which must not be identical to the real physical result memory cell position. The result memory can be embodied as a shift register (SR). The result memory (ES) deletes preferably at least one buffered information item (e.g. $\text{Inf}_n$) from the result memory (ES) temporally after each reception of an answer (ANS) of the processor (PC) by the watchdog (WDG) or after the reception of individual answers (ANS) or temporally at the end of the scheduled reception time period (b). At the same time or in conjunction therewith, the result memory (ES) shifts the remaining (n−1) not-deleted, buffered information items from the originally assigned logical result memory positions to other logical result memory positions. This can be implemented on the one hand by real displacement of the information data into other physical result memory cells, or much more simply by reallocation of the logical result memory positions to the physical result memory positions and therefore to the result memory cells. In the simplest case just one write pointer is used, which defines which of the result memory cells is to be deleted next and the repositioned in accordance with a predeterminable schema. One of the result memory cells then contains only the deletion value. The new information item ($\text{Inf}_1$) to be buffered is then written into this result memory cell. This write process at the same time can represent the deletion process of the previous information item of this result memory cell. At least the first information portion of the information item is defined in the relevant result memory cell. At least the result of the evaluation of the received answer (ANS) by the first evaluation means (AVAL) is used at least as new first portion of the new buffered information item (e.g. $\text{Inf}_1$) at the relevant logical result memory position into which none of the remaining (n−1) buffered information items has been shifted. Depending on whether this result was evaluated by the first evaluation means (AVAL) in correspondence with a logical value "correct" or "not correct", the associated result memory cell then contains the associated logical value. These information items ($\text{Inf}_1$ to $\text{Inf}_n$) thus buffered are evaluated in the example of FIG. 1 by second evaluation means (VAL). It evaluates the information items ($\text{Inf}_1$ to $\text{Inf}_n$) buffered in the result memory (ES) or in the shift register (SR). Here, the second evaluation means (VAL) may also generate more than just one evaluation as appropriate. The second evaluation means (VAL) for example can define the number of "correct" information items in result memory cells of the result memory (ES) and can compare these with a threshold value. If the determined number lies below the threshold value, the control signal (RES) or another corresponding signal for example can be set by second evaluation means (VAL) for influencing the processor (PC) or parts thereof or other system components (SC). Further signals in the form of further evaluations can also be generated by the second evaluation means (VAL), which for example correspond to specific patterns in the result memory cells of the result memory (ES). The clock generator (CTR) generates the time signals for all relevant blocks (QSTM, AVAL, SR, VAL) of the watchdog (WDG). In particular, the clock generator (CTR) preferably defines the time of sending of the messages (MSG) to the processor (PC) by the watchdog (WDG) and the time position and duration of the scheduled reception time periods (b) for the answers (ANS) of the processor (PC) to these messages (MSG). The clock generator (CTR) thus arranges, preferably in cooperation with the first evaluation means (AVAL), which receive the messages (MSG) of the processor (PC), for the result memory (ES) to change the result memory positions of the buffered information items to the correct times as predetermined and to delete the correct result memory cell and to write the new evaluation result of the first evaluation means (AVAL) into the correct result memory position at the correct time.
Figure 3:
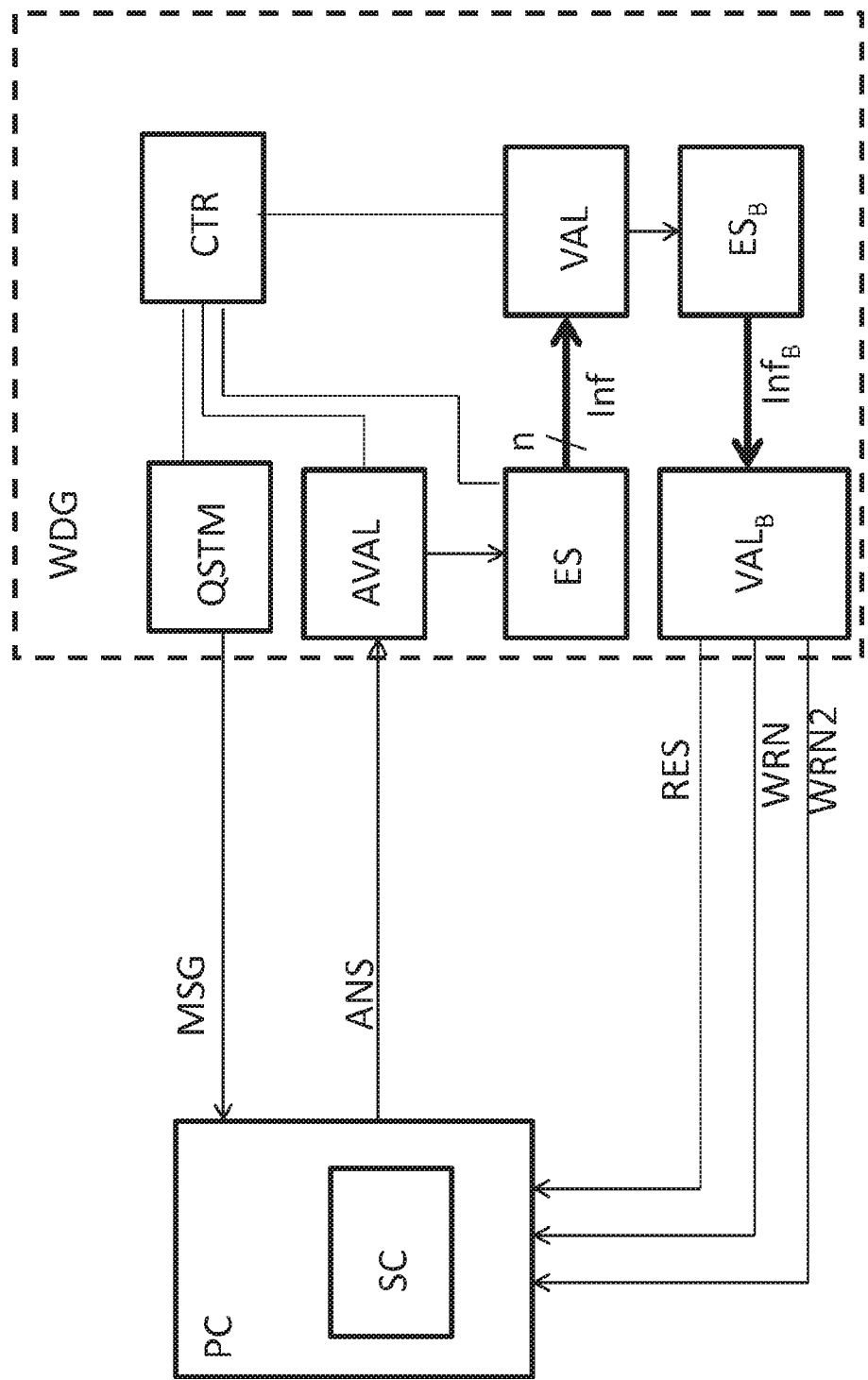
FIG. 3 shows a two-stage device according to the disclosure. It again shows a basic simplified schema of the cooperation of the individual components of the device according to the disclosure. The watchdog (WDG) again comprises first stimulating means (QSTM), first evaluation means (AVAL), an internal clock generator (CTR), a first result memory (ES), second evaluation means (VAL), a further result memory ($\text{ES}_B$) and further second evaluation means ($\text{VAL}_B$). The processor (PC) here comprises, again, the further system components (SC). The first stimulating means (QSTM) send messages (MSG) from the watchdog (WDG) to the processor (PC), which then answers these with answers (ANS) at correct times and with expected contents and in the correct number, which can be checked by the watchdog (WDG). This check is performed, again, by the first evaluation means (AVAL). The first evaluation means (AVAL) evaluate the answers (ANS) of the processor (PC) to the watchdog (WDG) prompted by said messages (MSG) which the first stimulating means (QSTM) sent from the watchdog (WDG) to the processor (PC) and which the processor should have answered with the aforesaid answers (ANS) at correct times and with expected contents and in the correct number to answers (ANS), which can then be checked in turn by the first evaluation means (AVAL) of the watchdog (WDG). These evaluation results of the first evaluation means (AVAL) are buffered in the first result memory (ES), which contains the history of these evaluations. The result memory (ES) consists, again, of result memory cells. Each result memory cell of the result memory (ES) is continuously numbered by a number from 1 to n. This means that each result memory cell on the one hand has a real physical result memory cell position and on the other hand has a logical result memory cell position which must not be identical to the real physical result memory cell position. The first result memory (ES) can be embodied as a shift register (SR). The first result memory (ES) deletes preferably at least one buffered information item (e.g. $\text{Inf}_n$) from the result memory (ES) temporally after each reception of an answer (ANS) of the processor (PC) by the watchdog (WDG) or after the reception of an answer (ANS) or temporally at the end of the scheduled reception time period (b). At the same time or in conjunction therewith, the first result memory (ES) shifts the remaining (n−1) not-deleted, buffered information items from the originally assigned logical result memory positions to other logical result memory positions of the first result memory (ES). This can be implemented on the one hand by real displacement of the information data into other physical result memory cells of the first result memory (ES), or much more simply by reallocation of the logical result memory positions to the result memory cells of the first result memory (ES). In the simplest case just one first write pointer is used for the first result memory (ES), which defines which of the result memory cells of the first result memory (ES) is to be deleted next. One of the result memory cells of the first result memory (ES) then contains only the deletion value. The new information item ($\text{Inf}_1$) to be buffered is then written into this result memory cell of the first result memory (ES). This write process at the same time can represent the deletion process of the previous information item of this result memory cell of the first result memory (ES). At least the first information portion of the information item is defined in the relevant result memory cell of the first result memory (ES). At least the result of the evaluation of the received answer (ANS) by the first evaluation means (AVAL) is used at least as new first portion of the new buffered information item (e.g. $Inf_1$) at the relevant logical result memory position of the first result memory (ES) into which none of the remaining (n−1) buffered information items has been shifted. Depending on whether this result was evaluated in correspondence with a logical value "correct" or "not correct", the associated result memory cell of the first result memory (ES) then contains the associated logical value. The information items ($Inf_1$ to $Inf_n$) thus buffered are evaluate in the example of FIG. 3 by second evaluation means (VAL). They evaluate the information items ($Inf_1$ to $Inf_n$) buffered in the first result memory (ES) or in the first shift register (SR) that reflect the last evaluation results. Here, the second evaluation means (VAL) may also generate more than just one further evaluation as appropriate. This second evaluation means (VAL) for example within the scope of the evaluation of the content of the first result memory (ES) or the first shift register (SR) can define for example the number of "correct" information items in the result memory cells of the result memory (ES) and can compare these with a first threshold value. If this number thus determined lies below the first threshold value, the result is for example assessed as "correct" in correspondence with a logical value and in the other case is assessed as "not correct" in correspondence with a logical value.

These evaluation results of the second evaluation means (VAL) are now likewise buffered in a further result memory ($ES_B$) in contrast to FIG. 1. This stores the history of these evaluations. The further result memory ($ES_B$) consists of result memory cells, similarly to the first result memory (ES). Each further result memory cell of the further result memory ($ES_B$) is continuously numbered by a number from 1 to m. This means that each further result memory cell on the one hand has a real physical further result memory cell position and on the other hand has a logical further result memory cell position which must not be identical to the real physical further result memory cell position. The further result memory ($ES_B$) can be embodied as a further shift register ($SR_B$). The further result memory ($ES_B$) deletes at least one further buffered information item (e.g. $Inf_{mB}$) from the further result memory ($ES_B$) temporally after each reception of an answer (ANS) of the processor (PC) by the watchdog (WDG) or temporally at the end of the scheduled reception time period (b). At the same time or in conjunction therewith, the further result memory ($ES_B$) shifts the remaining (m−1) non-deleted buffered further information items from the original associated logical further result memory positions to other logical further result memory positions of the further result memory ($ES_B$). This can be implemented on the one hand by real displacement of the further information data into other physical further result memory cells of the further result memory ($ES_B$), or much more simply by reallocation of the logical further result memory positions to the further physical result memory cells of the further result memory ($ES_B$). In the simplest case just one further write pointer is used for the further result memory ($ES_B$), which defines which of the further result memory cells of the further result memory ($ES_B$) is to be deleted next or overwritten. One of the further result memory cells of the further result memory ($ES_B$) then contains only the deleted value. The new further information item ($Inf_{1B}$) to be buffered is then written into this further result memory cell of the further result memory ($ES_B$). This writing process can at the same time represent the deletion process of the previous further information item of this further result memory cell of the further result memory ($ES_B$). The first information portion of the further information item is at least defined in the relevant further result memory cell of the further result memory ($ES_B$). At least the further result of the further evaluation of the content of the first result memory (ES) by the second evaluation means (VAL) is used at least as new first portion of the new buffered further information item (e.g. $Inf_{1B}$) at the relevant further result memory position of the further result memory ($ES_B$) into which none of the remaining (n−1) buffered further information items has been shifted. Depending on whether this further result was evaluated in correspondence with a logical value "correct" or "not correct", the associated further result memory cell of the further result memory ($ES_B$) then contains the associated logical value. The m further information items ($Inf_{1B}$ to $Inf_{mB}$) thus buffered are now evaluated in the example of FIG. 3 by further second evaluation means ($VAL_B$). They evaluate the m information items ($Inf_{1B}$ to $Inf_{mB}$) buffered in the further result memory ($ES_B$) or in the further shift register ($SR_B$) that reflect the last evaluation results of the second evaluation means (VAL). Here, the further second evaluation means ($VAL_B$) may also generate more than just one further evaluation as appropriate. In the example of FIG. 3 these are the first warning signal (WRN) and the second warning signal (WRN2). These further second evaluation means ($VAL_B$) for example within the scope of the evaluation of the content of the further result memory ($ES_B$) or the further shift register ($SR_B$) can define for example the number of "correct" information items in the further result memory cells of the further result memory ($ES_B$) and can compare these with a first further threshold value, for example similarly to FIG. 1. If the number thus determined lies below the first further threshold value, the control signal (RES) or another corresponding signal for influencing the processor (PC) or parts thereof or other system components (SC) can be set, for example. If the number thus determined lies below a second further threshold value, the first warning signal (WRN) for example can be set, whereupon the processor (PC) or parts thereof or other system components (SC) can introduce measures for reducing the processor or system load. If this number thus determined lies below a third further threshold value, the second warning signal (WRN2) for example can be set, whereupon the processor (PC) or parts thereof or other system components (SC) can introduce further-reaching measures for further reducing the processor or system load. If none of these measures were sufficient, for example the first control signal (RES), which for example could result in a full system or processor restart, could lastly be set, for example.

As before, further signals however can be generated here as well by the further second evaluation means ($VAL_B$) in the form of further evaluations, which for example can correspond to specific patterns in the further result memory cells of the further result memory ($ES_B$). In the example of FIG. 3 the clock generator (CTR) generates the time signals for all relevant blocks (QSTM, AVAL, ES, VAL, $ES_B$, $VAL_B$) of the watchdog. In particular, the clock generator (CTR) again preferably defines the time of sending of the messages (MSG) to the processor (PC) and the time position and duration of the scheduled reception time periods (b) for the answers (ANS) of the processor (PC) to these messages (MSG). The clock generator (CTR) thus arranges, preferably in cooperation with the first evaluation means (AVAL), which receive the messages (MSG) of the processor (PC), for the result memory (ES) to change the result memory positions of the n buffered information items (Inf$_1$ to Inf$_n$) to the correct times as predetermined and to delete the correct result memory cell and to write the new evaluation result of the first evaluation means (AVAL) into the correct result memory position of the first result memory (ES) at the correct time. The clock generator (CTR) in the example of FIG. 3 additionally arranges, preferably in cooperation with the second evaluation means (VAL), for the further result memory (ES$_B$) to likewise change the further result memory positions of the m further buffered information items (Inf$_{1B}$ to Inf$_{nB}$) to the correct times as predetermined and to delete the correct further result memory cell and to write the new evaluation result of the second evaluation means (VAL) into the correct further result memory position of the further result memory (ES$_B$) at the correct time.

Figure 2:
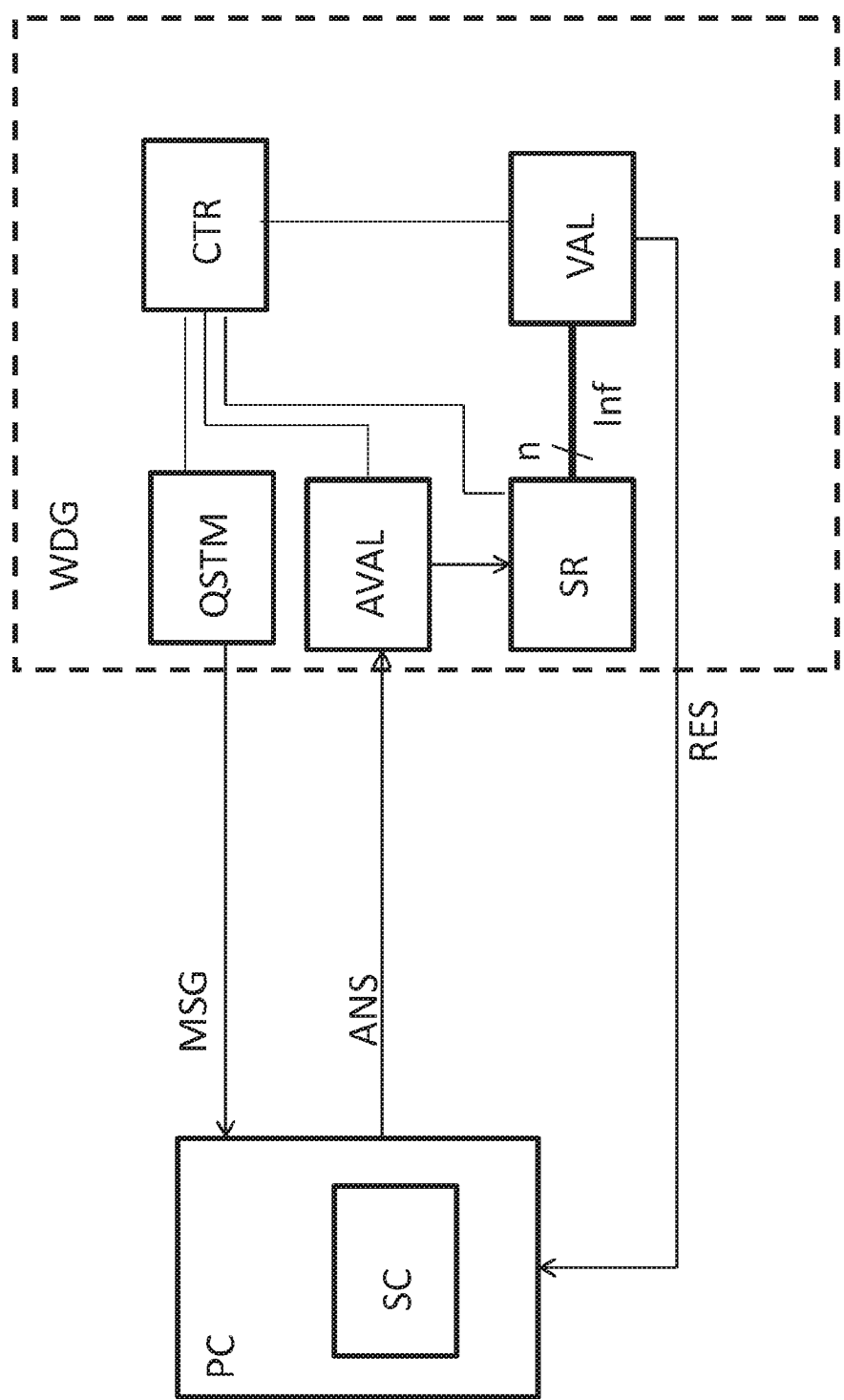
FIG. 2 corresponds to FIG. 1 with a shift register (SR) as result memory (ES).
Figure 4:
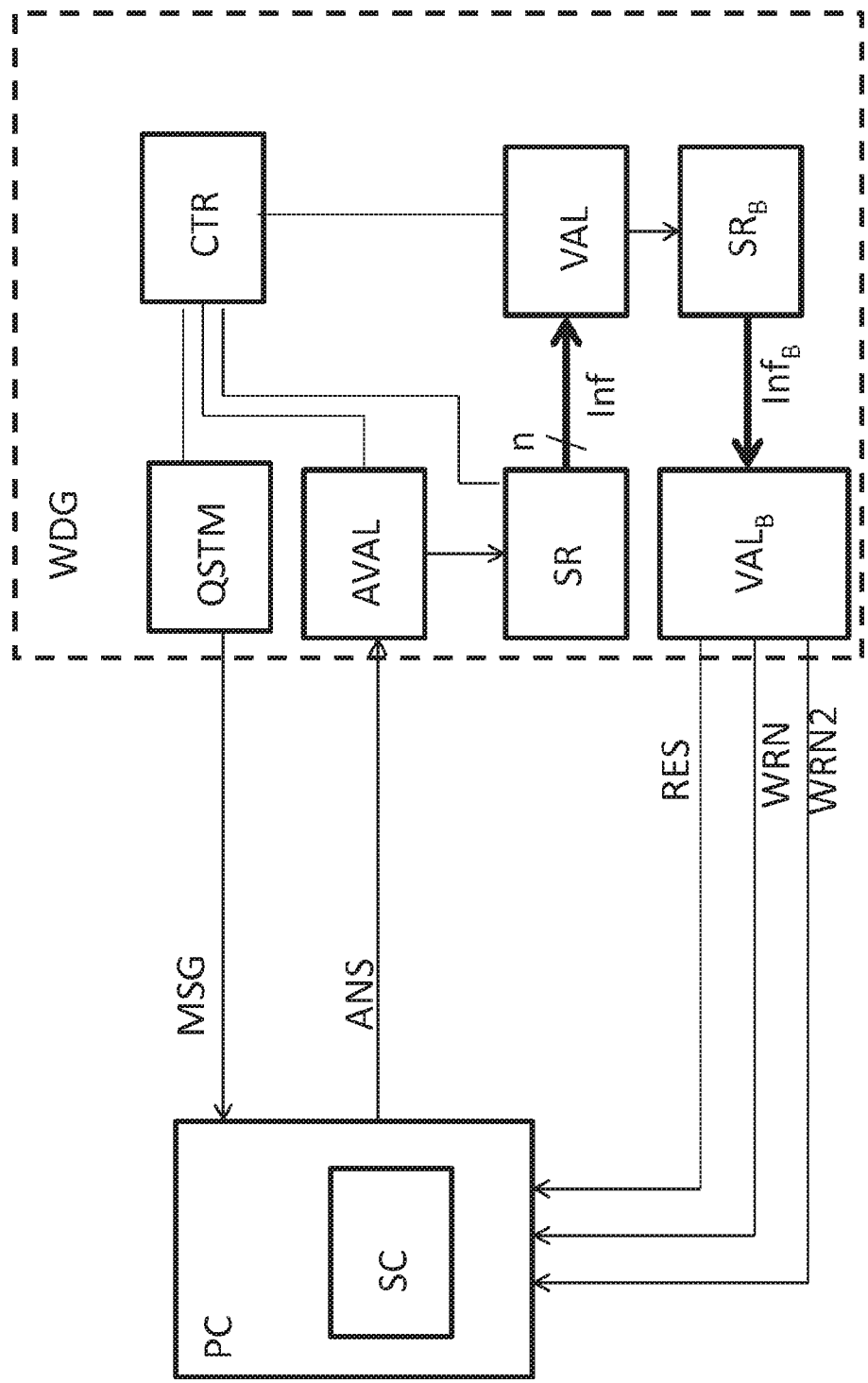
Figure 5:
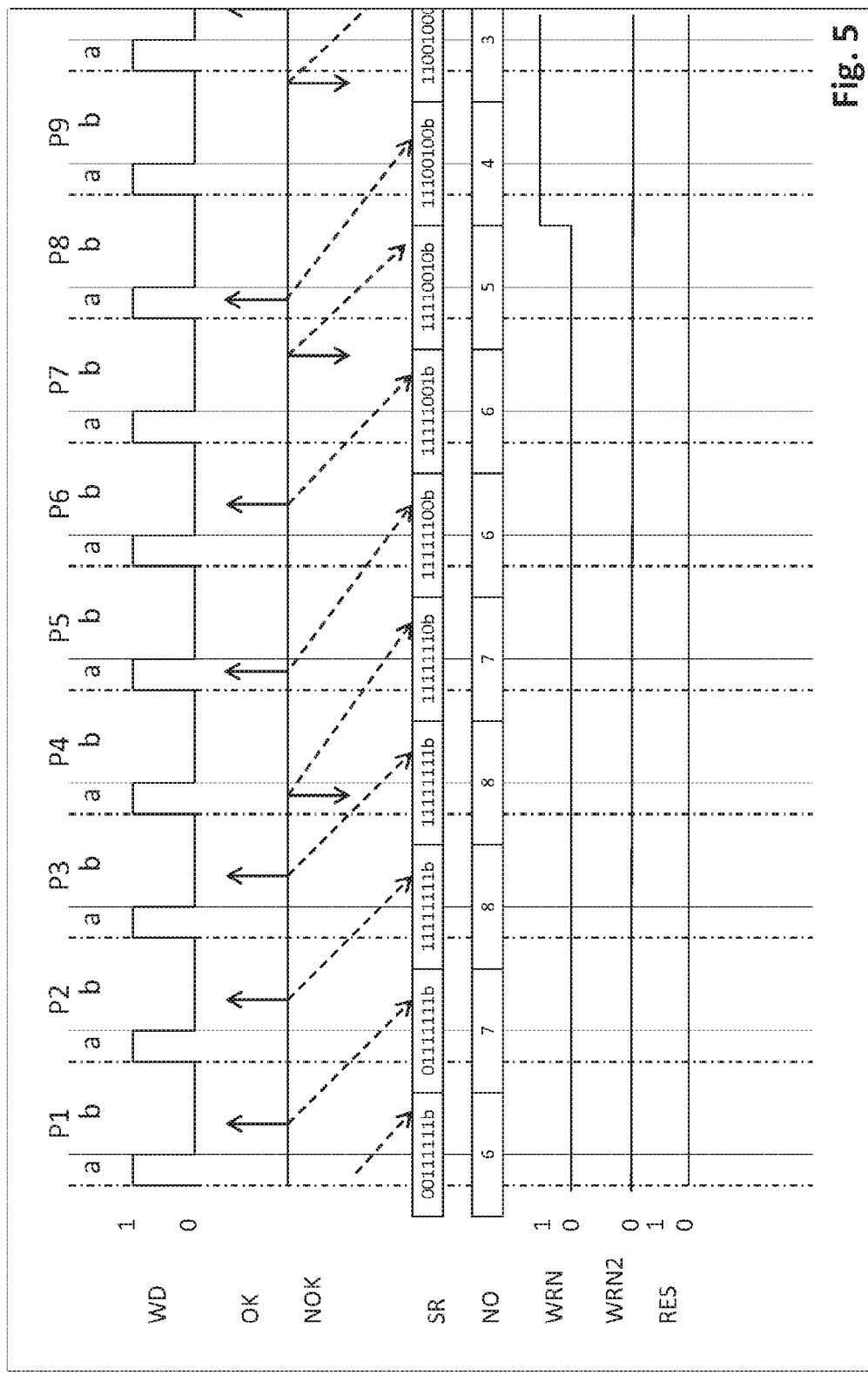
Figure 6:
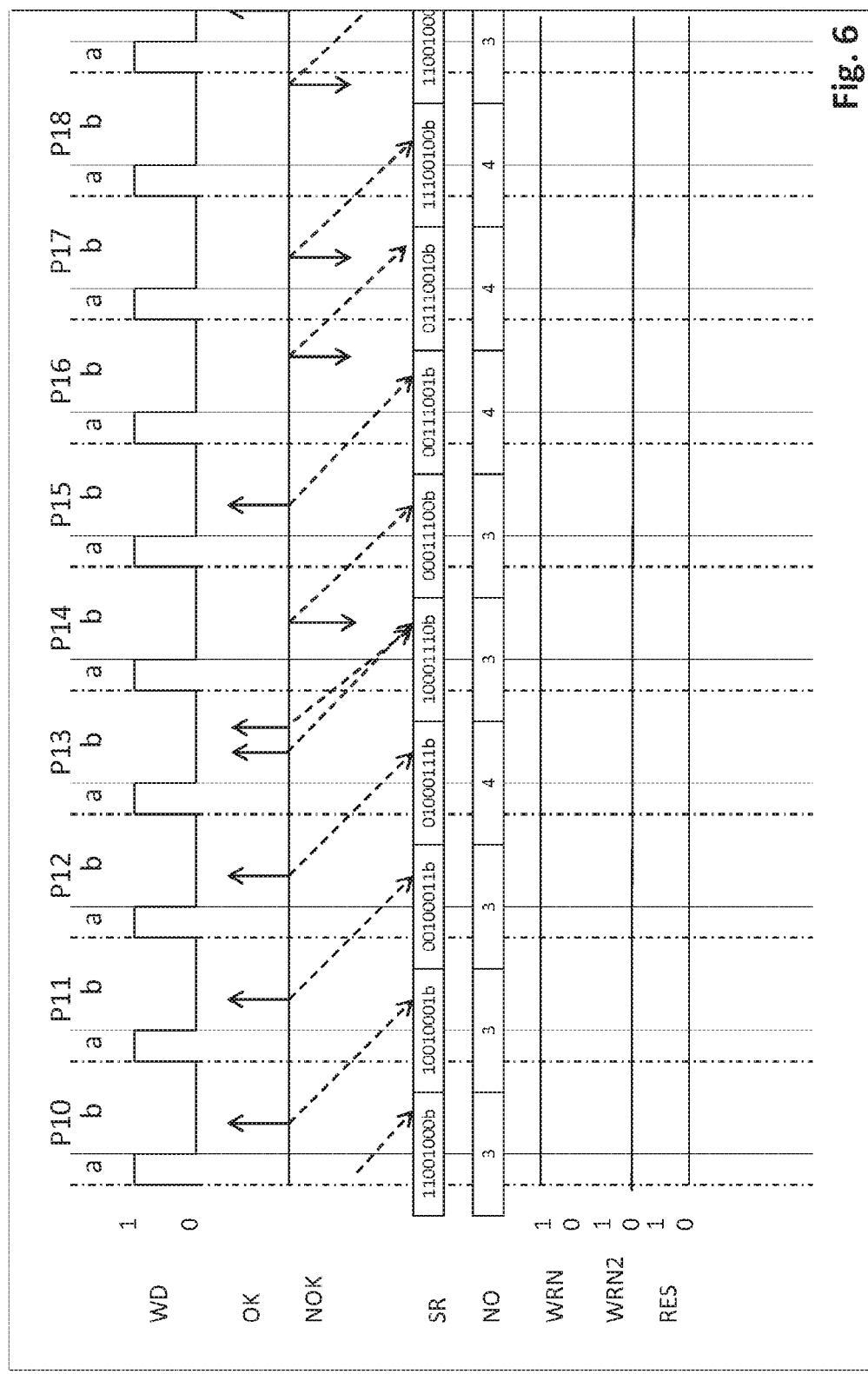
Figure 7:
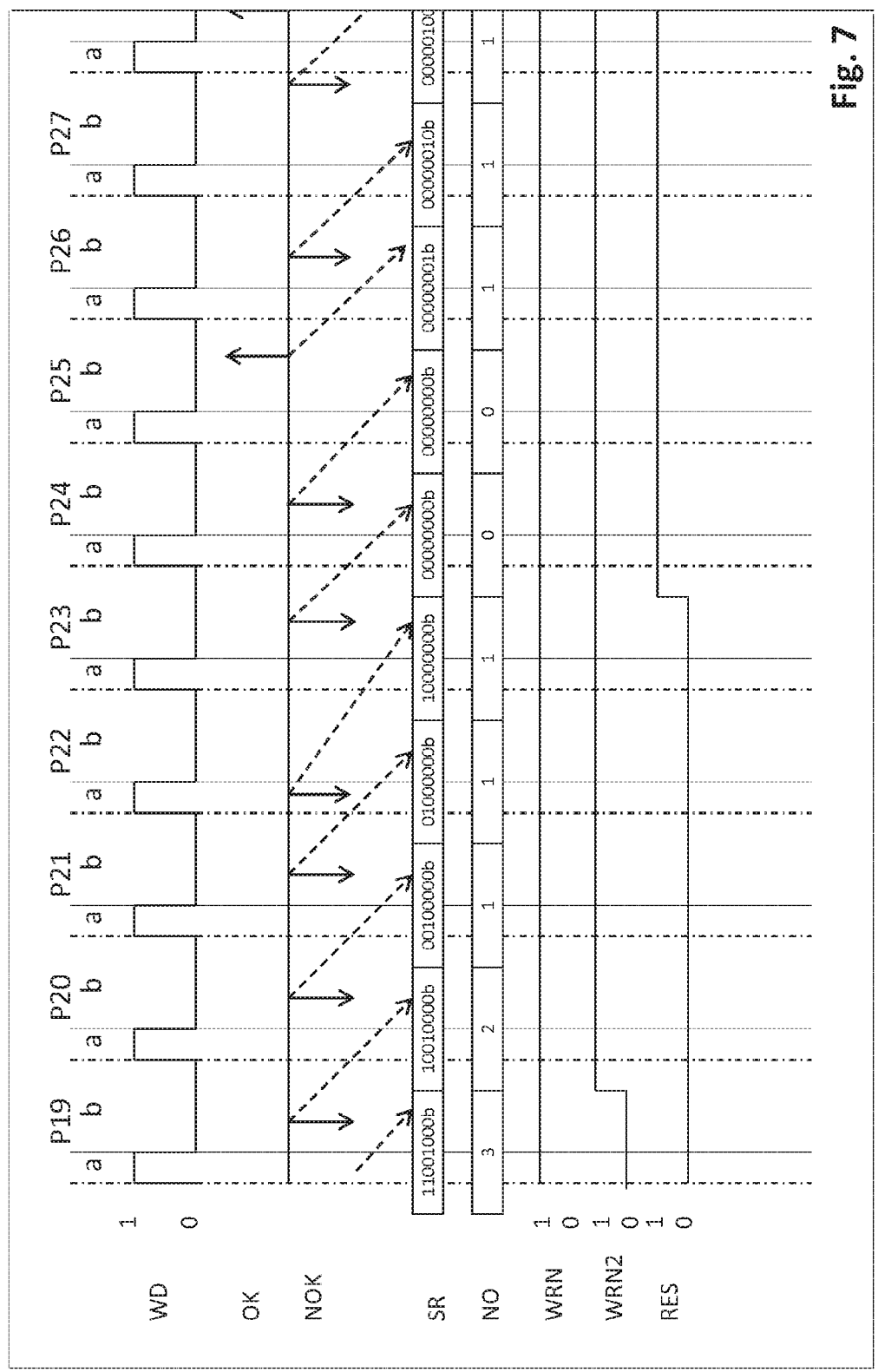

FIG. 4 corresponds to FIG. 3, wherein the first result memory (ES) is a shift register (SR) and the further result memory (ES$_B$) is a further shift register (SR$_B$), FIGS. 5 to 7 show schematically an exemplary, successive temporal behaviour of an exemplary one-step solution with a shift register (SR) corresponding to FIG. 2. The clock generator (CTR) generates an exemplary window signal (WD). In the example of FIGS. 5 to 7 a 1-level is intended to mean that no answers are expected and that answers in these time periods with a 1-level are assessed as "not correct", regardless of their content. In a time period with a 0-level of the window signal (WD), answers preferably in a predetermined number are expected. If the contents thereof are correct, i.e. corresponds to a content determinable in advance, they are assessed as "correct". A deviating number of answers may also lead to a "not correct" evaluation as applicable. The example of FIGS. 5 to 7 show, by way of example, 27 temporal time periods (P1 to P27). Each of these exemplary 27 time periods (P1 to P27) is divided for example into a first time period (a) and a second time period (b). In the example of FIGS. 5 to 7 the exemplary window signal (WD) is at a logical 1-level in the first time period (a) and is at a logical 0-level in the second time period (b). In FIGS. 5 to 7 times of answers (ANS) are shown on a timeline from left to right beneath the window signal (WD). The time of each answer (ANS) is symbolized by an arrow upwards or downwards at a corresponding position on the timeline in temporal relation to the window signal (WD). An arrow downward corresponds to an answer (ANS) of the processor (PC) to the watchdog (WDG) of which the content is assessed by the first evaluation means (AVAL) as "not correct". An arrow upward corresponds to an answer (ANS) of the processor (PC) to the watchdog (WDG) of which the content is assessed by the first evaluation means (AVAL) as "correct". On the left-hand side of FIGS. 5 to 7 the values "OK" for "correct" and content and "NOK" for "not correct" content are marked. In the example of FIGS. 5 to 7 a shift register (SR) is used as first result memory (ES). In this example the shift register (SR) comprises 8 bits for example. In the first time period (P1) it contains the value "00111111". The "b" is intended to indicate that the values are bit values that may correspond to a logical "0" (="not correct") or a logical "1" (="correct").

In the first time period (P1) the watchdog (WDG) receives an answer (ANS) assessed as "correct" by the first evaluation means (AVAL) in the reception time period (b) scheduled therefor. The internal clock generator (CTR) of the watchdog (WDG) in this example, on account of the reception of the answer (ANS) with a constant delay, typically predetermined by the implementation, at the reception time period of the answer (ANS) of the processor (PC), generates a transfer of the evaluation result of the first evaluation means (AVAL) into the first shift register (SR) in conjunction with a shift operation to the left. The content of the shift register (SR) is then in this example "01111111", since a correct answer (ANS) was received at the correct time.

In the second first time period (P2) the watchdog (WDG) receives an answer (ANS) assessed as "correct" by the first evaluation means (AVAL) in the reception time period (b) scheduled therefor. The content of the shift register (SR) is then in this example "11111111" after the transfer of the evaluation and implemented shift operation, since a correct answer (ANS) was received at the correct time.

In the third time period (P3) the watchdog (WDG) receives an answer (ANS) assessed as "correct" by the first evaluation means (AVAL) in the reception time period (b) scheduled therefor. The content of the shift register (SR) is then in this example "11111111" after the transfer of the evaluation and implemented shift operation, since a correct answer (ANS) was received at the correct time.

In the fourth time period (P4) the watchdog (WDG) receives an answer (ANS) assessed as "not correct" by the first evaluation means (AVAL) in the reception time period (a) not scheduled therefor. The content of the shift register (SR) is then in this example "11111110" after the transfer of the evaluation and implemented shift operation, since an incorrect answer (ANS) was received at the incorrect time.

In the fifth time period (P5) the watchdog (WDG) receives an answer (ANS) assessed as "correct" by the first evaluation means (AVAL) in the reception time period (a) not scheduled therefor. The content of the shift register (SR) is then in this example "11111100" after the transfer of the evaluation and implemented shift operation, since a correct answer (ANS) was received at the incorrect time.

In the sixth time period (P6) the watchdog (WDG) receives an answer (ANS) assessed as "correct" by the first evaluation means (AVAL) in the reception time period (b) scheduled therefor. The content of the shift register (SR) is then in this example "11111001" after the transfer of the evaluation and implemented shift operation, since a correct answer (ANS) was received at the correct time.

In the seventh time period (P7) the watchdog (WDG) receives an answer (ANS) assessed as "not correct" by the first evaluation means (AVAL) in the reception time period (b) scheduled therefor. The content of the shift register (SR) is then in this example "11110010" after the transfer of the evaluation and implemented shift operation, since an incorrect answer (ANS) was received at the correct time.

In the eighth time period (P8) the watchdog (WDG) receives an answer (ANS) assessed as "correct" by the first evaluation means (AVAL) in the reception time period (a) not scheduled therefor. The content of the shift register (SR) is then in this example "11100100" after the transfer of the evaluation and implemented shift operation, since a correct answer (ANS) was received at the incorrect time.

In the ninth time period (P9) the watchdog (WDG) receives an answer (ANS) assessed as "not correct" by the first evaluation means (AVAL) in the reception time period (b) scheduled therefor. The content of the shift register (SR) is then in this example "11001000" after the transfer of the evaluation and implemented shift operation, since an incorrect answer (ANS) was received at the correct time.

In the tenth time period (P10) the watchdog (WDG) receives an answer (ANS) assessed as "correct" by the first evaluation means (AVAL) in the reception time period (b) scheduled therefor. The content of the shift register (SR) is then in this example "10010001" after the transfer of the evaluation and implemented shift operation, since a correct answer (ANS) was received at the correct time.

In the eleventh time period (P11) the watchdog (WDG) receives an answer (ANS) assessed as "correct" by the first evaluation means (AVAL) in the reception time period (b) scheduled therefor. The content of the shift register (SR) is then in this example "00100011" after the transfer of the evaluation and implemented shift operation, since a correct answer (ANS) was received at the correct time.

In the twelfth time period (P12) the watchdog (WDG) receives an answer (ANS) assessed as "correct" by the first evaluation means (AVAL) in the reception time period (b) scheduled therefor. The content of the shift register (SR) is then in this example "01000111" after the transfer of the evaluation and implemented shift operation, since a correct answer (ANS) was received at the correct time.

In the thirteenth time period (P13) the watchdog (WDG) receives an answer (ANS) assessed as "correct" by the first evaluation means (AVAL) in the reception time period (b) scheduled therefor. Only one answer (ANS), however, of the processor was expected. Thus, in this example the answers (ANS) of the processor (PC) actually having a correct content are assessed as "not correct". The content of the shift register (SR) is then in this example "10001110" after the transfer of the evaluation and implemented shift operation, since an incorrect answer (ANS) was received at the correct time.

In the fourteenth time period (P14) the watchdog (WDG) receives an answer (ANS) assessed as "not correct" by the first evaluation means (AVAL) in the reception time period (b) scheduled therefor. The content of the shift register (SR) is then in this example "00011100" after the transfer of the evaluation and implemented shift operation, since an incorrect answer (ANS) was received at the correct time.

In the fifteenth time period (P15) the watchdog (WDG) receives an answer (ANS) assessed as "correct" by the first evaluation means (AVAL) in the reception time period (b) scheduled therefor. The content of the shift register (SR) is then in this example "00111001" after the transfer of the evaluation and implemented shift operation, since a correct answer (ANS) was received at the correct time.

In the sixteenth time period (P16) the watchdog (WDG) receives an answer (ANS) assessed as "not correct" by the first evaluation means (AVAL) in the reception time period (b) scheduled therefor. The content of the shift register (SR) is then in this example "01110010" after the transfer of the evaluation and implemented shift operation, since an incorrect answer (ANS) was received at the correct time.

In the seventeenth time period (P17) the watchdog (WDG) receives an answer (ANS) assessed as "not correct" by the first evaluation means (AVAL) in the reception time period (b) scheduled therefor. The content of the shift register (SR) is then in this example "11100100" after the transfer of the evaluation and implemented shift operation, since an incorrect answer (ANS) was received at the correct time.

In the eighteenth time period (P18) the watchdog (WDG) receives an answer (ANS) assessed as "not correct" by the first evaluation means (AVAL) in the reception time period (b) scheduled therefor. The content of the shift register (SR) is then in this example "11001000" after the transfer of the evaluation and implemented shift operation, since an incorrect answer (ANS) was received at the correct time.

In the nineteenth time period (P19) the watchdog (WDG) receives an answer (ANS) assessed as "not correct" by the first evaluation means (AVAL) in the reception time period (b) scheduled therefor. The content of the shift register (SR) is then in this example "10010000" after the transfer of the evaluation and implemented shift operation, since an incorrect answer (ANS) was received at the correct time.

In the twentieth time period (P20) the watchdog (WDG) receives an answer (ANS) assessed as "not correct" by the first evaluation means (AVAL) in the reception time period (b) scheduled therefor. The content of the shift register (SR) is then in this example "00100000" after the transfer of the evaluation and implemented shift operation, since an incorrect answer (ANS) was received at the correct time.

In the twenty-first time period (P21) the watchdog (WDG) receives an answer (ANS) assessed as "not correct" by the first evaluation means (AVAL) in the reception time period (b) scheduled therefor. The content of the shift register (SR) is then in this example "01000000" after the transfer of the evaluation and implemented shift operation, since an incorrect answer (ANS) was received at the correct time.

In the twenty-second time period (P22) the watchdog (WDG) receives an answer (ANS) assessed as "not correct" by the first evaluation means (AVAL) in the reception time period (a) not scheduled therefor. The content of the shift register (SR) is then in this example "10000000" after the transfer of the evaluation and implemented shift operation, since an incorrect answer (ANS) was received at the incorrect time.

In the twenty-third time period (P23) the watchdog (WDG) receives no answer (ANS) in the reception time period (b) scheduled therefor, although an answer (ANS) of the processor (PC) was expected in the reception time period (b) scheduled therefor. This is evaluated here by the first evaluation means for example as an answer (ANS) to be assessed as "not correct". The content of the shift register (SR) is then in this example "00000000" after the transfer of the evaluation and implemented shift operation, since an incorrect answer (ANS) was received at the correct time.

In the twenty-fourth time period (P24) the watchdog (WDG) receives an answer (ANS) assessed as "not correct" by the first evaluation means (AVAL) in the reception time period (b) scheduled therefor. The content of the shift register (SR) is then in this example "00000000" after the transfer of the evaluation and implemented shift operation, since an incorrect answer (ANS) was received at the correct time.

In the twenty-fifth time period (P25) the watchdog (WDG) receives an answer (ANS) assessed as "correct" by the first evaluation means (AVAL) in the reception time period (b) scheduled therefor. The content of the shift register (SR) is then in this example "00000001" after the transfer of the evaluation and implemented shift operation, since an incorrect answer (ANS) was received at the correct time.

In the twenty-sixth time period (P26) the watchdog (WDG) receives an answer (ANS) assessed as "not correct" by the first evaluation means (AVAL) in the reception time period (b) scheduled therefor. The content of the shift register (SR) is then in this example "00000010" after the transfer of the evaluation and implemented shift operation, since an incorrect answer (ANS) was received at the correct time.

In the twenty-seventh time period (P27) the watchdog (WDG) receives an answer (ANS) assessed as "not correct" by the first evaluation means (AVAL) in the reception time period (b) scheduled therefor. The content of the shift register (SR) is then in this example "00000100" after the transfer of the evaluation and implemented shift operation, since an incorrect answer (ANS) was received at the correct time.

The second evaluation means (VAL) evaluate in parallel the information items ($Inf_1$ to $Inf_8$) in the exemplary shift register (SR) of FIGS. 5 to 7. In this example the content of the shift register (SR) is evaluated by the second evaluation means after each shift operation of the shift register. This is implemented here by counting the 1-levels within the shift register (SR), which specify the answers (ANS) of the last eight time periods assessed as "correct", in an exemplary count value (NO). Other counting methods and evaluations are of course conceivable explicitly. In this example the control signal (RES) is set if the shift register (SR) for example does not contain any information in which eight information items ($Inf_1$ to $Inf_8$) of the eight shift register cells that was assessed as "correct" information in the last eight time periods. Depending on the implementation it may be expedient if the control signal (RES) is not a non-return-to-zero signal (NRZ signal) as shown in FIGS. 5 to 7, but a return-to-zero signal (RTZ signal), which is active only for a short time period upon the occurrence of the condition, and then is active again only when the condition occurs again. In this example the first warning signal (WRN) is set if the shift register (SR) for example contains fewer than three information items ($Inf_1$ to $Inf_8$) for three correct information items in the last eight time periods. In this example the second warning signal (WRN2) is set if the shift register (SR) for example contains fewer than five information items ($Inf_1$ to $Inf_8$) for five correct information items in the last eight time periods.

Figure 8:
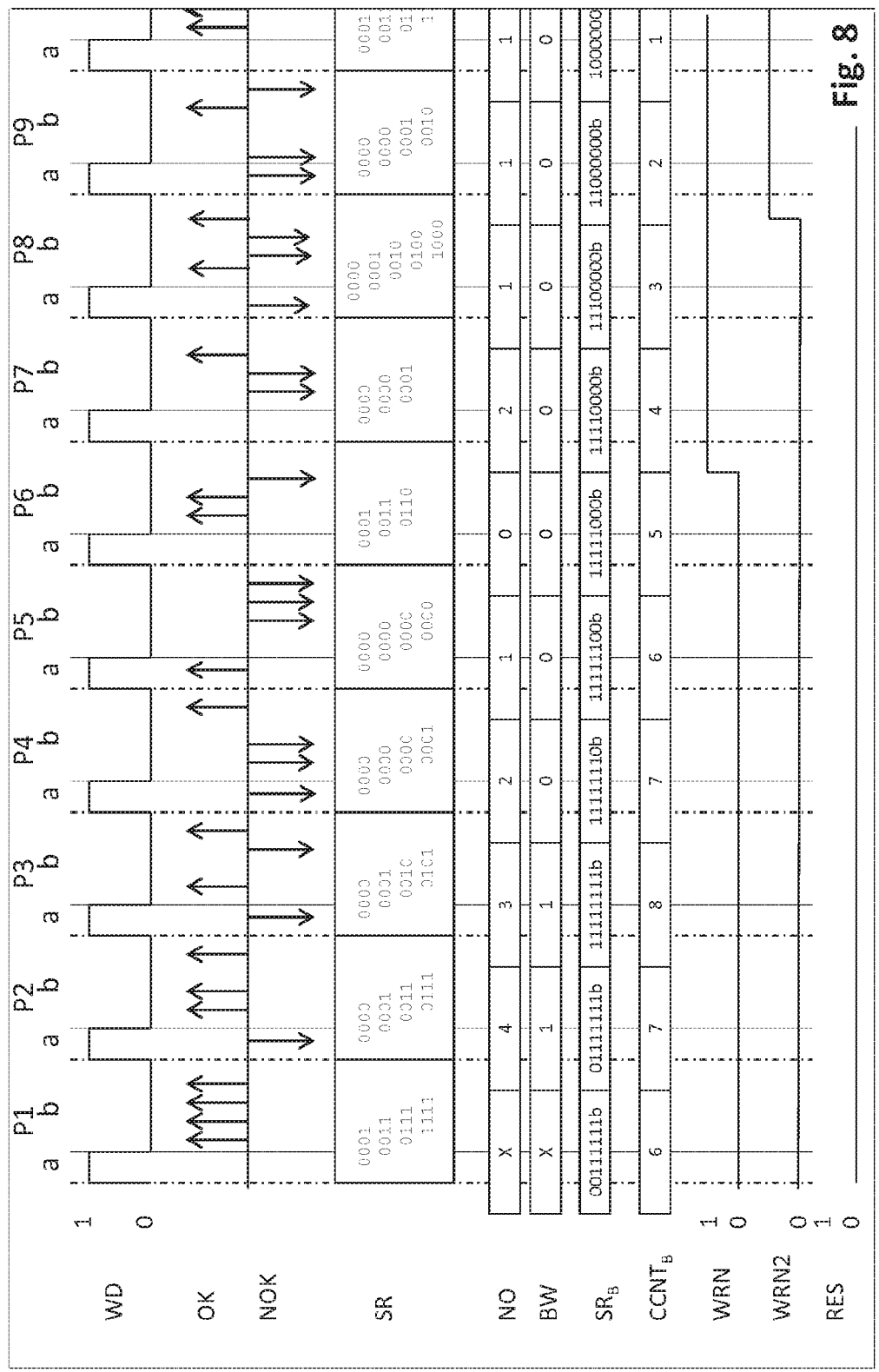

FIG. 8 shows an exemplary two-step method corresponding to FIG. 4. The first result memory (ES) is realized here by a first shift register (SR) with an exemplary width of 4 bits. In each example the first shift register (SR) performs a shift operation to the left with each reception of an answer (ANS) and transfers the evaluation result of the first evaluation means (AVAL) into the shift register cell arranged furthest to the right (result memory cell). For improved clarity, the exemplary temporally different values of the 4 buffered information items ($Inf_1$ to $Inf_n$) of the shift register (SR) are written one below the other and offset.

At the start of the first time period (P1) the content of the shift register (SR) is reset to a reset value, here for example "0000". In this time period the watchdog (WDG) receives four expected and no unexpected answers (ANS) of the processor (PC). All answers (ASN) are assessed as "correct" by the first evaluation means (AVAL). None of the answers (ASN) is assessed as "not correct" by the first evaluation means (AVAL). All expected answers are received in the reception time period (b) scheduled therefor. No answers are received in the reception time period (a) not scheduled therefor. The content of the shift register (SR) in this example is then "1111" after adoption of the evaluation and 4 implemented shift operations.

At the start of the second time period (P2) the content of the shift register (SR) is reset to a reset value, here for example "0000". In this time period the watchdog (WDG) receives four expected and no unexpected answers (ANS) of the processor (PC). Three answers (ASN) are assessed as "correct" by the first evaluation means (AVAL). One of the answers (ASN) is assessed as "not correct" by the first evaluation means (AVAL). Three of the expected answers are received in the reception time period (b) scheduled therefor. One answer is received in the reception time period (a) not scheduled therefor. The content of the shift register (SR) in this example is then "0111" after adoption of the evaluation and 4 implemented shift operations.

At the start of the third time period (P3) the content of the shift register (SR) is reset to a reset value, here for example "0000". In this time period the watchdog (WDG) receives four expected and no unexpected answers (ANS) of the processor (PC). Two answers (ASN) are assessed as "correct" by the first evaluation means (AVAL). Two of the answers (ASN) is assessed as "not correct" by the first evaluation means (AVAL). Three of the expected answers are received in the reception time period (b) scheduled therefor. One answer is received in the reception time period (a) not scheduled therefor. The content of the shift register (SR) in this example is then "0101" after adoption of the evaluation and 4 implemented shift operations.

At the start of the fourth time period (P4) the content of the shift register (SR) is reset to a reset value, here for example "0000". In this time period the watchdog (WDG) receives four expected and no unexpected answers (ANS) of the processor (PC). One answer (ASN) is assessed as "correct" by the first evaluation means (AVAL). Three of the answers (ASN) are assessed as "not correct" by the first evaluation means (AVAL). Three of the expected answers are received in the reception time period (b) scheduled therefor. One answer is received in the reception time period (a) not scheduled therefor. The content of the shift register (SR) in this example is then "0001" after adoption of the evaluation and 4 implemented shift operations.

At the start of the fifth time period (P5) the content of the shift register (SR) is reset to a reset value, here for example "0000". In this time period the watchdog (WDG) receives four expected and no unexpected answers (ANS) of the processor (PC). One answer (ASN) is assessed as "correct" by the first evaluation means (AVAL). Three of the answers (ASN) are assessed as "not correct" by the first evaluation means (AVAL). Three of the expected answers are received in the reception time period (b) scheduled therefor. One correct answer is received in the reception time period (a) not scheduled therefor. The content of the shift register (SR) in this example is then "0000" after adoption of the evaluation and 4 implemented shift operations.

At the start of the sixth time period (P6) the content of the shift register (SR) is reset to a reset value, here for example "0000". In this time period the watchdog (WDG) receives only three instead of the expected 4 answers (ANS) of the processor (PC). Two answers (ASN) are assessed as "correct" by the first evaluation means (AVAL). One of the answers (ASN) is assessed as "not correct" by the first evaluation means (AVAL). The three expected answers are received in the reception time period (b) scheduled therefor. No answer is received in the reception time period (a) not scheduled therefor. The missing answer is assessed here for example as a "not correct" answer. The content of the shift register (SR) in this example is then "0110" after adoption of the evaluation and 3 implemented shift operations.

At the start of the seventh time period (P7) the content of the shift register (SR) is reset to a reset value, here for example "0000". In this time period the watchdog (WDG) receives only three instead of the expected 4 answers (ANS) of the processor (PC). One answer (ASN) is assessed as "correct" by the first evaluation means (AVAL). Two of the answers (ASN) is assessed as "not correct" by the first evaluation means (AVAL). The three expected answers are received in the reception time period (b) scheduled therefor. No answer is received in the reception time period (a) not scheduled therefor. The missing answer is assessed here for example as a "not correct" answer. The content of the shift register (SR) in this example is then "0001" after adoption of the evaluation and 3 implemented shift operations.

At the start of the eighth time period (P8) the content of the shift register (SR) is reset to a reset value, here for example "0000". In this time period the watchdog (WDG) receives 5 instead of the expected 4 answers (ANS) of the processor (PC). Two answers (ASN) are assessed as "correct" by the first evaluation means (AVAL). Three of the answers (ASN) are assessed as "not correct" by the first evaluation means (AVAL). Four expected answers are received in the reception time period (b) scheduled therefor. One answer is received in the reception time period (a) not scheduled therefor. The additional answer with correct content is assessed here for example as a "not correct" answer. The content of the shift register (SR) in this example is then "1000" after adoption of the evaluation and 5 implemented shift operations.

At the start of the ninth time period (P9) the content of the shift register (SR) is reset to a reset value, here for example "0000". In this time period the watchdog (WDG) receives 4 of the expected 4 answers (ANS) of the processor (PC). One answer (ASN) is assessed as "correct" by the first evaluation means (AVAL). Three of the answers (ANS) are assessed as "not correct" by the first evaluation means (AVAL). Three expected answers are received in the reception time period (b) scheduled therefor. One answer is received in the reception time period (a) not scheduled therefor. The content of the shift register (SR) in this example is then "0010" after adoption of the evaluation and 4 implemented shift operations.

In this example of FIG. 8 the second evaluation means (VAL) count the last 4 answers of the processor (PC) to the watchdog (WDG) evaluated as "correct" in the form of a count value (NO). The second evaluation means (VAL) in this example compare this count value (NO) thus determined with a fourth threshold value. If the count value (NO) in this example lies below the fourth threshold value of 3, an evaluation signal (BW) is thus set. If the count value is above it, this exemplary evaluation signal (BW) is reset.

The value of this evaluation signal (BW) is adopted for example at the end of each time period, i.e. at the end of the respective scheduled reception time period (b) for the answers (ANS), into a further shift register ($SR_B$), which here represents the further result memory ($ES_B$).

The checking result in the form of the logical level of the evaluation signal (BW) in the first time period (P1) and in the second time period (B2) is therefore evaluated with a 1-level, which means "correct" here, and in the other time periods is evaluated with a 0-level, which means "not correct" here.

These checking results thus stored in the further shift register ($SR_B$) are evaluated by further second evaluation means ($VAL_B$). This is implemented here for example by counting the 1-levels within the further shift register ($SR_B$). A second count value ($CCNT_B$) is hereby determined by the further second evaluation means ($VAL_B$).

The further second evaluation means ($VAL_B$) compare this second count value ($CCNT_B$) for example with a first threshold value, which here is 1 for example. If the second count value ($CCNT_B$) lies below the first threshold value, the control signal (RES) in the example of FIG. 8 is thus set and otherwise is not set.

The further second evaluation means ($VAL_B$) compare the second count value ($CCNT_B$) in the example of FIG. 8 with a second threshold value, which here is 5 for example. If the second count value ($CCNT_B$) lies below the second threshold value, the first warning signal (WRN) in the example of FIG. 8 is thus set and otherwise is not set.

The further second evaluation means ($VAL_B$) compare the second count value ($CCNT_B$) in the example of FIG. 8 with a third threshold value, which here is 3 for example. If the second count value ($CCNT_B$) lies below the third threshold value, the second warning signal (WRN2) in the example of FIG. 8 is thus set and otherwise is not set.

Figure 9:
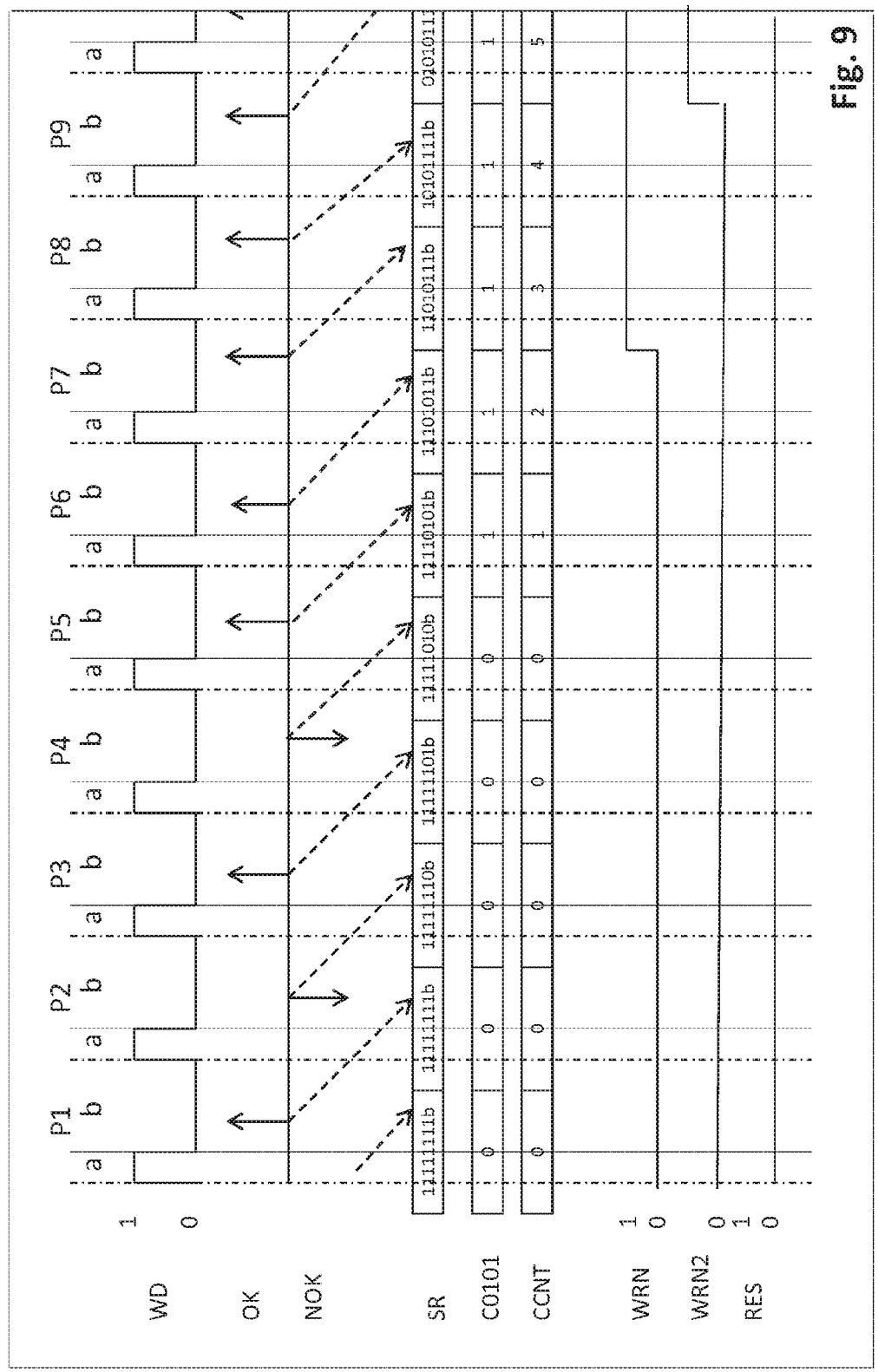

The example of FIG. 9 corresponds again in its basic structure to FIG. 2. The evaluation of the shift register (SR) by the second evaluation means (VAL), however, is now implemented differently from the evaluation corresponding to FIGS. 5 to 7. Now it is not the number of correct answers that are stored in the shift register (SR) as 1-information that is evaluated, but instead the pattern. Here, the second evaluation means attempt to detect the pattern "0101". If this is present in a region in four successive shift register cells of the shift register (SR), in this example an internal evaluation signal (here C0101) is set to 1. An upward/downward counter (CCNT) of the second evaluation means (VAL) counts upward at the end of each time period (P1 to P9) if the evaluation signal (C0101) is 1, and downward if it is 0. If the value of the upward/downward counter (CCNT) is above a first threshold value (here 2), the first warning signal (WRN) is set. If the value of the upward/downward counter (CCNT) is above a second threshold value (not stated here), the second warning signal (WRN2) is set. If the value of the upward/downward counter (CCNT) is above a third threshold value (not stated here), the control signal (RES) is set.

The disclosure can also be described alternatively by one of the following groups of features, wherein the groups of features can be combined with one another arbitrarily and also individual features of a group of features can be combined with one or more features of one or more other groups of features and/or one or more of the previously described examples.

1. A device for monitoring a processor (PC),
   comprising a watchdog (WDG) and
   comprising a clock generator (CTR) as part of the watchdog (WDG), and
   comprising a shift register (SR) as part of the watchdog (WDG), and
   comprising n buffered information items ($Inf_1$ to $Inf_n$), which are stored in n shift register cells, which form the shift register (SR), wherein n is a positive integral number greater than 1, and
   which can be continuously numbered from 1 to n,
      wherein each of the n buffered information items ($Inf_1$ to $Inf_n$) has a unique logical shift register position from n shift register positions which are continuously numbered from 1 to n, and
      wherein each of the n buffered information items ($Inf_1$ to $Inf_n$) has at least one first information portion and possibly can have further information portions, and
   comprising first stimulating means (QSTM) as part of the watchdog (WDG) for transmission of messages (MSG) from the watchdog (WDG) to the processor (PC), and
   comprising first evaluation means (AVAL) as part of the watchdog (WDG) for evaluation of answers (ANS) of the processor PC) to the watchdog (WDG), and
   wherein the watchdog (WDG) is operative to send messages (MSG) to the processor (PC),
      that can pertain to the processor (PC) itself and to further system components (SC), and
   wherein the processor (PC) is operative to transmit answers (ANS) to the watchdog (WDG) depending on these messages (MSG),
   wherein the watchdog (WDG) is operative, by means of the first evaluation means (AVAL), to assess the answer (ANS) of the processor (PC) as "correct" or "not correct", and
   wherein an answer (ANS) is "correct"

if its content coincides with at least one possible expected content, and if the answer (ANS) is received by the watchdog (WDG) within a predetermined reception time period (b), and wherein an answer (ANS) is "not correct"

if the content of the answer (ANS) does not coincide with at least one possible expected content, or if the answer (ANS) is not received by the watchdog (WDG) within the predetermined reception time period (b), and wherein the shift register (SR), upon each reception of an answer (ANS) of the processor (PC), deletes the n-th buffered information item ($Inf_n$) at the n-th logical shift register position in a shift register cell of the shift register (SR) from this shift register (SR), and shifts each of the (n−1) buffered information items from the respective j-th logical shift register position ($p_j$, with $1 \leq j \leq (n-1)$) to the (j+1)-th logical shift register position ($p_j$, with $2 \leq j \leq n$), and uses, in correspondence to a logical value for "correct" or for "not correct", at least the result of the evaluation of the received answer (ANS) by the processor (PC) at least as a new first portion of the new 1-th buffered information item ($Inf_1$).

2. The device according to feature 1, comprising an additional second evaluation means (VAL) as part of the watchdog (WDG) for evaluation of the buffered information items ($Inf_1$ to $Inf_n$) of the shift register (SR), wherein the second evaluation means (VAL), depending on buffered information items of the n buffered information items ($Inf_1$ to $Inf_n$) in the memory cells of the shift register (SR), generate at least one control signal (RES) which can change the state of the processor (PC), or generate a signal from which such a control signal (RES) is derived.

3. The device according to any one of the preceding features, comprising further monitorable system components (SC) as part of the processor.

4. The device according to any one of the preceding features, wherein to a first expected answer (ANS1), there is assigned, by the first evaluation means (AVAL), a predetermined first reception time period (b1) as predetermined reception time period (b) for the evaluation of the first expected answer (ANS1) after reception by the watchdog (WDG) as answer (ANS), and wherein to a first expected answer (ANS2), there is assigned, by the first evaluation means (AVAL), a predetermined second reception time period (b2) as predetermined reception time period (b) for the evaluation of the second expected answer (ANS2) after reception by the watchdog (WDG) as answer (ANS), and wherein the predetermined first reception time period (b1) and the predetermined second reception time period (b2) are different and overlap each other, and wherein the predetermined first reception time period (b1) has no effect for the evaluation of the second answer (ANS2), and wherein the predetermined second reception time period (b2) has no effect for the evaluation of the first answer (ANS1).

5. The device according to any one of the preceding features, wherein the watchdog (WDG) is operative, by means of the first evaluation means (AVAL), to assess the answer (ANS) of the processor (PC) as "correct" or "not correct", and wherein an answer (ANS) is additionally "correct"

if, within the predetermined reception time period (b), the number of answers (ANS) received by the watchdog (WDG) does not exceed, due to the received answer (ANS), a predetermined maximal number of to-be-received answers (ANS) or, at the end of the predetermined reception time period (b), does not fall short of a predetermined minimal number of to-be-received answers (ANS), and wherein an answer (ANS) is additionally "not correct"

if, within the predetermined reception time period (b), the number of the answers (ANS) received by the watchdog (WDG) exceeds, due to the received answer (ANS), a predetermined maximal number of to-be-received answers (ANS) or, at the end of the predetermined reception time period (b), falls short of a predetermined minimal number of to-be-received answers (ANS).

6. The device according to any one of the preceding featured, characterized in that the evaluation of the answer (ANS) of the processor by the first evaluation means (AVAL) of the watchdog (WDG) is additionally depending on at least one buffered information item ($Inf_j$) of the buffered information items ($Inf_j$ to $Inf_n$) of the shift register (SR).

7. The device according to any one of the preceding features, characterized in that the evaluation of the answer (ANS) of the processor (PC) by the first evaluation means (AVAL) of the watchdog (WDG) is additionally depending on the buffered information items ($Inf_j$ to $Inf_n$) of the shift register (SR).

8. The device according to any one of the preceding features, characterized in that second evaluation means (VAL) are operative, depending on at least one buffered information item ($Inf_j$) of the buffered information items ($Inf_1$ to $Inf_n$) of the shift register (SR), to additionally generate at least one further evaluation, and in that at least one buffered information item ($Inf_j$) of the buffered information items ($Inf_j$ to $Inf_n$) of the shift register (SR) additionally comprises a buffered further evaluation of the second evaluation means (VAL) as a further information portion in addition to said first information portion.

9. The device according to any one of the preceding features, characterized in that the second evaluation means (VAL) is operative, depending on the occurrence of predetermined patterns among at least respectively one information portion of at least two different buffered information items ($Inf_j$, $Inf_k$, with $1 \leq j \leq n$ and $1 \leq k \leq n$ and $j \neq k$) of the buffered information items ($Inf_1$ to $Inf_n$) of the shift register (SR), to generate additionally at least one second further evaluation.

10. The device according to any one of the preceding features, characterized in that, at the end of the predetermined reception time period (b), the first information portions of the buffered information items ($Inf_1$ to $Inf_n$) of the shift register (SR) are set to a value corresponding to "not correct" at the end of the predetermined reception period (b).

11. The device according to any one of the preceding features, characterized in that, at the end of the predetermined reception time period (b), the first information portions of the buffered information items ($Inf_1$ to $Inf_n$) of the shift register (SR) are set to a value corresponding to "correct".

12. The device according to one or more of the preceding features,
comprising an additional second evaluation means (VAL) as part of the watchdog (WDG) for evaluating the n buffered information items ($Inf_1$ to $Inf_n$) of the shift register (SR), and
comprising at least one further shift register ($SR_B$) as part of the watchdog (WDG), and
comprising m further buffered information items ($Inf_{1B}$ to $Inf_{mB}$), which are stored in m further shift register cells, which form the further shift register ($SR_B$), wherein m is a positive integral number greater than 1, and
wherein the m further buffered information items ($Inf_{1B}$ to $Inf_{mB}$) are continuously numbered from 1 to m, and
wherein each of the m further buffered information items ($Inf_{1B}$ to $Inf_{mB}$) has a unique logical further shift register position from m logical further shift register positions which are continuously numbered from 1 to m, and
wherein each of the m further buffered information items ($Inf_{1B}$ to $Inf_{mB}$) comprises at least a first information portion, and optionally can comprise further information portions, and
comprising further evaluation means ($VAL_B$) as part of the watchdog (WDG) for evaluating the further buffered information items ($Inf_{1B}$ to $Inf_{mB}$) of the further shift register ($SR_B$), and
wherein the further shift register ($SR_B$), upon each reception of an answer of the processor (PC),
deletes the m-th buffered information item ($Inf_{mB}$) at the m-th logical further shift register position in a shift register cell of the further shift register ($SR_B$) from this further shift register ($SR_B$), and
shifts each of the (m−1) buffered information items ($Inf_{jB}$) from the respective j-th logical further shift register position ($p_j$, with $1 \leq j \leq (m-1)$) to the (j+1)-th logical further shift register position ($p_j$, with $2 \leq j \leq m$), and
uses at least the result of the further evaluation of the second evaluation means (VAL) at least as a new first portion of the new 1-th further buffered information item ($Inf_{1B}$) or as a new 1-th further buffered information item ($Inf_{1B}$), and
wherein the further evaluation means ($VAL_B$), depending on further buffered information items ($Inf_{jB}$) of the m further buffered information items ($Inf_{1B}$ to $Inf_{mB}$) of the further shift register ($SR_B$), generate a control signal (RES) adapted to change the state of the processor (PC).

13. The device according to one or more of the preceding features,
comprising an additional second evaluation means (VAL) as part of the watchdog (WDG) for evaluating the buffered information items ($Inf_1$ to $Inf_n$) of the shift register (SR),
comprising at least one further shift register ($SR_B$) as part of the watchdog (WDG), and
comprising m further buffered information items ($Inf_{1B}$ to $Inf_{mB}$), which are stored in m further shift register cells, which form the further shift register ($SR_B$), wherein m is a positive integral number, and
wherein the m further buffered information items ($Inf_{1B}$ to $Inf_{mB}$) are continuously numbered from 1 to m, and
wherein each of the m further buffered information items ($Inf_{1B}$ to $Inf_{mB}$) has a unique logical further shift register position from m logical further shift register positions which are continuously numbered from 1 to m, and
wherein each of the m further buffered information items ($Inf_{1B}$ to $Inf_{mB}$) comprises at least a first information portion, and optionally can comprise further information portions, and
comprising an additional second evaluation means (VAL) as part of the watchdog (WDG) for evaluating the n buffered information items ($Inf_1$ to $Inf_n$) of the shift register (SR), and
wherein the further shift register ($SR_B$), at the end of a reception time period (b) or at each end of a reception time period (b),
deletes the m-th further buffered information item ($Inf_{mB}$) at the m-th logical further shift register position in a shift register cell of the further shift register ($SR_B$) from this further shift register ($SR_B$), and
shifts each of the (m−1) buffered information items ($Inf_{jB}$) from the respective j-th logical further shift register position ($p_j$, with $1 \leq j \leq (m-1)$) to the (j+1)-th logical further shift register position ($p_j$, with $2 \leq j \leq m$), and
uses at least the result of the further evaluation of the second evaluation means (VAL) at least as a new first portion of the new 1-th further buffered information item ($Inf_{1B}$) or as a new 1-th further buffered information item ($Inf_{1B}$), and
wherein the further evaluation means ($VAL_B$), depending on further buffered information items ($Inf_{jB}$) of the m further buffered information items ($Inf_{1B}$ to $Inf_{mB}$) of the further shift register ($SR_B$), generate a control signal (RES) adapted to change the state of the processor (PC).

14. The device according to one or more of the preceding features,
comprising an additional second evaluation means (VAL) as part of the watchdog (WDG) for evaluating the n buffered information items ($Inf_1$ to $Inf_n$) of the shift register (SR), and
comprising at least one further shift register ($SR_B$) as part of the watchdog (WDG), and
comprising m further buffered information items ($Inf_{1B}$ to $Inf_{mB}$), which are stored in m further shift register cells, which form the further shift register ($SR_B$), wherein m is a positive integral number, and
wherein the m further buffered information items ($Inf_{1B}$ to $Inf_{mB}$) are continuously numbered from 1 to m, and
wherein each of the m further buffered information items ($Inf_{1B}$ to $Inf_{mB}$) has a unique logical further shift register position from m logical further shift register positions which are continuously numbered from 1 to m, and
wherein each of the m further buffered information items ($Inf_{1B}$ to $Inf_{mB}$) comprises at least a first information portion, and optionally can comprise further information portions, and comprising an additional second evaluation means (VAL) as part of the watchdog (WDG) for evaluating the n buffered information items ($Inf_1$ to $Inf_n$) of the shift register (SR), and wherein the further shift register ($SR_B$), at the end of a predetermined or preset number q of successive reception time periods (b), deletes the m-th further buffered information item ($Inf_{mB}$) at the m-th logical further shift register position in a shift register cell of the further shift register ($SR_B$) from this further shift register ($SR_B$), and shifts each of the (m−1) buffered information items ($Inf_{jB}$) from the respective j-th logical further shift register position ($p_j$, with $1 \leq j \leq (m-1)$) to the (j+1)-th logical further shift register position ($p_h$, with $2 \leq j \leq m$), and uses at least the result of the further evaluation of the second evaluation means (VAL) at least as a new first portion of the new 1-th further buffered information item ($Inf_{1B}$) or as a new 1-th further buffered information item ($Inf_{1B}$), and wherein the further evaluation means ($VAL_B$), depending on further buffered information items of the m further buffered information items ($Inf_{1B}$ to $Inf_{mB}$) of the further shift register ($SR_B$), generate a control signal (RES) adapted to change the state of the processor (PC).

15. The device according to any one of the preceding features, characterized in that, at the end of a number q of successive reception time periods (b), the first information portions of the buffered information items ($Inf_1$ to $Inf_n$) of the shift register (SR) are set to a value corresponding to "not correct".

16. The device according to any one of the preceding features, characterized in that, at the end of a number q of successive reception time periods (b), the first information portions of the buffered information items ($Inf_1$ to $Inf_n$) of the shift register (SR) are set to a value corresponding to "correct".

17. A device for monitoring a processor (PC) in particular according to any one of the preceding features:

comprising a watchdog (WDG) and comprising a clock generator (CTR) as part of the watchdog (WDG), and comprising a result memory (ES) as part of the watchdog (WDG), and comprising n buffered information items ($Inf_1$ to $Inf_n$), which are stored in n result memory cells, which form the result memory (ES), wherein n is a positive integral number greater than 1, and which can be continuously numbered from 1 to n, wherein each of the n buffered information items ($Inf_1$ to $Inf_n$) has a unique logical result memory position from n logical result memory positions which are continuously numbered from 1 to n, and wherein each of the n buffered information items ($Inf_1$ to $Inf_n$) has at least one first information portion and possibly can have further information portions, and comprising first stimulating means (QSTM) as part of the watchdog (WDG) for transmission of messages (MSG) from the watchdog (WDG) to the processor (PC), and comprising first evaluation means (AVAL) as part of the watchdog (WDG) for evaluation of answers (ANS) of the processor PC) to the watchdog (WDG), and wherein the watchdog (WDG) sends messages (MSG) to the processor (PC), that can pertain to the processor (PC) itself and to further system components (SC), and wherein the processor (PC) is operative to transmit answers (ANS) to the watchdog (WDG) depending on these messages (MSG), wherein the watchdog (WDG) is operative, by means of the first evaluation means (AVAL), to assess the answer (ANS) of the processor (PC) as "correct" or "not correct", and wherein an answer (ANS) is "correct"

if its content coincides with at least one possible expected content, and if the answer (ANS) is received by the watchdog (WDG) within a predetermined reception time period (b), and wherein an answer (ANS) is "not correct"

if the content of the answer (ANS) does not coincide with at least one possible expected content, or if the answer (ANS) is not received by the watchdog (WDG) within the predetermined reception time period (b), and wherein the result memory (ES), upon each reception of an answer (ANS) of the processor (PC), deletes a buffered information item (e.g. $Inf_j$) at the j-th logical result memory position in a result memory cell of the result memory (ES) from this result memory (ES), wherein 1 and shifts the remaining (n−1) buffered information items ($Inf_k$), wherein $1 \leq k \leq n$ and $k \neq j$, from the respective k-th result memory position ($p_k$, with $1 \leq k \leq m$ and $k \neq j$) to another logical result memory position ($p_{k'}$, with $k' \neq k$ and $1 \leq k' \leq n$), and uses, in correspondence to a logical value for "correct" or for "not correct", at least the result of the evaluation of the received answer (ANS) by the processor (PC) at least as new first portion of the j-th buffered information item (e.g. $Inf_j$) at the logical result memory position into which none of the remaining (n−1) buffered information items has been shifted.

18. The method in particular according to any one of the preceding features, comprising an additional second evaluation means (VAL) as part of the watchdog (WDG) for evaluating the buffered information items ($Inf_1$ to $Inf_n$) of the shift register (SR), wherein the second evaluation means (VAL), depending on buffered information items of the n buffered information items ($Inf_1$ to $Inf_m$) of the result memory cells of the result memory (ES), generate at least one control signal (RES) adapted to change the state of the processor (PC), or generate a signal from which such a control signal (RES) is derived.

19. The device in particular according to any one of the preceding features, comprising further monitorable system components (SC) as part of the processor.

20. The method in particular according to any one of the preceding features, wherein to a first expected answer (ANS1), there is assigned, by the first evaluation means (AVAL), a predetermined first reception time period (b1) as predetermined reception time period (b) for the evaluation of the first expected answer (ANS1) after reception by the watchdog (WDG) as answer (ANS), and wherein to a first expected answer (ANS2), there is assigned, by the first evaluation means (AVAL), a predetermined second reception time period (b2) as predetermined reception time period (b) for the evaluation of the second expected answer (ANS2) after reception by the watchdog (WDG) as answer (ANS), and wherein the predetermined first reception time period (b1) and the predetermined second reception time period (b2) are different and overlap each other, and wherein the predetermined first reception time period (b1) has no effect for the evaluation of the second answer (ANS2), and wherein the predetermined second reception time period (b2) has no effect for the evaluation of the first answer (ANS1).

21. The device in particular according to any one of the preceding features, comprising further monitorable system components (SC) as part of the processor.

22. The method in particular according to any one of the preceding features, wherein the watchdog (WDG) is operative, by means of the first evaluation means (AVAL), to assess the answer (ANS) of the processor (PC) as "correct" or "not correct", and wherein an answer (ANS) is additionally "correct"

if, within the predetermined reception time period (b), the number of answers (ANS) received by the watchdog (WDG) does not exceed, due to the received answer (ANS), a predetermined maximal number of to-be-received answers (ANS) or, at the end of the predetermined reception time period (b), does not fall short of a predetermined minimal number of to-be-received answers (ANS), and wherein an answer (ANS) is additionally "not correct"

if, within the predetermined reception time period (b), the number of the answers (ANS) received by the watchdog (WDG) exceeds, due to the received answer (ANS), a predetermined maximal number of to-be-received answers (ANS) or falls short of a predetermined minimal number of to-be-received answers (ANS).

23. The device in particular according to any one of the preceding features, characterized in that the evaluation of the answer (ANS) of the processor by the first evaluation means (AVAL) of the watchdog (WDG) is additionally depending on at least one buffered information item ($Inf_j$) of the buffered information items ($Inf_j$ to $Inf_n$) of the result memory (ES).

24. The device according to any one of the preceding features, characterized in that the evaluation of the answer (ANS) of the processor by the first evaluation means (AVAL) of the watchdog (WDG) is additionally depending on the buffered information items ($Inf_j$ to $Inf_n$) of the result memory (ES).

25. The device in particular according to any one of the preceding features, characterized in that a second evaluation means (VAL) are operative, depending on at least one buffered information item ($Inf_j$) of the buffered information items ($Inf_1$ to $Inf_n$) of the result memory (ES), to additionally generate at least one further evaluation, and in that at least one buffered information item ($Inf_j$) of the buffered information items ($Inf_j$ to $Inf_n$) of the result memory (ES) additionally comprises a buffered further evaluation of the second evaluation means (VAL) as a further information portion in addition to said first information portion.

26. The device in particular according to any one of the preceding features, characterized in that the second evaluation means (VAL) is operative, depending on the occurrence of predetermined patterns among at least respectively one information portion of at least two different buffered information items ($Inf_j$, $Inf_k$, with $1 \le j \le n$ and $1 \le k \le n$ and $j \ne k$) of the buffered information items ($Inf_1$ to $Inf_n$) of the result memory (ES), to generate additionally at least one further evaluation.

27. The device in particular according to any one of the preceding features, characterized in that, at the end of the predetermined reception time period (b), the first information portions of the buffered information items ($Inf_1$ to $Inf_n$) of the result memory (ES) are set to a value corresponding to "not correct".

28. The device in particular according to any one of the preceding features, characterized in that, at the end of the predetermined reception time period (b), the first information portions of the buffered information items ($Inf_1$ to $Inf_n$) of the result memory (ES) are set to a value corresponding to "correct".

29. The device according to one or more of the preceding features, comprising an additional second evaluation means (VAL) as part of the watchdog (WDG) for evaluating the n buffered information items ($Inf_1$ to $Inf_n$) of the result memory (ES), and comprising at least one further result memory ($ES_B$) as part of the watchdog (WDG), and comprising m further buffered information items ($Inf_{1B}$ to $Inf_{mB}$), which are stored in m further result memory cells, which form the further result memory ($ES_B$), wherein m is a positive integral number greater than 1, and wherein the m further buffered information items ($Inf_{1B}$ to $Inf_{mB}$) are continuously numbered from 1 to m, and wherein each of the m further buffered information items ($Inf_{1B}$ to $Inf_{mB}$) has a unique logical further result memory position from m logical further result memory positions which are continuously numbered from 1 to m, wherein each of the m further buffered information items ($Inf_{1B}$ to $Inf_{mB}$) comprises at least a first information portion, and optionally can comprise further information portions, and comprising further evaluation means ($VAL_B$) as part of the watchdog (WDG) for evaluating the further buffered information items ($Inf_{1B}$ to $Inf_{mB}$) of the further result memory ($ES_B$), and wherein the further result memory ($ES_B$), upon each reception of an answer of the processor (PC), deletes the j-th further buffered information item ($Inf_{jB}$) at the j-th logical further result memory position in a result memory cell of the further result memory ($ES_B$) from the further result memory ($ES_B$), wherein and shifts each of the (m−1) buffered information items ($Inf_{kB}$), wherein $1 \le k \le m$ and $k \ne j$, from the respective k-th logical further result memory position ($p_k$, with $1 \le k \le m$ and $k \ne j$) to another logical further result memory position ($p_{k'}$, with $k' \ne k$ and $1 \le k' \le m$), and uses at least the result of the further evaluation of the second evaluation means (VAL) at least as a new first portion of the j'-th further buffered information item ($Inf_{j'B}$) or as a new j'-th further buffered information item ($Inf_{j'B}$) at the logical further result memory position into which none of the remaining (m−1) buffered further information items has been shifted, and wherein the further evaluation means ($VAL_B$), depending on further buffered information items of the m further buffered information items ($Inf_{1B}$ to $Inf_{mB}$) of the further shift register ($SR_B$), generate a control signal (RES) adapted to change the state of the processor (PC).

30. The device according to one or more of the preceding features,
comprising an additional second evaluation means (VAL) as part of the watchdog (WDG) for evaluating the buffered information items ($Inf_1$ to $Inf_n$) of the result memory (ES),
comprising at least one further result memory ($ES_B$) as part of the watchdog (WDG), and
comprising m further buffered information items ($Inf_{1B}$ to $Inf_{mB}$), which are stored in m further result memory cells, which form the further result memory ($ES_B$),
wherein m is a positive integral number, and
wherein the m further buffered information items ($Inf_{1B}$ to $Inf_{mB}$) are continuously numbered from 1 to m, and
wherein each of the m further buffered information items ($Inf_{1B}$ to $Inf_{mB}$) has a unique logical further result memory position from m further result memory positions which are continuously numbered from 1 to m, and
wherein each of the m further buffered information items ($Inf_{1B}$ to $Inf_{mB}$) comprises at least a first information portion, and optionally can comprise further information portions, and
comprising further evaluation means ($VAL_B$) as part of the watchdog (WDG) for evaluating the further buffered information items ($Inf_{1B}$ to $Inf_{mB}$) of the further result memory ($ES_B$), and
wherein the further result memory ($ES_B$), at the end of a reception time period (b) or at each end of a reception time period (b),
deletes the j-th further buffered information item ($Inf_{jB}$) at the j-th logical further result memory position in a result memory cell of the further result memory ($ES_B$) from the further result memory ($ES_B$), wherein and
shifts each of the (m−1) buffered information items ($Inf_{kB}$), wherein $1 \leq k \leq m$ and $k \neq j$, from the respective k-th logical further result memory position ($p_k$, with $1 \leq k \leq m$ and $k \neq j$) to another logical further result memory position ($p_{k'}$, with $k' \neq k$ and $1 \leq k' \leq m$), and
uses at least the result of the further evaluation of the second evaluation means (VAL) at least as a new first portion of the j'-th further buffered information item ($Inf_{j'B}$) or as a new j'-th further buffered information item ($Inf_{j'B}$) at the logical further result memory position into which none of the remaining (m−1) buffered further information items has been shifted, and
wherein the further evaluation means ($VAL_B$), depending on further buffered information items of the m further buffered information items ($Inf_{1B}$ to $Inf_{mB}$) of the further shift register ($SR_B$), generate a control signal (RES) adapted to change the state of the processor (PC).

31. The device according to one or more of the preceding features,
comprising an additional second evaluation means (VAL) as part of the watchdog (WDG) for evaluating the buffered information items ($Inf_1$ to $Inf_n$) of the result memory (ES), and
comprising at least one further result memory ($ES_B$) as part of the watchdog (WDG), and
comprising m further buffered information items ($Inf_{1B}$ to $Inf_{mB}$), which are stored in m further result memory cells, which form the further result memory ($ES_B$),
wherein m is a positive integral number, and
wherein the m further buffered information items ($Inf_{1B}$ to $Inf_{mB}$) are continuously numbered from 1 to m, and
wherein each of the m further buffered information items ($Inf_{1B}$ to $Inf_{mB}$) has a unique logical further result memory position from m further result memory positions which are continuously numbered from 1 to m, and
wherein each of the m further buffered information items ($Inf_{1B}$ to $Inf_{mB}$) comprises at least a first information portion, and optionally can comprise further information portions, and
comprising further evaluation means ($VAL_B$) as part of the watchdog (WDG) for evaluating the further buffered information items ($Inf_{1B}$ to $Inf_{mB}$) of the further result memory ($ES_B$), and
wherein, in the further result memory ($ES_B$), at the end of a predetermined or preset number q of successive reception time periods (b),
deletes the j-th further buffered information item ($Inf_{jB}$) at the j-th logical further result memory position in a result memory cell of the further result memory ($ES_B$) from the further result memory ($ES_B$), wherein and
shifts each of the (m−1) buffered information items ($Inf_{kB}$), wherein $1 \leq k \leq m$ and $k \neq j$, from the respective k-th logical further result memory position ($p_k$, with $1 \leq k \leq m$ and $k \neq j$) to another logical further result memory position ($p_{k'}$, with $k' \neq k$ and $1 \leq k' \leq m$), and
uses at least the result of the further evaluation of the second evaluation means (VAL) at least as a new first portion of the j'-th further buffered information item ($Inf_{j'B}$) or as a new j'-th further buffered information item ($Inf_{j'B}$) at the logical further result memory position into which none of the remaining (m−1) buffered further information items has been shifted, and
wherein the further evaluation means ($VAL_B$), depending on further buffered information items of the m further buffered information items ($Inf_{1B}$ to $Inf_{mB}$) of the further shift register ($SR_B$), generate a control signal (RES) adapted to change the state of the processor (PC).

32. The device in particular according to any one of the preceding features, characterized in that, at the end of a number q of successive reception time periods (b), the first information portions of the buffered information items ($Inf_1$ to $Inf_n$) of the result memory (ES) are set to a value corresponding to "not correct".

33. The device in particular according to any one of the preceding features, characterized in that, at the end of a number q of successive reception time periods (b), the first information portions of the buffered information items ($Inf_1$ to $Inf_n$) of the result memory (ES) are set to a value corresponding to "correct".

34. A device for monitoring a processor (PC) in particular according to any one of the preceding features,
comprising a watchdog (WDG) and
comprising a clock generator (CTR) as part of the watchdog (WDG), and comprising a shift register (SR) as part of the watchdog (WDG), and comprising n buffered information items ($Inf_1$ to $Inf_n$), which are stored in n shift register cells, which form the shift register (SR), wherein n is a positive integral number greater than 1, and which can be continuously numbered from 1 to n, wherein each of the n buffered information items ($Inf_1$ to $Inf_n$) has a unique logical shift register position from n shift register positions which are continuously numbered from 1 to n, and wherein each of the n buffered information items ($Inf_1$ to $Inf_n$) has at least one first information portion and possibly can have further information portions, and comprising first stimulating means (QSTM) as part of the watchdog (WDG) for transmission of messages (MSG) from the watchdog (WDG) to the processor (PC), and comprising first evaluation means (AVAL) as part of the watchdog (WDG) for evaluation of answers (ANS) of the processor PC) to the watchdog (WDG), and wherein the watchdog (WDG) sends messages (MSG) to the processor (PC), that can pertain to the processor (PC) itself and to further system components (SC), and wherein the processor (PC) is operative to transmit answers (ANS) to the watchdog (WDG) depending on these messages (MSG), wherein the watchdog (WDG) is operative, by means of the first evaluation means (AVAL), to assess the answer (ANS) of the processor (PC) as "correct" or "not correct", and wherein an answer (ANS) is "correct"

if its content coincides with at least one possible expected content, and if the answer (ANS) is received by the watchdog (WDG) within a predetermined reception time period (b), and wherein an answer (ANS) is "not correct"

if the content of the answer (ANS) does not coincide with at least one possible expected content, or if the answer (ANS) is not received by the watchdog (WDG) within the predetermined reception time period (b), and wherein the shift register (SR), at least at the end of the predetermined reception time period (b) or at each end of a predetermined reception time period (b), deletes the n-th buffered information item ($Inf_n$) at the n-th logical shift register position in a shift register cell of the shift register (SR) from this shift register (SR), and shifts each of the (n−1) buffered information items from the respective j-th logical shift register position ($p_j$, with $1 \leq j \leq (n-1)$) to the (j+1)-th logical shift register position ($p_j$, with $2 \leq j \leq n$), and uses, in correspondence to a logical value for "correct" or for "not correct", at least the result of the evaluation of the received answer (ANS) by the processor (PC) at least as a new first portion of the new 1-th buffered information item ($Inf_1$).

35. The method in particular according to any one of the preceding features, comprising an additional second evaluation means (VAL) as part of the watchdog (WDG) for evaluating the buffered information items ($Inf_1$ to $Inf_n$) of the shift register (SR), wherein the second evaluation means (VAL), depending on buffered information items of the n buffered information items ($Inf_1$ to $Inf_m$) in the memory cells of the shift register (SR) generate at least one control signal (RES) adapted to change the state of the processor (PC), or generate a signal from which such a control signal (RES) is derived.

36. The device in particular according to any one of the preceding features, comprising further monitorable system components (SC) as part of the processor.

37. The method in particular according to any one of the preceding features, wherein to a first expected answer (ANS1), there is assigned, by the first evaluation means (AVAL), a predetermined first reception time period (b1) as predetermined reception time period (b) for the evaluation of the first expected answer (ANS1) after reception by the watchdog (WDG) as answer (ANS), and wherein to a first expected answer (ANS2), there is assigned, by the first evaluation means (AVAL), a predetermined second reception time period (b2) as predetermined reception time period (b) for the evaluation of the second expected answer (ANS2) after reception by the watchdog (WDG) as answer (ANS), and wherein the predetermined first reception time period (b1) and the predetermined second reception time period (b2) are different and overlap each other, and wherein the predetermined first reception time period (b1) has no effect for the evaluation of the second answer (ANS2), and wherein the predetermined second reception time period (b2) has no effect for the evaluation of the first answer (ANS1).

38. The device in particular according to any one of the preceding features, wherein the watchdog (WDG) is operative, by means of the first evaluation means (AVAL), to assess the answer (ANS) of the processor (PC) as "correct" or "not correct", and wherein an answer (ANS) is additionally "correct"

if, within the predetermined reception time period (b), the number of answers (ANS) received by the watchdog (WDG) does not exceed, due to the received answer (ANS), a predetermined maximal number of to-be-received answers (ANS) or, at the end of the predetermined reception time period (b), does not fall short of a predetermined minimal number of to-be-received answers (ANS), and wherein an answer (ANS) is additionally "not correct"

if, within the predetermined reception time period (b), the number of the answers (ANS) received by the watchdog (WDG) exceeds, due to the received answer (ANS), a predetermined maximal number of to-be-received answers (ANS) or, at the end of the predetermined reception time period (b), falls short of a predetermined minimal number of to-be-received answers (ANS).

39. The device in particular according to any one of the preceding features, characterized in that the evaluation of the answer (ANS) of the processor by the first evaluation means (AVAL) of the watchdog (WDG) is additionally depending on at least one buffered information item ($Inf_j$) of the buffered information items ($Inf_j$ to $Inf_n$) of the shift register (SR).

40. The device in particular according to any one of the preceding features, characterized in that the evaluation of the answer (ANS) of the processor by the first evaluation means (AVAL) of the watchdog (WDG) is additionally depending on the buffered information items ($Inf_j$ to $Inf_n$) of the shift register (SR).

41. The device in particular according to any one of the preceding features, characterized in that
   a second evaluation means (VAL) are operative, depending on at least one buffered information item ($Inf_j$) of the buffered information items ($Inf_1$ to $Inf_n$) of the shift register (SR), to additionally generate at least one further evaluation, and
   in that at least one buffered information item ($Inf_j$) of the buffered information items ($Inf_j$ to $Inf_n$) of the shift register (SR) additionally comprises a buffered further evaluation of the second evaluation means (VAL) as a further information portion in addition to said first information portion.

42. The device in particular according to any one of the preceding features, characterized in that the second evaluation means (VAL) is operative, depending on the occurrence of predetermined patterns among at least respectively one information portion of at least two different buffered information items ($Inf_j$, $Inf_k$, with $1 \leq j \leq n$ and $1 \leq k \leq n$ and $j \neq k$) of the buffered information items ($Inf_1$ to $Inf_n$) of the shift register (SR), to additionally generate at least one second further evaluation.

43. The device in particular according to any one of the preceding features, characterized in that, at the end of the predetermined reception time period (b), the first information portions of the buffered information items ($Inf_1$ to $Inf_n$) of the shift register (SR) are set to a value corresponding to "not correct".

44. The device in particular according to any one of the preceding features, characterized in that, at the end of the predetermined reception time period (b), the first information portions of the buffered information items ($Inf_1$ to $Inf_n$) of the shift register (SR) are set to a value corresponding to "correct".

45. The device according to one or more of the preceding features,
   comprising an additional second evaluation means (VAL) as part of the watchdog (WDG) for evaluating the buffered information items ($Inf_1$ to $Inf_n$) of the shift register (SR), and
   comprising at least one further shift register ($SR_B$) as part of the watchdog (WDG), and
   comprising m further buffered information items ($Inf_{1B}$ to $Inf_{mB}$), which are stored in m further shift register cells, which form the further shift register ($SR_B$), wherein m is a positive integral number greater than 1, and
      wherein the m further buffered information items ($Inf_{1B}$ to $Inf_{mB}$) are continuously numbered from 1 to m, and
      wherein each of the m further buffered information items ($Inf_{1B}$ to $Inf_{mB}$) has a unique logical further shift register position from m logical further shift register positions which are continuously numbered from 1 to m, and
      wherein each of the m further buffered information items ($Inf_{1B}$ to $Inf_{mB}$) comprises at least a first information portion, and optionally can comprise further information portions, and
   comprising an additional second evaluation means (VAL) as part of the watchdog (WDG) for evaluating the n buffered information items ($Inf_1$ to $Inf_n$) of the shift register (SR), and
   wherein the further shift register ($SR_B$), upon each reception of an answer of the processor (PC),
      deletes the m-th further buffered information item ($Inf_{nB}$) at the m-th logical further shift register position in a shift register cell of the further shift register ($SR_B$) from this further shift register ($SR_B$), and
      shifts each of the (m−1) buffered information items ($Inf_{jB}$) from the respective j-th logical further shift register position ($p_j$, with $1 \leq j \leq (m-1)$) to the (j+1)-th logical further shift register position ($p_j$, with $2 \leq j \leq m$), and
      uses at least the result of the further evaluation of the second evaluation means (VAL) at least as a new first portion of the new 1-th further buffered information item ($Inf_{1B}$) or as a new 1-th further buffered information item ($Inf_{1B}$), and
   wherein the further evaluation means ($VAL_B$), depending on further buffered information items of the m further buffered information items ($Inf_{1B}$ to $Inf_{mB}$) of the further shift register ($SR_B$), generate a control signal (RES) adapted to change the state of the processor (PC).

46. The device according to one or more of the preceding features,
   comprising an additional second evaluation means (VAL) as part of the watchdog (WDG) for evaluating the buffered information items ($Inf_1$ to $Inf_n$) of the shift register (SR),
   comprising at least one further shift register ($SR_B$) as part of the watchdog (WDG), and
   comprising m further buffered information items ($Inf_{1B}$ to $Inf_{mB}$), which are stored in m further shift register cells, which form the further shift register ($SR_B$), wherein m is a positive integral number, and
      wherein the m further buffered information items ($Inf_{1B}$ to $Inf_{mB}$) are continuously numbered from 1 to m, and
      wherein each of the m further buffered information items ($Inf_{1B}$ to $Inf_{mB}$) has a unique logical further shift register position from m logical further shift register positions which are continuously numbered from 1 to m, and
      wherein each of the m further buffered information items ($Inf_{1B}$ to $Inf_{mB}$) comprises at least a first information portion, and optionally can comprise further information portions, and
   comprising an additional second evaluation means (VAL) as part of the watchdog (WDG) for evaluating the n buffered information items ($Inf_1$ to $Inf_n$) of the shift register (SR), and
   wherein the further shift register ($SR_B$), at the end of a reception time period (b) or at each end of a reception time period (b),
      deletes the m-th further buffered information item ($Inf_{mB}$) at the m-th logical further shift register position in a shift register cell of the further shift register ($SR_B$) from this further shift register ($SR_B$), and
      shifts each of the (m−1) buffered information items ($Inf_{jB}$) from the respective j-th logical further shift register position ($p_j$, with $1 \leq j \leq (m-1)$) to the (j+1)-th logical further shift register position ($p_j$, with $2 \leq j \leq m$), and
      uses at least the result of the further evaluation of the second evaluation means (VAL) at least as a new first portion of the new 1-th further buffered information item ($Inf_{1B}$) or as a new 1-th further buffered information item ($Inf_{1B}$), and wherein the further evaluation means (VAL$_B$), depending on further buffered information items of the m further buffered information items (Inf$_{1B}$ to Inf$_{mB}$) of the further shift register (SR$_B$), generate a control signal (RES) adapted to change the state of the processor (PC).

47. The device according to one or more of the preceding features,
comprising an additional second evaluation means (VAL) as part of the watchdog (WDG) for evaluating the n buffered information items (Inf$_1$ to Inf$_n$) of the shift register (SR), and
comprising at least one further shift register (SR$_B$) as part of the watchdog (WDG), and
comprising m further buffered information items (Inf$_{1B}$ to Inf$_{mB}$), which are stored in m further shift register cells, which form the further shift register (SR$_B$), wherein m is a positive integral number, and
wherein the m further buffered information items (Inf$_{1B}$ to Inf$_{mB}$) are continuously numbered from 1 to m, and
wherein each of the m further buffered information items (Inf$_{1B}$ to Inf$_{mB}$) has a unique logical further shift register position from m logical further shift register positions which are continuously numbered from 1 to m, and
wherein each of the m further buffered information items (Inf$_{1B}$ to Inf$_{mB}$) comprises at least a first information portion, and optionally can comprise further information portions, and
comprising an additional second evaluation means (VAL) as part of the watchdog (WDG) for evaluating the n buffered information items (Inf$_1$ to Inf$_n$) of the shift register (SR), and
wherein the further shift register (SR$_B$), at the end of a predetermined or preset number q of successive reception time periods (b),
deletes the m-th further buffered information item (Inf$_{mB}$) at the m-th logical further shift register position in a shift register cell of the further shift register (SR$_B$) from this further shift register (SR$_B$), and
shifts each of the (m−1) buffered information items (Inf$_{jB}$) from the respective j-th logical further shift register position (p$_j$, with 1≤j≤(m−1)) to the (j+1)-th logical further shift register position (p$_j$, with 2≤j≤m), and
uses at least the result of the further evaluation of the second evaluation means (VAL) at least as a new first portion of the new 1-th further buffered information item (Inf$_{1B}$) or as a new 1-th further buffered information item (Inf$_{1B}$), and
wherein the further evaluation means (VAL$_B$), depending on further buffered information items of the m further buffered information items (Inf$_{1B}$ to Inf$_{mB}$) of the further shift register (SR$_B$), generate a control signal (RES) adapted to change the state of the processor (PC).

48. The device in particular according to any one of the preceding features, characterized in that, at the end of a number q of successive reception time periods (b), the first information portions of the buffered information items (Inf$_1$ to Inf$_n$) of the shift register (SR) are set to a value corresponding to "not correct".

49. The device in particular according to any one of the preceding features, characterized in that, at the end of a number q of successive reception time periods (b), the first information portions of the buffered information items (Inf$_1$ to Inf$_n$) of the shift register (SR) are set to a value corresponding to "correct".

50. A device for monitoring a processor (PC) in particular according to any one of the preceding features,
comprising a watchdog (WDG) and
comprising a clock generator (CTR) as part of the watchdog (WDG), and
comprising a result memory (ES) as part of the watchdog (WDG), and
comprising n buffered information items (Inf$_1$ to Inf$_n$), which form the result memory (ES), wherein n is a positive integral number greater than 1, and
which can be continuously numbered from 1 to n,
wherein each of the n buffered information items (Inf$_1$ to Inf$_n$) has a unique result memory position from n result memory positions which can be continuously numbered from 1 to n, and
wherein each of the n buffered information items (Inf$_1$ to Inf$_n$) has at least one first information portion and possibly can have further information portions, and
comprising first stimulating means (QSTM) as part of the watchdog (WDG) for transmission of messages (MSG) from the watchdog (WDG) to the processor (PC), and
comprising first evaluation means (AVAL) as part of the watchdog (WDG) for evaluation of answers (ANS) of the processor PC) to the watchdog (WDG), and
wherein the watchdog (WDG) is operative to send messages (MSG) to the processor (PC),
that can pertain to the processor (PC) itself and to further system components (SC), and
wherein the processor (PC) is operative to transmit answers (ANS) to the watchdog (WDG) depending on these messages (MSG),
wherein the watchdog (WDG) is operative, by means of the first evaluation means (AVAL), to assess the answer (ANS) of the processor (PC) as "correct" or "not correct", and
wherein an answer (ANS) is "correct"
if its content is correct and
if the answer (ANS) is received by the watchdog (WDG) within a predetermined reception time period (b), and
wherein an answer (ANS) is "not correct"
if the content of the answer (ANS) is not correct or
if the answer (ANS) is not received by the watchdog (WDG) within the predetermined reception time period (b), and
wherein the result memory (ES), at the end of the predetermined reception time period (b) or at each end of the predetermined reception time period (b),
deletes a buffered information item (e.g. Inf$_n$) from the result memory (ES), and
shifts the remaining (n−1) buffered information items from the original result memory position to another result memory position, and
uses, in correspondence to a logical value for "correct" or for "not correct", at least the result of the evaluation of the received answer (ANS) by the processor (PC) at least as new first portion of the new buffered information item (e.g. Inf$_1$) at the result memory position into which none of the remaining (n−1) buffered information items has been shifted.

51. The device in particular according to any one of the preceding features, comprising an additional second evaluation means (VAL) as part of the watchdog (WDG) for evaluating the buffered information items ($Inf_1$ to $Inf_n$) of the shift register (SR), wherein the second evaluation means (VAL), depending on the content of the shift register (SR) generate at least one control signal (RES) adapted to change the state of the processor (PC), or generate a signal from which such a control signal (RES) is derived.

52. The device in particular according to any one of the preceding features, wherein the processor (PC) is connectable to the watchdog for monitoring.

53. The device in particular according to any one of the preceding features, comprising further monitorable system components (SC) as part of the processor.

54. The method in particular according to any one of the preceding features, wherein to a first expected answer (ANS1), there is assigned, by the first evaluation means (AVAL), a predetermined first reception time period (b1) as predetermined reception time period (b) for the evaluation of the first expected answer (ANS1) after reception by the watchdog (WDG) as answer (ANS), and wherein to a first expected answer (ANS2), there is assigned, by the first evaluation means (AVAL), a predetermined first reception time period (b2) as predetermined reception time period (b) for the evaluation of the second expected answer (ANS2) after reception by the watchdog (WDG) as answer (ANS), and wherein the predetermined first reception time period (b1) and the predetermined second reception time period (b2) are different and overlap each other, and wherein the predetermined first reception time period (b1) has no effect for the evaluation of the second answer (ANS2), and wherein the predetermined second reception time period (b2) has no effect for the evaluation of the first answer (ANS1).

55. The device in particular according to any one of the preceding features, wherein the watchdog (WDG) is operative, by means of the first evaluation means (AVAL), to assess the answer (ANS) of the processor (PC) as "correct" or "not correct", and wherein an answer (ANS) is additionally "correct"
if, within the predetermined reception time period (b), the number of answers (ANS) received by the watchdog (WDG) does not exceed, due to the received answer (ANS), a maximal number of to-be-received answers (ANS) or, at the end of the predetermined reception time period (b), does not fall short of a predetermined minimal number of to-be-received answers (ANS), and wherein an answer (ANS) is additionally "not correct"
if, within the predetermined reception time period (b), the number of the answers (ANS) received by the watchdog (WDG) exceeds, due to the received answer (ANS), a predetermined maximal number of to-be-received answers (ANS) or, at the end of the predetermined reception time period (b), falls short of a predetermined minimal number of to-be-received answers (ANS).

56. The device in particular according to any one of the preceding features, characterized in that the evaluation of the answer (ANS) of the processor by the first evaluation means (AVAL) of the watchdog (WDG) is additionally depending on at least one buffered information item ($Inf_j$) of the buffered information items ($Inf_j$ to $Inf_n$) of the shift register (SR).

57. The device in particular according to any one of the preceding features, characterized in that the evaluation of the answer (ANS) of the processor by the first evaluation means (AVAL) of the watchdog (WDG) is additionally depending on the buffered information items ($Inf_j$ to $Inf_n$) of the shift register (SR).

58. The device in particular according to any one of the preceding features, characterized in that
a second evaluation means (VAL) are operative, depending on at least one buffered information item ($Inf_j$) of the buffered information items ($Inf_1$ to $Inf_n$) of the shift register (SR), to additionally generate at least one further evaluation, and in that at least one buffered information item ($Inf_j$) of the buffered information items ($Inf_j$ to $Inf_n$) of the shift register (SR) additionally comprises a buffered further evaluation of the second evaluation means (VAL).

59. The device in particular according to any one of the preceding features, characterized in that the second evaluation means (VAL) is operative, depending on the occurrence of predetermined patterns among at least respectively one portion of at least two different buffered information items ($Inf_j$, $Inf_k$, with $1 \le j \le n$ and $1 \le k \le n$ and $j \ne k$) of the buffered information items ($Inf_1$ to $Inf_n$) of the shift register (SR), to additionally generate at least one second further evaluation.

60. The device in particular according to any one of the preceding features, characterized in that, at the end of the predetermined reception time period (b), the first information portions of the buffered information items ($Inf_1$ to $Inf_n$) of the shift register (SR) are set to a value corresponding to "not correct".

61. The device in particular according to any one of the preceding features, characterized in that, at the end of the predetermined reception time period (b), the first information portions of the buffered information items ($Inf_1$ to $Inf_n$) of the shift register (SR) are set to a value corresponding to "correct".

62. The device according to one or more of the preceding features, comprising an additional second evaluation means (VAL) as part of the watchdog (WDG) for evaluating the buffered information items ($Inf_1$ to $Inf_n$) of the shift register (SR), and comprising at least one further shift register ($SR_B$) as part of the watchdog (WDG), and comprising m further buffered information items ($Inf_{1B}$ to $Inf_{mB}$), which form the further shift register ($SR_B$), wherein m is a positive integral number greater than 1, and wherein the m further buffered information items ($Inf_{1B}$ to $Inf_{mB}$) are continuously numbered from 1 to m, and wherein each of the m further buffered information items ($Inf_{1B}$ to $Inf_{mB}$) has a unique logical shift register position from m shift register positions which are continuously numbered from 1 to m, and wherein each of the m further buffered information items ($Inf_{1B}$ to $Inf_{mB}$) comprises at least a first information portion, and optionally can comprise further information portions, and comprising an additional second evaluation means (VAL) as part of the watchdog (WDG) for evaluating the n buffered information items ($Inf_1$ to $Inf_n$) of the shift register (SR), and wherein the further shift register ($SR_B$), upon each reception of an answer of the processor (PC), deletes the m-th further buffered information item ($Inf_{nB}$) from the further shift register ($SR_B$), and shifts each of the (m−1) buffered information items ($Inf_{jB}$) from the respective j-th shift register position ($p_h$ with $1 \leq j \leq (m-1)$) to the (j+1)-th shift register position ($p_j$, with $2 \leq j \leq m$), and uses at least the result of the further evaluation of the second evaluation means (VAL) at least as a new first portion of the new 1-th further buffered information item ($Inf_{1B}$) or as a new 1-th further buffered information item ($Inf_{1B}$), and wherein the further evaluation means ($VAL_B$), depending on further buffered information items ($Inf_{jB}$) of the m further buffered information items ($Inf_{1B}$ to $Inf_{mB}$) of the further shift register ($SR_B$), generate a control signal (RES) adapted to change the state of the processor (PC).

63. The device according to one or more of the preceding features, comprising an additional second evaluation means (VAL) as part of the watchdog (WDG) for evaluating the buffered information items ($Inf_1$ to $Inf_n$) of the shift register (SR), comprising at least one further shift register ($SR_B$) as part of the watchdog (WDG), and comprising m further buffered information items ($Inf_{1B}$ to $Inf_{mB}$), which form the further shift register ($SR_B$), wherein m is a positive integral number, and wherein the m further buffered information items ($Inf_{1B}$ to $Inf_{mB}$) are continuously numbered from 1 to m, and wherein each of the m further buffered information items ($Inf_{1B}$ to $Inf_{mB}$) has a unique logical shift register position from m shift register positions which are continuously numbered from 1 to m, and wherein each of the m further buffered information items ($Inf_{1B}$ to $Inf_{mB}$) comprises at least a first information portion, and optionally can comprise further information portions, and comprising an additional second evaluation means (VAL) as part of the watchdog (WDG) for evaluating the n buffered information items ($Inf_1$ to $Inf_n$) of the shift register (SR), and wherein the further shift register ($SR_B$), at the end of a reception time period (b) or at each end of a reception time period (b), deletes the m-th further buffered information item ($Inf_{nB}$) from the further shift register ($SR_B$), and shifts each of the (m−1) buffered information items ($Inf_{jB}$) from the respective j-th shift register position ($p_j$, with $1 \leq j \leq (m-1)$) to the (j+1)-th shift register position ($p_j$, with $2 \leq j \leq m$), and uses at least the result of the further evaluation of the second evaluation means (VAL) at least as a new first portion of the new 1-th further buffered information item ($Inf_{1B}$) or as a new 1-th further buffered information item ($Inf_{1B}$), and wherein the further evaluation means ($VAL_B$), depending on further buffered information items ($Inf_{jB}$) of the m further buffered information items ($Inf_{1B}$ to $Inf_{mB}$) of the further shift register ($SR_B$), generate a control signal (RES) adapted to change the state of the processor (PC).

64. The device according to one or more of the preceding features, comprising an additional second evaluation means (VAL) as part of the watchdog (WDG) for evaluating the buffered information items ($Inf_1$ to $Inf_n$) of the shift register (SR), and comprising at least one further shift register ($SR_B$) as part of the watchdog (WDG), and comprising m further buffered information items ($Inf_{1B}$ to $Inf_{mB}$), which form the further shift register ($SR_B$), wherein m is a positive integral number, and wherein the m further buffered information items ($Inf_{1B}$ to $Inf_{mB}$) are continuously numbered from 1 to m, and wherein each of the m further buffered information items ($Inf_{1B}$ to $Inf_{mB}$) has a unique logical shift register position from m shift register positions which are continuously numbered from 1 to m, and wherein each of the m further buffered information items ($Inf_{1B}$ to $Inf_{mB}$) comprises at least a first information portion, and optionally can comprise further information portions, and comprising an additional second evaluation means (VAL) as part of the watchdog (WDG) for evaluating the n buffered information items ($Inf_1$ to $Inf_n$) of the shift register (SR), and wherein the further shift register ($SR_B$), at the end of a predetermined or preset number q of successive reception time periods (b), deletes the m-th further buffered information item ($Inf_{nB}$) from the further shift register ($SR_B$), and shifts each of the (m−1) buffered information items ($Inf_{jB}$) from the respective j-th shift register position ($p_j$, with $1 \leq j \leq (m-1)$) to the (j+1)-th shift register position ($p_j$, with $2 \leq j \leq m$), and uses at least the result of the further evaluation of the second evaluation means (VAL) at least as a new first portion of the new 1-th further buffered information item ($Inf_{1B}$) or as a new 1-th further buffered information item ($Inf_{1B}$), and wherein the further evaluation means ($VAL_B$), depending on further buffered information items ($Inf_{jB}$) of the m further buffered information items ($Inf_{1B}$ to $Inf_{mB}$) of the further shift register ($SR_B$), generate a control signal (RES) adapted to change the state of the processor (PC).

65. The device in particular according to any one of the preceding features, characterized in that, at the end of a number q of successive reception time periods (b), the first information portions of the buffered information items ($Inf_1$ to $Inf_n$) of the shift register (SR) are set to a value corresponding to "not correct".

66. The device in particular according to any one of the preceding features, characterized in that, at the end of a number q of successive reception time periods (b), the first information portions of the buffered information items ($Inf_1$ to $Inf_n$) of the shift register (SR) are set to a value corresponding to "correct".

67. A method for monitoring a processor (PC) in particular according to any one of the preceding features, comprising the following steps:

presetting, by a clock generator (CTR), a scheduled reception time period for an answer (ANS) of the processor (PC) to a watchdog (WDG);

transmitting, from the watchdog (WDG) to the processor (PC), one or a plurality of messages (MSG) with contents which can pertain to the processor (PC) itself and/or to further system components (SC);

responding to the message (MSG) in form of an answer (ANS) to the watchdog (WDG), performed by the processor (PC) depending on at least the content of one of these messages;

evaluating at least one answer (ANS) of the processor (PC) to the watchdog (WDG) as "correct" or "not correct", performed by the watchdog (WDG), for generating an evaluation result;

wherein an answer (ANS) is "correct"
if its content is correct and
if the answer (ANS) is received by the watchdog (WDG) within a predetermined reception time period (b), and wherein an answer (ANS) is "not correct"
if the content of the answer (ANS) is not correct or
if the answer (ANS) is not received by the watchdog (WDG) within the predetermined reception time period (b);

changing the content of a result memory (ES) with n buffered information items ($Inf_1$ to $Inf_n$) with a first information portion and optionally further information portions with n as an integer larger than 1, and with in each case a unique result memory position,
temporally after reception of an answer (ANS) by the watchdog (WDG) or
temporally at the end of the scheduled reception time period (b) by
deleting at least one buffered information item ($Inf_k$) of the n information items ($Inf_1$ to $Inf_n$), and
changing at least one result memory position of at least one buffered information item ($Inf_j$) from n information items ($Inf_1$ to $Inf_n$) in a result memory (ES) and
using the result of the evaluation of the at least one received response (ANS) as a new first information portion of a new buffered information item ($Inf_1$) in the result memory (ES).

68. The method in particular according to any one of the preceding features,
comprising an additional second evaluation means (VAL) as part of the watchdog (WDG) for evaluating the buffered information items ($Inf_1$ to $Inf_n$) of the shift register (SR), comprising the additional step,
evaluation of the buffered information items ($Inf_1$ to $Inf_n$) of the result memory (ES) by second evaluation means (VAL),
generating at least one control signal (RES) which can change the state of the processor (PC), or generating a signal from which such a control signal (RES) is derived.

69. The method in particular according to any one of the preceding features, comprising the additional step
fixing a first predetermined reception time period (b1) depending on a first expected answer (ANS1) for use as a predetermined reception time period (b) in the evaluation of this first answer (ANS1) of the processor (PC) when received as answer by the watchdog (WDG);
fixing a second predetermined reception time period (b2) depending on a second expected answer (ANS2) for use as a predetermined reception time period (b) in the evaluation of this second answer (ANS2) of the processor (PC) when received as answer (ANS) by the watchdog (WDG);

wherein the first predetermined reception time period (b1) and the second predetermined reception time period (b2) overlap and the first predetermined reception time period (b1) for the second answer (ANS2) has no effect for the evaluation, and the second predetermined reception time period (b2) for the first answer (ANS1) has no effect for the evaluation.

70. The method in particular according to any one of the preceding features, comprising the modified step
evaluation of the answer (ANS) of the processor (PC) as "correct" or "not correct",
wherein an answer (ANS) is now additionally "correct"
if, within the respective predetermined reception time period (b), the number of the answers (ANS) received by the watchdog (WDG) exceeds, due to the received answer (ANS), a predetermined maximal number of to-be-received answers (ANS) or, at the end of the predetermined reception time period (b), falls short of a predetermined minimal number of to-be-received answers (ANS).
wherein an answer (ANS) is now additionally "not correct"
if, within the predetermined reception time period (b), the number of the answers (ANS) received by the watchdog (WDG) exceeds, due to the received answer (ANS), a predetermined maximal number of to-be-received answers (ANS) or, at the end of the predetermined reception time period (b), falls short of a predetermined minimal number of to-be-received answers (ANS).

71. The method in particular according to any one of the preceding features, comprising the modified step of evaluating the answer (ANS) of the processor (PC) additionally depending on at least one buffered information item ($Inf_j$) of the buffered information items ($Inf_j$ to $Inf_n$) of the result memory (ES).

72. The method in particular according to any one of the preceding features, comprising the modified step of evaluating the answer (ANS) of the processor (PC) additionally depending on the buffered information item ($Inf_j$ to $Inf_n$) of the result memory (ES).

73. The method in particular according to any one of the preceding features, comprising the additional step
the additional generation of at least one further evaluation by second evaluation means (VAL) depending on at least one buffered information item ($Inf_j$) of the buffered information items ($Inf_1$ to $Inf_n$) of the result memory (ES);
storing this further evaluation as a further information portion of a buffered information item ($Inf_j$) of the buffered information items ($Inf_j$ to $Inf_n$) of the result memory (ES).

74. The method in particular according to any one of the preceding features, comprising the additional step of generating a second further evaluation depending on the occurrence of predetermined patterns among at least respectively a portion of at least two different buffered information items ($Inf_j$, $Inf_k$, with $1 \leq j \leq n$ and $1 \leq k \leq n$ and $j \neq k$) of the buffered information items ($Inf_1$ to $Inf_n$) of the result memory (ES).

75. The method in particular according to any one of the preceding features, comprising the additional step of, at the end of the predetermined reception time period (b), setting the first information portions of the buffered information items ($Inf_1$ to $Inf_n$) of the result memory (ES) to a value corresponding to "not correct" or all to a value corresponding to "correct".

76. The method in particular according to one or more of the preceding steps, comprising the additional steps
evaluating the buffered information items ($Inf_1$ to $Inf_n$) of the result memory (ES) for generating a further evaluation result;
changing the content of a second result memory ($ES_B$) with m further buffered information items ($Inf_{1B}$ to $Inf_{mB}$) with a first information portion and optionally further information portions, with m as an integer larger than 1, and with
in each case a unique further result memory position, temporally after reception of an answer (ANS) by the watchdog (WDG) or
temporally at the end of the scheduled reception time period (b)
by
deleting at least one further buffered information item ($Inf_k$) of the m information items ($Inf_{1B}$ to $Inf_{mB}$), and
changing at least one result memory position of at least one further buffered information item ($Inf_{jB}$) from m further buffered information items ($Inf_{1B}$ to $Inf_{mB}$) in the further result memory ($ES_B$) and
using the further evaluation result as a new first information portion of a new further buffered information item ($Inf_1$) in the further result memory ($ES_B$),
evaluating at least two of the m further buffered information items ($Inf_{mB}$ to $Inf_{mB}$), and
generating a control signal (RES) that is adapted to change the state of the processor (PCT) depending on the result of this evaluation.

77. A device for monitoring a processor (PC) in particular according to any one of the preceding features:
comprising a watchdog (WDG) and
comprising a clock generator (CTR) as part of the watchdog (WDG), and
comprising a result memory (ES) as part of the watchdog (WDG), and
comprising n buffered information items ($Inf_1$ to $Inf_n$), which are stored in n result memory cells, which form the result memory (ES), wherein n is a positive integral number greater than 1, and
which can be continuously numbered from 1 to n, wherein each of the n buffered information items ($Inf_1$ to $Inf_n$) has a unique logical result memory position from n logical result memory positions which are continuously numbered from 1 to n, and
wherein each of the n buffered information items ($Inf_1$ to $Inf_n$) has at least one first information portion and possibly can have further information portions, and
comprising first stimulating means (QSTM) as part of the watchdog (WDG) for transmission of messages (MSG) from the watchdog (WDG) to the processor (PC), and
comprising first evaluation means (AVAL) as part of the watchdog (WDG) for evaluation of answers (ANS) of the processor PC) to the watchdog (WDG), and
wherein the watchdog (WDG) sends messages (MSG) to the processor (PC),
that can pertain to the processor (PC) itself and to further system components (SC), and
wherein the processor (PC) is operative to transmit answers (ANS) to the watchdog (WDG) depending on these messages (MSG),
wherein the watchdog (WDG) is operative, by means of the first evaluation means (AVAL), to assess the answer (ANS) of the processor (PC) as "correct" or "not correct", and
wherein an answer (ANS) is "correct"
if its content coincides with at least one possible expected content, and
if the answer (ANS) is received by the watchdog (WDG) within a predetermined reception time period (b), and
wherein an answer (ANS) is "not correct"
if the content of the answer (ANS) does not coincide with at least one possible expected content, or
if the answer (ANS) is not received by the watchdog (WDG) within the predetermined reception time period (b), and
wherein the result memory (ES), at the end of the predetermined reception time period (b) or at each end of the predetermined reception time period (b),
deletes a buffered information item (e.g. $Inf_j$) at the j-th logical result memory position in a result memory cell of the result memory (ES) from this result memory (ES), wherein 1 and
shifts the remaining (n−1) buffered information items ($Inf_k$), wherein $1 \le k \le n$ and $k \ne j$, from the original logical result memory position ($p_k$, with $1 \le k \le m$ and $k \ne j$) to another logical result memory position ($p_{k'}$, with $k' \ne k$ and $1 \le k' \le n$), and
uses, in correspondence to a logical value for "correct" or for "not correct", at least the result of the evaluation of the received answer (ANS) by the processor (PC) at least as new first portion of the j-th buffered information item (e.g. $Inf_{j'}$) at the logical result memory position into which none of the remaining (n−1) buffered information items has been shifted.

78. The method in particular according to any one of the preceding features,
comprising an additional second evaluation means (VAL) as part of the watchdog (WDG) for evaluating the buffered information items ($Inf_1$ to $Inf_n$) of the shift register (SR),
wherein the second evaluation means (VAL), depending on buffered information items of the n buffered information items ($Inf_1$ to $Inf_m$) in the result memory cells of the result memory (ES), generates at least one control signal (RES) adapted to change the state of the processor (PC), or generates a signal from which such a control signal (RES) is derived.

79. The device in particular according to any one of the preceding features, comprising further monitorable system components (SC) as part of the processor.

80. The method in particular according to any one of the preceding features,
wherein to a first expected answer (ANS1), there is assigned, by the first evaluation means (AVAL), a predetermined first reception time period (b1) as predetermined reception time period (b) for the evaluation of the first expected answer (ANS1) after reception by the watchdog (WDG) as answer (ANS), and
wherein to a first expected answer (ANS2), there is assigned, by the first evaluation means (AVAL), a predetermined second reception time period (b2) as predetermined reception time period (b) for the evaluation of the second expected answer (ANS2) after reception by the watchdog (WDG) as answer (ANS), and
wherein the predetermined first reception time period (b1) and the predetermined second reception time period (b2) are different and overlap each other, and wherein the predetermined first reception time period (b1) has no effect for the evaluation of the second answer (ANS2), and wherein the predetermined second reception time period (b2) has no effect for the evaluation of the first answer (ANS1).

81. The method in particular according to any one of the preceding features, wherein the watchdog (WDG) is operative, by means of the first evaluation means (AVAL), to assess the answer (ANS) of the processor (PC) as "correct" or "not correct", and wherein an answer (ANS) is additionally "correct"
if, within the predetermined reception time period (b), the number of answers (ANS) received by the watchdog (WDG) does not exceed, due to the received answer (ANS), a maximal number of to-be-received answers (ANS) or, at the end of the predetermined reception time period (b), does not fall short of a predetermined minimal number of to-be-received answers (ANS), and wherein an answer (ANS) is additionally "not correct"
if, within the predetermined reception time period (b), the number of the answers (ANS) received by the watchdog (WDG) exceeds, due to the received answer (ANS), a predetermined maximal number of to-be-received answers (ANS) or, at the end of the predetermined reception time period (b), falls short of a predetermined minimal number of to-be-received answers (ANS).

82. The device in particular according to any one of the preceding features, characterized in that the evaluation of the answer (ANS) of the processor by the first evaluation means (AVAL) of the watchdog (WDG) is additionally depending on at least one buffered information item ($Inf_j$) of the buffered information items ($Inf_j$ to $Inf_n$) of the result memory (ES).

83. The device according to any one of the preceding features, characterized in that the evaluation of the answer (ANS) of the processor by the first evaluation means (AVAL) of the watchdog (WDG) is additionally depending on the buffered information items ($Inf_j$ to $Inf_n$) of the result memory (ES).

84. The device in particular according to any one of the preceding features, characterized in that
a second evaluation means (VAL) are operative, depending on at least one buffered information item ($Inf_j$) of the buffered information items ($Inf_1$ to $Inf_n$) of the result memory (ES), to additionally generate at least one further evaluation, and
in that at least one buffered information item ($Inf_j$) of the buffered information items ($Inf_j$ to $Inf_n$) of the result memory (ES) additionally comprises a buffered further evaluation of the second evaluation means (VAL) as a further information portion in addition to said first information portion.

85. The device in particular according to any one of the preceding features, characterized in that the second evaluation means (VAL) is operative, depending on the occurrence of predetermined patterns among at least respectively one information portion of at least two different buffered information items ($Inf_j$, $Inf_k$, with 1≤j≤n and 1≤k≤n and j≠k) of the buffered information items ($Inf_1$ to $Inf_n$) of the result memory (ES), to generate additionally at least one further evaluation.

86. The device in particular according to any one of the preceding features, characterized in that, at the end of the predetermined reception time period (b), the first information portions of the buffered information items ($Inf_1$ to $Inf_n$) of the result memory (ES) are set to a value corresponding to "not correct".

87. The device in particular according to any one of the preceding features, characterized in that, at the end of the predetermined reception time period (b), the first information portions of the buffered information items ($Inf_1$ to $Inf_n$) of the result memory (ES) are set to a value corresponding to "correct".

88. The device according to one or more of the preceding features,
comprising an additional second evaluation means (VAL) as part of the watchdog (WDG) for evaluating the n buffered information items ($Inf_1$ to $Inf_n$) of the result memory (ES), and
comprising at least one further result memory ($ES_B$) as part of the watchdog (WDG), and
comprising m further buffered information items ($Inf_{1B}$ to $Inf_{mB}$), which are stored in m further result memory cells, which form the further result memory ($ES_B$), wherein m is a positive integral number greater than 1, and
wherein the m further buffered information items ($Inf_{1B}$ to $Inf_{mB}$) are continuously numbered from 1 to m, and
wherein each of the m further buffered information items ($Inf_{1B}$ to $Inf_{mB}$) has a unique logical further result memory position from m logical further result memory positions which are continuously numbered from 1 to m,
wherein each of the m further buffered information items ($Inf_{1B}$ to $Inf_{mB}$) comprises at least a first information portion, and optionally can comprise further information portions, and
comprising further evaluation means ($VAL_B$) as part of the watchdog (WDG) for evaluating the further buffered information items ($Inf_{1B}$ to $Inf_{mB}$) of the further result memory ($ES_B$), and
wherein the further result memory ($ES_B$), upon each reception of an answer of the processor (PC),
deletes the j-th further buffered information item ($Inf_{jB}$) at the j-th logical further result memory position in a result memory cell of the further result memory ($ES_B$) from the further result memory ($ES_B$), wherein and
shifts each of the (m−1) buffered information items ($Inf_{kB}$), wherein 1≤k≤m and k≠j, from the respective k-th logical further result memory position ($p_k$, with 1≤k≤m and k≠j) to another logical further result memory position ($p_{k'}$, with k'≠k and 1≤k'≤m), and
uses at least the result of the further evaluation of the second evaluation means (VAL) at least as a new first portion of the j'-th further buffered information item ($Inf_{j'B}$) or as a new j'-th further buffered information item ($Inf_{j'B}$) at the logical further result memory position into which none of the remaining (m−1) buffered further information items has been shifted, and
wherein the further evaluation means ($VAL_B$), depending on further buffered information items of the m further buffered information items ($Inf_{1B}$ to $Inf_{mB}$) of the further shift register ($SR_B$), generate a control signal (RES) adapted to change the state of the processor (PC).

89. The device according to one or more of the preceding features, comprising an additional second evaluation means (VAL) as part of the watchdog (WDG) for evaluating the buffered information items ($Inf_1$ to $Inf_n$) of the result memory (ES), comprising at least one further result memory ($ES_B$) as part of the watchdog (WDG), and comprising m further buffered information items ($Inf_{1B}$ to $Inf_{mB}$), which are stored in m further result memory cells, which form the further result memory ($ES_B$), wherein m is a positive integral number, and wherein the m further buffered information items ($Inf_{1B}$ to $Inf_{mB}$) are continuously numbered from 1 to m, and wherein each of the m further buffered information items ($Inf_{1B}$ to $Inf_{mB}$) has a unique logical further result memory position from m further result memory positions which are continuously numbered from 1 to m, and wherein each of the m further buffered information items ($Inf_{1B}$ to $Inf_{mB}$) comprises at least a first information portion, and optionally can comprise further information portions, and comprising further evaluation means ($VAL_B$) as part of the watchdog (WDG) for evaluating the further buffered information items ($Inf_{1B}$ to $Inf_{mB}$) of the further result memory ($ES_B$), and wherein the further result memory ($ES_B$), at the end of a reception time period (b) or at each end of a reception time period (b), deletes the j-th further buffered information item ($Inf_{jB}$) at the j-th logical further result memory position in a result memory cell of the further result memory ($ES_B$) from the further result memory ($ES_B$), wherein and shifts each of the (m−1) buffered information items ($Inf_{kB}$), wherein $1 \leq k \leq m$ and $k \neq j$, from the respective k-th logical further result memory position ($p_k$, with $1 \leq k \leq m$ and $k \neq j$) to another logical further result memory position ($p_{k'}$, with $k' \neq k$ and $1 \leq k' \leq m$), and uses at least the result of the further evaluation of the second evaluation means (VAL) at least as a new first portion of the j'-th further buffered information item ($Inf_{j'B}$) or as a new j'-th further buffered information item ($Inf_{j'B}$) at the logical further result memory position into which none of the remaining (m−1) buffered further information items has been shifted, and wherein the further evaluation means ($VAL_B$), depending on further buffered information items of the m further buffered information items ($Inf_{1B}$ to $Inf_{mB}$) of the further shift register ($SR_B$), generate a control signal (RES) adapted to change the state of the processor (PC).

90. The device according to one or more of the preceding features, comprising an additional second evaluation means (VAL) as part of the watchdog (WDG) for evaluating the buffered information items ($Inf_1$ to $Inf_n$) of the result memory (ES), and comprising at least one further result memory ($ES_B$) as part of the watchdog (WDG), and comprising m further buffered information items ($Inf_{1B}$ to $Inf_{mB}$), which are stored in m further result memory cells, which form the further result memory ($ES_B$), wherein m is a positive integral number, and wherein the m further buffered information items ($Inf_{1B}$ to $Inf_{mB}$) are continuously numbered from 1 to m, and wherein each of the m further buffered information items ($Inf_{1B}$ to $Inf_{mB}$) has a unique logical further result memory position from m logical further result memory positions which are continuously numbered from 1 to m, wherein each of the m further buffered information items ($Inf_{1B}$ to $Inf_{mB}$) comprises at least a first information portion, and optionally can comprise further information portions, and comprising further evaluation means ($VAL_B$) as part of the watchdog (WDG) for evaluating the further buffered information items ($Inf_{1B}$ to $Inf_{mB}$) of the further result memory ($ES_B$), and wherein, in the further result memory ($ES_B$), at the end of a predetermined or preset number q of successive reception time periods (b), deletes the j-th further buffered information item ($Inf_{jB}$) at the j-th logical further result memory position in a result memory cell of the further result memory ($ES_B$) from the further result memory ($ES_B$), wherein and shifts each of the (m−1) buffered information items ($Inf_{kB}$), wherein $1 \leq k \leq m$ and $k \neq j$, from the respective k-th logical further result memory position ($p_k$, with $1 \leq k \leq m$ and $k \neq j$) to another logical further result memory position ($p_{k'}$, with $k' \neq k$ and $1 \leq k' \leq m$), and uses at least the result of the further evaluation of the second evaluation means (VAL) at least as a new first portion of the j'-th further buffered information item ($Inf_{j'B}$) or as a new j'-th further buffered information item ($Inf_{j'B}$) at the logical further result memory position into which none of the remaining (m−1) buffered further information items has been shifted, and wherein the further evaluation means ($VAL_B$), depending on further buffered information items of the m further buffered information items ($Inf_{1B}$ to $Inf_{mB}$) of the further shift register ($SR_B$), generate a control signal (RES) adapted to change the state of the processor (PC).

91. The device in particular according to any one of the preceding features, characterized in that, at the end of a number q of successive reception time periods (b), the first information portions of the buffered information items ($Inf_1$ to $Inf_n$) of the result memory (ES) are set to a value corresponding to "not correct".

92. The device in particular according to any one of the preceding features, characterized in that, at the end of a number q of successive reception time periods (b), the first information portions of the buffered information items ($Inf_1$ to $Inf_n$) of the result memory (ES) are set to a value corresponding to "correct".

93. The method for monitoring a processor (PC) in particular according to any one of the preceding features, comprising the following steps:

presetting, by a clock generator (CTR), a scheduled reception time period for an answer (ANS) of the processor (PC) to a watchdog (WDG);

transmitting, from the watchdog (WDG) to the processor (PC), one or a plurality of messages (MSG) with contents which can pertain to the processor (PC) itself and/or to further system components (SC);

responding to the message (MSG) in form of an answer (ANS) to the watchdog (WDG), performed by the processor (PC) depending on at least the content of one of these messages;

evaluating at least one answer (ANS) of the processor (PC) to the watchdog (WDG) as "correct" or "not correct", performed by the watchdog (WDG), for generating an evaluation result;

wherein an answer (ANS) is "correct"
- if its content coincides with at least one possible expected content, and
- if the answer (ANS) is received by the watchdog (WDG) within a predetermined reception time period (b), and wherein an answer (ANS) is "not correct"
- if the content of the answer (ANS) does not coincide with at least one possible expected content, or
- if the answer (ANS) is not received by the watchdog (WDG) within the predetermined reception time period (b);

changing the content of a result memory (ES) with n buffered information items ($Inf_1$ to $Inf_n$) each with a first information portion per buffered information item ($Inf_1$ to $Inf_n$) and optionally further information portions per buffered information item ($Inf_1$ to $Inf_n$) with n as an integer larger than 1, and with
- in each case a unique logical result memory position, temporally after reception of an answer (ANS) by the watchdog (WDG) or
- temporally at the end of the scheduled reception time period (b)

by
- deleting at least one buffered information item ($Inf_k$) of the n information items ($Inf_1$ to $Inf_n$), and
- changing at least one logical result memory position of at least one buffered information item ($Inf_j$) from n information items ($Inf_1$ to $Inf_n$) in a result memory (ES) and
- using the result of the evaluation of the at least one received response (ANS) as a new first information portion of a new buffered information item ($Inf_1$) in the result memory (ES).

94. The method in particular according to any one of preceding features,
- comprising an additional second evaluation means (VAL) as part of the watchdog (WDG) for evaluating the buffered information items ($Inf_1$ to $Inf_n$) of the result memory (ES), comprising the additional step,
- evaluating the buffered information items ($Inf_1$ to $Inf_n$) of the result memory (ES) by second evaluation means (VAL) by generating an evaluation result depending on buffered information items of the buffered information items ($Inf_1$ to $Inf_n$), and
- generating at least one control signal (RES) which can change the state of the processor (PC), or generating a signal from which such a control signal (RES) is derived depending on said evaluation result.

95. The method in particular according to any one of the preceding features, comprising the additional step
- fixing a first predetermined reception time period (b1) depending on a first expected answer (ANS1) for use as a predetermined reception time period (b) in the evaluation of this first answer (ANS1) of the processor (PC) when received as answer by the watchdog (WDG);
- fixing a second predetermined reception time period (b2) depending on a second expected answer (ANS2) for use as a predetermined reception time period (b) in the evaluation of this second answer (ANS2) of the processor (PC) when received as answer (ANS) by the watchdog (WDG);
- wherein the first predetermined reception time period (b1) and the second predetermined reception time period (b2) overlap and the first predetermined reception time period (b1) has no effect for the evaluation of the second answer (ANS2), and the second predetermined reception time period (b2) has no effect for the evaluation for the first answer (ANS1).

96. The method in particular according to any one of the preceding features, comprising the modified step
- evaluation of the answer (ANS) of the processor (PC) as "correct" or "not correct",
- wherein an answer (ANS) is now additionally only "correct"
  - if, within the predetermined reception time period (b), additionally also the number of answers (ANS) received by the watchdog (WDG) does not exceed, due to the received answer (ANS), a predetermined maximal number of to-be-received answers (ANS) or additionally also at the end of the predetermined reception time period (b), does not fall short of a predetermined minimal number of to-be-received answers (ANS).
- wherein an answer (ANS) is now additionally "not correct"
  - if, within the predetermined reception time period (b), the number of the answers (ANS) received by the watchdog (WDG) exceeds, due to the received answer (ANS), a predetermined maximal number of to-be-received answers (ANS) or, at the end of the predetermined reception time period (b), falls short of a predetermined minimal number of to-be-received answers (ANS).

97. The method in particular according to any one of the preceding features, comprising the modified step of evaluating the answer (ANS) of the processor (PC) in additional dependence on at least one information portion of a buffered information item ($Inf_j$) of the buffered information items ($Inf_j$ to $Inf_n$) of the result memory (ES) in addition to the dependence of this evaluation of the answer (ANS) of the processor (PC) to the watchdog (WDG).

98. The method in particular according to any one of the preceding features, comprising the modified step of evaluating the answer (ANS) of the processor (PC) in additional dependence on the buffered information items ($Inf_j$ to $Inf_n$) of the result memory (ES) in addition to the dependence of this evaluation of the answer (ANS) of the processor (PC) to the watchdog (WDG).

99. The method in particular according to any one of the preceding features, comprising the additional step
- additional generation of at least one further evaluation by second evaluation means (VAL) depending on at least one buffered information item ($Inf_j$) of the buffered information items ($Inf_1$ to $Inf_n$) of the result memory (ES);
- storing this further evaluation as a further information portion of a buffered information item ($Inf_j$) of the buffered information items ($Inf_j$ to $Inf_n$) of the result memory (ES).

100. The method in particular according to any one of the preceding features, comprising the additional step of generating a second further evaluation depending on the occurrence of predetermined patterns among at least respectively a portion of at least two different buffered information items ($Inf_j$, $Inf_k$, with $1 \leq j \leq n$ and $1 \leq k \leq n$ and $j \neq k$) of the buffered information items ($Inf_1$ to $Inf_n$) of the result memory (ES).

101. The method in particular according to any one of the preceding features, comprising the additional step of, at the end of the predetermined reception time period (b), setting the first information portions of the buffered information items ($Inf_1$ to $Inf_n$) of the result memory (ES) to a value corresponding to "not correct" or all to a value corresponding to "correct".

102. The method in particular according to one or more of the preceding steps, comprising the additional steps
evaluation of the buffered information items ($Inf_1$ to $Inf_n$) of the result memory (ES) for generating a further evaluation result;
changing the content of a second result memory ($ES_B$) with m further buffered information items ($Inf_{1B}$ to $Inf_{mB}$) with a first information portion and optionally further information portions, wherein m is an integer larger than 1, and with
in each case a unique further logical result memory position
temporally after reception of an answer (ANS) by the watchdog (WDG) or
temporally at the end of the scheduled reception time period (b)
by
deleting at least one further buffered information item ($Inf_k$) of the m information items ($Inf_{1B}$ to $Inf_{mB}$) in the further result memory ($ES_B$), and
changing at least one logical result memory position of at least one further buffered information item ($Inf_{nB}$) from m further buffered information items ($Inf_{1B}$ to $Inf_{mB}$) in the further result memory ($ES_B$) and
use of the further evaluation result as a new first information portion of a new further buffered information item ($Inf_1$) in the further result memory ($ES_B$).
evaluating at least two of the m further buffered information items ($Inf_{mB}$ to $Inf_{mB}$), and
generating at least one control signal (RES) and/or at least one further control signal (WRN, WRN2) adapted to change the state of the processor (PC), depending on the result of this evaluation.

Glossary

Buffered information items ($Inf_1$ to $Inf_n$) and ($Inf_{1B}$ to $Inf_{nB}$). Buffered information items ($Inf_1$ to $Inf_n$) and further buffered information items ($Inf_{1B}$ to $Inf_{nB}$) are understood in the sense of the disclosure to mean data sets comprising at least one datum. In the simplest case, information is concerned that is "correct" or "not correct", which is then preferably encoded in a bit, for example as "logic 1" or "logic 0". As discussed above in the description, however, it is conceivable to perform more complex evaluations and thus to use evaluation vectors as individual buffered information items.

Result Memory

A result memory in the sense of the disclosure consists of a plurality of (n or m) result memory cells. Each result memory cell can store an information item ($Inf_j$) or ($Inf_{jB}$). Each of the information items can comprise a plurality of sub-information items—also referred to as information portions. These can thus be a more complex data structure. In the simplest case, however, an information item of this kind is merely a bit. Each of the n or m information items ($Inf_1$ to $Inf_n$) or ($Inf_{1B}$ to $Inf_{mB}$) buffered in the result memory can be assigned a logical and a physical result memory position. In the case of a trigger event the n or m information items ($Inf_1$ to $Inf_n$) or ($Inf_1$ to $Inf_m$) is shifted or scrambled in the result memory in a predeterminable way. This can be implemented purely logically by changing the logical result memory positions or by actual displacement of the n or m information ($Inf_1$ to $Inf_n$) or ($Inf_1$ to $Inf_m$) in the result memory to other result memory cells, that is to say by changing the physical result memory positions. A predetermined information item of the buffered information items ($Inf_1$ to $Inf_n$) or ($Inf_1$ to $Inf_m$) of the result memory is at least partially overwritten and thus deleted by an evaluation value determined by evaluation means (AVAL, VAL) in the case of the trigger event. Of course, writing and deletion can also be performed sequentially in succession. In the simplest case a write/read pointer within the result memory, in the case of each trigger event, can be positioned in a new result memory cell in a predeterminable way, which is then overwritten by the evaluation result to be buffered. All of the result memory cells are preferably overwritten once before a result memory cell is overwritten once more.

Trigger Event

A trigger event for the shifting of a shift register or the restructuring of the information items in the result memory (as described below under "result memory") can be the reception of an answer (ANS) of the processor by the watchdog (WDG) or the reception of each answer (ANS) of the processor by the watchdog (WDG) or the end of the predetermined reception time period (b) or the end of a predetermined or preset number q of successive reception periods of time (b), typically, but not necessarily, separated by other time periods (a, c). Not every answer (ANS) of the processor (PC) has to be a trigger signal. However, it is preferred if every answer (ANS) of the processor (PC) is a trigger signal.

Shift Register (SR)

Generally, a shaft register is understood to mean a register that in each memory position comprises an individual bit, which with the presence of a clock edge is shifted to the left or right. In the sense of the disclosure, however, the register cells contain not only a bit, but the data sets of the buffered information items ($Inf_1$ to $Inf_n$) or ($Inf_{1B}$ to $Inf_{mB}$). A data set of this kind of a buffered information item ($Inf_j$) or ($Inf_{jB}$) may also consist of just one bit, but does not have to. In order to enable the shift operation, the data structure of the register cells must be the same, regardless of whether or not the register cells are used.

LIST OF REFERENCE SIGNS a first time period, in which no reception of answers (ANS) is scheduled. The time period does not overlap chronologically with the second time period (c), at which there is no evaluation of answers (ANS) by the watchdog (WDG), or with the scheduled reception time period (b) for an answer (ANS) of the processor (PC). The time length of a first time period can be 0. The time length of the first time period can vary from first time period to first time period.

ANS answer of the processor (PC) to one or more messages (MSG) that the first stimulating means (QSTM) has sent as part of the watchdog (WDG) to the processor (PC).

ANS1 first answer of the processor (PC)

ANS2 second answer of the processor (PC)

AVAL first evaluation means (AVAL). The first evaluation means are part of the watchdog (WDG). They are used to evaluate answers (ANS) of the processor (PC) to the watchdog (WDG) prompted by messages (MSG) which the first stimulating means (QSTM) sent from the watchdog (WDG) to the processor (PC) and which the processor should have answered with the aforementioned answers (ANS) at correct times and with expected contents and in the correct number, which can then be checked in turn by the first evaluation means of the watchdog (WDG).

b second time period, also referred to as scheduled reception time period for an answer (ANS). The time length of a second time period must be greater than 0. The time length of the second time period can vary from second time period to second time period.

b1 first reception time period for the first answer (ANS1)

b2 second reception time period for the second answer (ANS2)

BW evaluation signal c third time period (c), in which there is no evaluation of answers (ANS) by the watchdog. The third time period does not overlap chronologically with the first time period (a), in which there is no reception of answers (ANS), or with the scheduled reception time period (b), i.e. the second time period, for an answer (ANS) of the processor (PC). The time length of a third time period can be 0. The time length of the third time period can vary from third time period to third time period.

$CCNT_B$ second count value

CTR internal clock generator (CTR), which is part of the watchdog (WDG).

ES result memory, which is part of the watchdog (WDG) and consists of result memory cells. Each result memory cell of the result memory is continuously numbered by a number from 1 to n. This means that each result memory cell on the one hand has a real physical result memory cell position and on the other hand has a logical result memory cell position which must not be identical to the real physical result memory cell position. The result memory can be embodied as a shift register (SR).

$ES_B$ further result memory, which is part of the watchdog (WDG) and consists of further result memory cells. Each further cell of the further result memory is continuously numbered by a number from 1 to m. This means that each cell of the further result memory on the one hand has a real physical further cell position and on the other hand has a logical cell position which must not be identical to the real physical further cell position. The further result memory can be embodied as a (further) shift register ($SR_B$).

$Inf_1$ first buffered information item in the result memory (ES) or in the shift register (SR).

$Inf_j$ j-th buffered information item in the result memory (ES) or in the shift register (SR).

$Inf_n$ n-th buffered information item in the result memory (ES) or in the shift register (SR).

$Inf_{1B}$ first further buffered information item in the further result memory ($ES_B$) or in the further shift register ($SR_B$).

$Inf_{jB}$ j-th further buffered information item in the further result memory ($ES_B$) or in the further shift register ($SR_B$).

$Inf_{mB}$ m-th further buffered information item in the further result memory ($ES_B$) or in the further shift register ($SR_B$).

MSG messages sent by the first stimulating means (QSTM) as part of the watchdog (WDG) to the processor (PC), which then answers with answers (ANS) in scheduled time periods (b) and with expected contents and in the correct number, which can be checked by the watchdog (WDG).

n number of buffered information items ($Inf_1$ to $Inf_n$) contained by the result memory (ES) or the shift register (SR).

NO count value This is for example the number of "correct" evaluations assessed as correct and stored in the result memory.

m number of (further) buffered information items ($Inf_{1B}$ to $Inf_{mB}$) contained by the further result memory ($ES_B$) or the further shift register ($SR_B$).

PC processor $p_1$ first result memory position or first shift register position of the first result memory cell or the first shift register cell.

$p_j$ j-th result memory position or j-th shift register position of the j-th result memory cell or the j-th shift register cell.

$p_n$ n-th result memory position or n-th shift register position of the n-th result memory cell or the n-th shift register cell.

$p_{1B}$ first result memory position or first shift register position of the first result memory cell of the further result memory or the first shift register cell of the further shift register.

$p_{jB}$ j-th result memory position or j-th shift register position of the j-th result memory cell or the j-th shift register cell.

$p_{mB}$ m-th result memory position or m-th shift register position of the m-th result memory cell or the m-th shift register cell.

q number of the successive predetermined reception time periods (b), at the end of which the evaluation content of the result memory (ES) or of the shift register, at least in the form of the first portions of the information items ($Inf_1$ to $Inf_n$)(SR) buffered in this result memory (ES) or in this shift register (SR) is set to a value corresponding to "correct" or "not correct", which corresponds to a reset operation of the result memory (ES) or of the shift register (SR). The entire result memory (ES) or the entire shift register (SR) is preferably reset.

P1 to P26 temporal time periods

QSTM first stimulating means (QSTM) The first stimulating means are part of the watchdog (WDG). They send messages (MSG) from the watchdog (WDG) to the processor (PC), which then answers these with answers (ANS) at correct times and with expected contents and in the correct number, which can be checked by the watchdog (WDG).

RES control signal adapted to change the state of the processor (PC). It is typically a reset signal, which the processor (PC) necessarily sets into a predefined state, or an interrupt signal, which prompts the processor (PC) to interrupt the current program implementation and to implement a predefined program portion.

SC system components

SR shift register, which is part of the watchdog (WDG) and comprises shift register cells. Each shift register cell of the shift register is continuously numbered by a number from 1 to n. This means that each shift register cell on the one hand has a real physical shift register cell position and on the other hand has a logical shift register cell position which must not be identical to the real physical shift register cell position. In the sense of the disclosure a shift register falls under the term "result memory" (ES).

$SR_B$ further shift register, which is part of the watchdog (WDG) and comprises (further) shift register cells. Each (further) shift register cell of the further shift register is continuously numbered by a number from 1 to m. This means that each further shift register cell on the one hand has a real physical (further) shift register cell position and on the other hand has a logical (further) shift register cell position which must not be identical to the real physical (further) shift register cell position. In the sense of the disclosure a further shift register falls under the term "further result memory" ($ES_B$).

VAL second evaluation means, which are part of the watchdog (WD). They evaluate the information items ($Inf_1$ to $Inf_n$) buffered in the result memory (ES) or in the shift register (SR). Here, the second evaluation means may also generate more than just one evaluation as appropriate. For example, it can define the number of "correct" information items in the result memory cells of the result memory (ES) or in the shift register cells of the shift register (SR) and can compare this with a threshold value. If the number lies below the first further threshold value, the control signal (RES) or another corresponding signal for influencing the processor (PC) or parts thereof or other system components (SC) can be set, for example. Further signals can also be generated as the result of further evaluations, which are based for example on specific patterns in the result memory cells of the result memory (ES) or in the shift register cells of the shift register (SR).

$VAL_B$ further second evaluation means, which are part of the watchdog (WD). They evaluate the m further information items ($Inf_{1B}$ to $Inf_{mB}$) buffered in the further shift register ($SR_B$). Here, the evaluation means may also generate more than just one evaluation as appropriate. For example, the further number of "correct" information items in the (further) result memory cells of the further result memory ($ES_B$) or in the (further) shift register cells of the further shift register ($SR_B$) can be defined and can be compared with a further threshold value. If this further number lies below this first further threshold value, the control signal (RES) or another corresponding signal for influencing the processor (PC) or parts thereof or other system components (SC) can be set, for example. Further signals can also be generated as the result of (further) evaluations, which are based for example on specific patterns in the (further) result memory cells of the further result memory ($ES_B$) or (further) shift register cells of the further shift register ($SR_B$).

WD window signal. In the examples a 1-level is intended to mean that no answers (ANS) are expected and that answers (ANS) of the processor (PC) in these time periods with a 1-level are assessed as "not correct", regardless of their content. In a time period with a 0-level of the signal, answers (ANS) preferably in a predetermined number are expected. If the contents thereof are correct, i.e. corresponds to a content determinable in advance, they are assessed as "correct". A deviating number of answers (ANS) may also lead to a "not correct" evaluation as applicable.

WDG watchdog

WRN first warning signal of the watchdog (WDG) to the processor (PC).

WRN2 second warning signal of the watchdog (WDG) to the processor (PC).

The invention claimed is:

1. A method for monitoring a processor by a watchdog comprising a clock generator, a result memory having n result memory cells, wherein n is a positive integral number larger than 1, a first stimulating portion of the watchdog (QSTM) for transmission of messages from the watchdog to the processor, a first evaluation portion of the watchdog (AVAL) for evaluation of answers of the processor which are transmitted by the processor to the watchdog in response to the messages from the watchdog, and further comprising a second evaluation portion of the watchdog (VAL) for evaluation of buffered information items ($Inf_1$ to $Inf_n$) of the result memory, wherein, in the method n information items ($Inf_1$ to $Inf_n$) are buffered into the n result memory cells of the result memory, wherein the n buffered information items ($Inf_1$ to $Inf_n$) are continuously numbered from 1 to n, wherein each of the n buffered information items ($Inf_1$ to $Inf_n$) is assigned to a respective result memory position of n result memory positions which are continuously numbered from 1 to n, and wherein each of the n buffered information items ($Inf_1$ to $Inf_n$) comprises at least one first information portion, the watchdog is operative to transmit messages to the processor that can pertain to the processor and to further system components, the processor is operative to transmit answers to the watchdog depending on the messages, the first evaluation portion of the watchdog (AVAL) is operative to assess each of the answers of the processor as "correct" or "not correct", wherein a respective answer is "correct"
if a content of the respective answer coincides with at least one possible expected content, and
if the respective answer is received by the watchdog within a predetermined reception time period, and wherein the respective answer is "not correct"
if the content of the respective answer does not coincide with at least one possible expected content, or
if the respective answer is not received by the watchdog within the predetermined reception time period, and in the result memory, upon reception of each of the answers of the processor,
a j-th buffered information item of the n buffered information items at a j-th result memory position in a corresponding result memory cell of the result memory is deleted from the result memory, wherein $1 \leq j \leq n$, the remaining [n−1] buffered information items ($Inf_k$), wherein $1 \leq j \leq n$ and $k \neq j$, are respectively shifted from the respective k-th result memory position ($p_k$, with $1 \leq j \leq m$ and $k \neq j$) to another result memory position ($p_{k'}$, with $k' \neq j$ and $1 \leq k' \leq m$), and at least as a new first portion of the j'-th buffered information item (e.g. $Inf_{j'}$) at a result memory position into which none of the remaining [n−1] buffered information items ($Inf_1$ to $Inf_n$) has been shifted, there is used at least a result of the evaluation of the respective answer of the processor in correspondence to a value for "correct" or for "not correct", wherein the second evaluation portion of the watchdog (VAL), if buffered information items of the n buffered information items ($Inf_1$ to $Inf_n$) in the result memory cells of the result memory comprise an identifiable predetermined pattern, generates at least one control signal adapted to change a state of the processor, or generates a signal from which the control signal is derived.

2. The method according to claim 1, wherein the processor includes to-be-monitored systems components.

3. The method according to claim 1, wherein
to a first expected answer, there is assigned, by the first evaluation portion of the watchdog (AVAL), a predetermined first reception time period as the predetermined reception time period for the first answer, and
to a second expected answer, there is assigned, by the first evaluation portion of the watchdog (AVAL), a predetermined second reception time period as the predetermined reception time period for the second answer, wherein the predetermined first reception time period and the predetermined second reception time period are different and overlap each other or do not overlap each other, wherein the predetermined first reception time period has no effect for the evaluation of the second answer, and wherein the predetermined second reception time period has no effect for the evaluation of the first answer.

4. The method according to claim 1, wherein:

the watchdog is operative, by the first evaluation portion of the watchdog (AVAL), to assess the answer of the processor as "correct" or "not correct", wherein the answer is "correct" if it additionally applies
that, within the predetermined reception time period, a number of answers received by the watchdog does not exceed, due to the respective received answer, a predetermined maximal number of to-be-received answers or, at an end of the predetermined reception time period, does not fall short of a predetermined minimal number of the to-be-received answers, and wherein an answer is "not correct" if it alternatively applies
that, within the respective predetermined reception time period, the number of the answers received by the watchdog exceeds the predetermined maximal number of the to-be-received answers or is less than the predetermined minimal number of the to-be-received answers.

5. The method according to claim 1, wherein the evaluation of the answer of the processor by the first evaluation portion of the watchdog is additionally depending on at least one buffered information item ($Inf_j$) of the buffered information items ($Inf_1$ to $Inf_n$) of the result memory.

6. The method according to claim 1, wherein the evaluation of the answer of the processor by the first evaluation portion of the watchdog is additionally depending on the buffered information items ($Inf_1$ to $Inf_n$) of the result memory.

7. The method according to claim 1, wherein the processor comprises the second evaluation portion of the watchdog (VAL), wherein the second evaluation portion of the watchdog (VAL) is operative, depending on at least one buffered information item ($Inf_j$) of the buffered information items ($Inf_1$ to $Inf_n$) of the result memory, to additionally generate at least one further evaluation, and wherein at least one buffered information item ($Inf_j$) of the buffered information items ($Inf_1$ to $Inf_n$) of the result memory additionally comprises a to-be-buffered further evaluation of the second evaluation portion of the watchdog as a further information portion in addition to the first information portion.

8. The method according to claim 1, wherein the watchdog is additionally provided with the second evaluation portion of the watchdog (VAL) for evaluation of at least two of the n buffered information items ($Inf_1$ to $Inf_n$) of the result memory, at least one further result memory having m result memory cells for storage of m further buffered information items ($Inf_{1B}$ to $Inf_{mB}$), wherein m is a positive integral number larger than 1, and a further evaluation portion of the watchdog ($VAL_B$) for evaluation of the m further buffered information items ($Inf_{1B}$ to $Inf_{mB}$), wherein the m further buffered information items ($Inf_{1B}$ to $Inf_{mB}$) are continuously numbered from 1 to m, wherein each of the m further buffered information items ($Inf_{1B}$ to $Inf_{mB}$) is assigned to a respective result memory position of m result memory positions of the further result memory which are continuously numbered from 1 to m, wherein each of the m further buffered information items ($Inf_{1B}$ to $Inf_{mB}$) comprises at least one respective information portion, wherein, in the further result memory, upon each reception of an answer of the processor,
the j-th further buffered information item ($Inf_{jB}$) at the j-th result memory position in a corresponding result memory cell of the further result memory is deleted from the further result memory, wherein $1 \leq j \leq m$, each of remaining [m−1] buffered information items ($Inf_{kB}$), wherein $1 \leq j \leq m$ and $k \neq j$, is respectively shifted from a respective k-th result memory position ($p_k$, with $1 \leq j \leq m$ and $k \neq j$) of the further result memory to a respective other result memory position ($p_{k'}$, with $k' \neq k$ and $1 \leq k' \leq m$) of the further result memory, and at least as a new first portion of the j'-th buffered information item ($Inf_{j'B}$) at a result memory position of the further result memory into which none of the remaining [m−1] buffered further information items has been shifted, there is used at least a result of the further evaluation of the second evaluation portion of the watchdog (VAL), and wherein the further evaluation portion of the watchdog ($VAL_B$), depending on further buffered information items of the m further buffered information items ($Inf_{1B}$ to $Inf_{mB}$) of the further result memory, generates the at least one control signal adapted to change the state of the processor, or generates the signal from which the control signal is derived.

9. The method according to claim 8, wherein the second evaluation portion of the watchdog (VAL) is operative, depending on the occurrence of predetermined patterns among at least respectively one information portion of at least two different buffered information items ($Inf_j$, $Inf_k$, with $1 \leq j \leq n$ and $1 \leq k \leq n$ and $k \neq j$) of the buffered information items ($Inf_1$ to $Inf_n$) of the result memory, to generate at least one further evaluation.

10. The method according to claim 8, wherein, at an end of the predetermined reception time period, the first information portions of the buffered information items ($Inf_1$ to $Inf_n$) of the result memory are set to a value corresponding to "not correct".

11. The method according to claim 8, wherein, at an end of the predetermined reception time period, the first information portions of the buffered information items ($Inf_1$ to $Inf_n$) of the result memory are set to a value corresponding to "correct".

12. The method according to claim 1, wherein the watchdog is additionally provided with the second evaluation portion of the watchdog (VAL) for evaluation of the n buffered information items ($Inf_1$ to $Inf_n$) of the result memory, at least one further result memory having m result memory cells for storage of m further buffered information items ($Inf_{1B}$ to $Inf_{mB}$), wherein m is a positive integral number larger than 1, and a further evaluation portion of the watchdog ($VAL_B$) for evaluation of the further buffered information items ($Inf_{1B}$ to $Inf_{mB}$), wherein the m further buffered information items ($Inf_{1B}$ to $Inf_{mB}$) are continuously numbered from 1 to m, wherein each of the m further buffered information items ($Inf_{1B}$ to $Inf_{mB}$) is assigned to a result memory position of m result memory positions of the further result memory which are continuously numbered from 1 to m, wherein each of the m further buffered information items ($Inf_{1B}$ to $Inf_{mB}$) comprises at least a respective first information portion, wherein, in the further result memory, upon each reception of an answer of the processor, the j-th further buffered information item ($Inf_{jB}$) at the j-th result memory position in a result memory cell of the further result memory is deleted from the further result memory, wherein $1 \leq j \leq m$, each of the remaining [m−1] buffered information items ($Inf_{kB}$), wherein $1 \leq j \leq m$ and $k \neq j$, is shifted from the respective k-th result memory position ($p_k$, with $1 \leq j \leq m$ and $k \neq j$) of the further result memory to another result memory position ($p_{k'}$, with $k' \neq k$ and $1 \leq k' \leq m$) of the further result memory, and at least as a new first portion of the j'-th further buffered information item ($Inf_{j'B}$) or as a new j'-th further buffered information item ($Inf_{jB}$) at the result memory position of the further result memory into which none of the remaining [m−1] buffered further information items has been shifted, there is used at least a result of the further evaluation of the second evaluation portion of the watchdog (VAL), and wherein the further evaluation portion of the watchdog ($VAL_B$), depending on further buffered information items of the m further buffered information items ($Inf_{1B}$ to $Inf_{mB}$) of the further result memory, generates the control signal adapted to change the state of the processor, or generates the signal from which the control signal is derived.

13. The method according to claim 1, wherein the watchdog is additionally provided with the second evaluation portion of the watchdog (VAL) for evaluation of the n buffered information items ($Inf_1$ to $Inf_n$) of the result memory, at least one further result memory having m result memory cells for storage of m further to-be-buffered information items ($Inf_{1B}$ to $Inf_{mB}$), wherein m is a positive integral number larger than 1, and a further evaluation portion of the watchdog ($VAL_B$) for evaluation of the further buffered information items ($Inf_{1B}$ to $Inf_{mB}$), wherein the m further buffered information items ($Inf_{1B}$ to $Inf_{mB}$) are continuously numbered from 1 to m, wherein each of the m further buffered information items ($Inf_{1B}$ to $Inf_{mB}$) is assigned to a respective result memory position of m result memory positions of the further result memory which are continuously numbered from 1 to m, wherein each of the m further buffered information items ($Inf_{1B}$ to $Inf_{mB}$) comprises at least a respective first information portion, wherein, in the further result memory, after an end of a predetermined number q of successive reception time periods, the j-th further buffered information item ($Inf_{jB}$) at the j-th result memory position in a respective result memory cell of the further result memory is deleted from the further result memory, wherein $1 \leq j \leq m$, each of the [m−1] buffered information items ($Inf_{mB}$), wherein $1 \leq j \leq m$ and $k \neq j$, is shifted from a respective k-th result memory position ($p_k$, with $1 \leq j \leq m$ and $k \neq j$) of the further result memory to a respective other result memory position ($p_{k'}$, with $k' \neq k$ and $1 \leq k' \leq m$) of the further result memory, and at least as a new first portion of the j'-th further buffered information item ($Inf_{j'B}$) or as a new j'-th further buffered information item ($Inf_{jB}$) at the result memory position of the further result memory into which none of the remaining [m−1] buffered further information items has been shifted, there is used, depending on an answer or answers received after the end of the predetermined number q of successive reception time periods, at least a result of the further evaluation of the second evaluation portion of the watchdog (VAL), and wherein the further evaluation portion of the watchdog ($VAL_B$), depending on further buffered information items of the m further buffered information items ($Inf_{1B}$ to $Inf_{mB}$) of the further result memory, generate the control signal adapted to change the state of the processor.

14. The method according to claim 13, wherein, after the end of the predetermined number q of successive reception time periods, the first information portions of the buffered information items ($Inf_1$ to $Inf_n$) of the result memory are set to a value corresponding to "not correct".

15. The method according to claim 13, wherein, after the end of the predetermined number q of successive reception time periods, the first information portions of the buffered information items ($Inf_1$ to $Inf_n$) of the result memory are set to a value corresponding to "correct".

16. The method according to claim 1, wherein the watchdog comprises, as the result memory or, if provided, as a further result memory, a shift register and respectively a further shift register.

17. A method for monitoring a processor by a watchdog comprising a clock generator, a result memory having n result memory cells, wherein n is a positive integral number larger than 1, a first stimulating portion of the watchdog (QSTM) for transmission of messages from the watchdog to the processor, a first evaluation portion of the watchdog (AVAL) for evaluation of answers of the processor which are transmitted by the processor to the watchdog in response to the messages from the watchdog, and comprising a second evaluation portion of the watchdog (VAL) for evaluation of buffered information items ($Inf_1$ to $Inf_n$) of the result memory, wherein, in the method n information items ($Inf_1$ to $Inf_n$) are buffered into the n result memory cells of the result memory, wherein the n buffered information items ($Inf_1$ to $Inf_n$) are continuously numbered from 1 to n, wherein each of the n buffered information items ($Inf_1$ to $Inf_n$) is assigned to a respective result memory position of n result memory positions which are continuously numbered from 1 to n, and wherein each of the n buffered information items ($Inf_1$ to $Inf_n$) comprises at least one first information portion, the watchdog is operative to transmit messages to the processor that can pertain to the processor itself and to further system components, the processor is operative to transmit answers to the watchdog depending on the messages, the first evaluation portion of the watchdog is operative to assess each of the answers of the processor as "correct" or "not correct", wherein a respective answer is "correct"

if a content of the respective answer coincides with at least one possible expected content, and if the answer is received by the watchdog within a predetermined reception time period, and wherein the respective answer is "not correct"
if the content of the respective answer does not coincide with at least one possible expected content, or
if the respective answer is not received by the watchdog within the predetermined reception time period, and in the result memory, after an end of the predetermined reception time period or after a respective end of each predetermined reception time period or after an end of a plurality of predetermined reception time periods,
a buffered information item (e.g. $Inf_j$) at a j-th result memory position in a corresponding result memory cell of the result memory is deleted from the result memory, wherein $1 \leq j \leq n$,
the remaining [n−1] buffered information items ($Inf_k$), wherein $1 \leq j \leq n$ and $k \neq j$, are shifted from the respective k-th result memory position ($p_k$, with $1 \leq j \leq m$ and $k \neq j$) to another result memory position ($p_{k'}$, with $k' \neq k$ and $1 \leq k' \leq n$), and
at least as a new first portion of the j'-th buffered information item (e.g. $Inf_{j'}$) at a result memory position into which none of the remaining [n−1] buffered information items ($Inf_1$ to $Inf_n$) has been shifted, there is used, in correspondence to a value for "correct" or for "not correct", at least a result of the evaluation of the respective answer or the respective answers of the processor received before the end of the reception time period or periods,
wherein the second evaluation portion of the watchdog (VAL), if buffered information items of the n buffered information items ($Inf_1$ to $Inf_n$) in the result memory cells of the result memory comprise an identifiable predetermined pattern, generates at least one control signal adapted to change a state of the processor, or generates a signal from which the control signal is derived.

18. The method according to claim 17, wherein the processor includes to-be-monitored systems components.

19. The method according to claim 17, wherein
to a first expected answer, there is assigned, by the first evaluation portion of the watchdog (AVAL), a predetermined first reception time period as the predetermined reception time period for the first answer, and
to a second expected answer, there is assigned, by the first evaluation portion of the watchdog (AVAL), a predetermined second reception time period as the predetermined time period for the second answer,
wherein the predetermined first reception time period and the predetermined second reception lime period are different and overlap each other or do not overlap each other,
wherein the predetermined first reception time period has no effect for the evaluation of the second answer, and
wherein the predetermined second reception time period (b2) has no effect for the evaluation of the first answer.

20. The method according to claim 17, wherein
the first evaluation portion of the watchdog (AVAL) is operative to assess the answer of the processor as "correct" or "not correct",
wherein an answer is "correct" if it additionally applies
that, within the predetermined reception time period, a number of answers received by the watchdog does not exceed, due to the respective received answer, a predetermined maximal number of to-be-received answers or, at the end of the predetermined reception time period, does not fall short of a predetermined minimal number of the to-be-received answers, and
wherein an answer is "not correct" if it alternatively applies
that, within the respective predetermined reception time period, the number of the answers received by the watchdog exceeds the predetermined maximal number of to-be-received answers or falls short of the predetermined minimal number of to-be-received answers.

21. The method according to claim 17, wherein the evaluation of the answer of the processor by the first evaluation portion of the watchdog (AVAL) is additionally depending on at least one buffered information item ($Inf_j$) of the buffered information items ($Inf_1$ to $Inf_n$) of the result memory.

22. The method according to claim 17, wherein the evaluation of the answer of the processor by the first evaluation portion of the watchdog (AVAL) is additionally depending on the buffered information items ($Inf_1$ to $Inf_n$) of the result memory.

23. The method according to claim 17, wherein the processor comprises the second evaluation portion of the watchdog (VAL), wherein the second evaluation portion of the watchdog (VAL) is operative, depending on at least one buffered information item ($Inf_j$) of the buffered information items ($Inf_1$ to $Inf_n$) of the result memory, to additionally generate at least one further evaluation, and wherein at least one buffered information item ($Inf_j$) of the buffered information items ($Inf_1$ to $Inf_n$) of the result memory comprises a to-be-buffered further evaluation of the second evaluation portion of the watchdog (VAL) as a further information portion in addition to the first information portion.

24. The method according to claim 17, wherein the watchdog is additionally provided with
the second evaluation portion of the watchdog (VAL) for evaluation of at least two of the n buffered information items ($Inf_1$ to $Inf_n$) of the result memory,
at least one further result memory having m result memory cells for storage of m further buffered information items ($Inf_{1B}$ to $Inf_{mB}$), wherein m is a positive integral number larger than 1, and
a further evaluation portion of the watchdog ($VAL_B$) for evaluation of the further m buffered information items ($Inf_m$ to $Inf_{mB}$),
wherein the m further buffered information items ($Inf_{1B}$ to $Inf_n$) are continuously numbered from 1 to m,
wherein each of the m further buffered information items ($Inf_{1B}$ to $Inf_{mB}$) is assigned to a respective result memory position of m result memory positions of the further result memory which are continuously numbered from 1 to m,
wherein each of the m further buffered information items ($Inf_{1B}$ to $Inf_{mB}$) comprises at least one respective information portion,
wherein, in the further result memory, upon each reception of an answer of the processor,
the j-th further buffered information item ($Inf_{jB}$) at the j-th result memory position in a corresponding result memory cell of the further result memory is deleted from the further result memory, wherein $1 \leq j \leq m$,
each of remaining [m−1] buffered information items ($Inf_{kB}$), wherein $1 \leq j \leq m$ and $k \neq j$, is shifted from a respective k-th result memory position ($p_k$, with $1 \leq j \leq m$ and $k \neq j$) of the further result memory to a respective other result memory position ($p_{k'}$, with $k' \neq k$ and $1 \leq k' \leq m$) of the further result memory, and at least as a new first portion of the j'-th further buffered information item ($Inf_{jB}$) or as a new j'-th further buffered information item ($Inf_{j'B}$) at a result memory position of the further result memory into which none of the remaining [m−1] buffered further information items has been shifted, there is used at least a result of the further evaluation of the second evaluation portion of the watchdog (VAL), and wherein the further evaluation portion of the watchdog ($VAL_B$), depending on further buffered information items of the m further buffered information items ($Inf_{1B}$ to $Inf_{mB}$) of the further result memory, generates the at least one control signal adapted to change the state of the processor, or generates the signal from which such a control signal is derived.

25. The method according to claim 17, wherein the second evaluation portion of the watchdog (VAL) is operative, depending on the occurrence of predetermined patterns among at least respectively one information portion of at least two different buffered information items ($Inf_1$, $Inf_n$), with $1 \leq j \leq n$ and $1 \leq k \leq n$ and $k \neq k$) of the buffered information items ($Inf_1$ to $Inf_n$) of the result memory, to generate at least one further evaluation.

26. The method according to claim 17, wherein, at an end of the predetermined reception time period, the first information portions of the buffered information items ($Inf_1$ to $Inf_n$) of the result memory are set to a value corresponding to "not correct".

27. The method according to claim 17, wherein, at an end of the predetermined reception time period, the first information portions of the buffered information items ($Inf_1$ to $Inf_n$) of the result memory are set to a value corresponding to "correct".

28. The method according to claim 17, wherein the watchdog is additionally provided with
the second evaluation portion of the watchdog (VAL) for evaluation of the n buffered information items ($Inf_1$ to $Inf_n$) of the result memory,
at least one further result memory having m result memory cells for storage of m further to-be-buffered information items ($Inf_{1B}$ to $Inf_{mB}$), wherein m is a positive integral number larger than 1, and
a further evaluation portion of the watchdog ($VAL_B$) for evaluation of the further buffered information items ($Inf_{1B}$ to $Inf_{mB}$),
wherein the m further buffered information items ($Inf_{1B}$ to $Inf_{mB}$) are continuously numbered from 1 to m,
wherein each of the m further buffered information items ($Inf_{1B}$ to $Inf_{mB}$) is assigned to a result memory position of m result memory positions of the further result memory which are continuously numbered from 1 to m,
wherein each of the m further buffered information items ($Inf_{1B}$ to $Inf_{mB}$) comprises at least a respective information portion,
wherein, in the further result memory, after the end of the predetermined reception time period or after the respective end of each reception time period or after an end of a predetermined number q of successive reception time periods,
the j-th further buffered information item ($Inf_{jB}$) at the j-th result memory position in a result memory cell of the further result memory is deleted from the further result memory, wherein $1 \leq j \leq m$,
each of the remaining [m−1] buffered information items ($Inf_{kB}$), wherein $1 \leq j \leq m$ and $k \neq j$, is shifted from a respective k-th result memory position ($p_k$, with $1 \leq j \leq m$ and $k \neq j$) of the further result memory to a respective other result memory position ($p_{k'}$, with $k' \neq k$ and $1 \leq k' \leq m$) of the further result memory, and
at least as a new first portion of the j'-th further buffered information item ($Inf_{jB}$) or as a new j'-th further buffered information item ($Inf_{j'B}$) at the result memory position of the further result memory into which none of the remaining [m−1] buffered further information items has been shifted, there is used at least a result of the further evaluation of the second evaluation portion of the watchdog (VAL) depending on an answer or the answers received up to an end of the predetermined reception time periods, and
wherein the further evaluation portion of the watchdog ($VAL_B$), depending on further buffered information items of the m further buffered information items ($Inf_{1B}$ to $Inf_{mB}$) of the further result memory, generates the control signal adapted to change the state of the processor.

29. The method according to claim 28, wherein, after the end of the number q of successive reception time periods, the first information portions of the buffered information items ($Inf_1$ to $Inf_n$) of the result memory are set to a value corresponding to "not correct".

30. The method according to claim 28, wherein, after the end of the number q of successive reception time periods, the first information portions of the buffered information items ($Inf_1$ to $Inf_n$) of the result memory are set to a value corresponding to "correct".

31. The method according to claim 28, wherein the watchdog comprises, as the result memory or, if provided, as a further result memory, a shift register and respectively a further shift register.

32. A method for monitoring a processor by a watchdog comprising a clock generator, a result memory having n result memory cells, wherein n is a positive integral number larger than 1, a first stimulating portion of the watchdog (QSTM) for transmission of messages from the watchdog to the processor, a first evaluation portion of the watchdog (AVAL) for evaluation of answers of the processor which are transmitted by the processor to the watchdog in response to the messages from the watchdog, and comprising a second evaluation portion of the watchdog (VAL) for evaluation of buffered information items ($Inf_1$ to $Inf_n$) of the result memory, comprising:
presetting, by the clock generator, a predetermined reception time period for an answer (ANS) of the processor to the watchdog;
transmitting, from the watchdog to the processor, one or a plurality of messages (MSG) with respective contents which can pertain to the processor and/or to further system components,
responding to the message in form of the answer to the watchdog, performed by the processor depending on at least a content of one of the messages,
evaluating the answer of the processor to the watchdog as "correct" or "not correct", performed by the watchdog, for generating an evaluation result,
wherein the answer is "correct"
if a content of the answer coincides with at least one possible expected content, and
if the answer is received by the watchdog within the predetermined reception time period (b), and
wherein an answer is "not correct"
if the content of the answer does not coincide with at least one possible expected content, or if the answer is not received by the watchdog within the predetermined reception time period, changing a content of a result memory with n buffered information items ($Inf_1$ to $Inf_n$), wherein each of the n buffered information items ($Inf_1$ to $Inf_n$) comprises at least one respective first information portion and is assigned to a respective result memory position, wherein n is an integer larger than 1, wherein the changing is performed temporally after reception of the respective answer by the watchdog or temporally after an end of the predetermined reception time period by deletion of at least one buffered information item ($Inf_k$) of the n information items ($Inf_1$ to $Inf_n$), and changing at least one logical result memory position of the at least one buffered information item ($Inf_j$) of the n buffered information items ($Inf_1$ to $Inf_n$) in a result memory and use of a result of the evaluation of the at least one received answer as a new first information portion of a new buffered information item ($Inf_j$) in the result memory, evaluation of the buffered information items ($Inf_1$ to $Inf_n$) of the result memory (ES) by the second evaluation portion of the watchdog (VAL) by generating an evaluation result depending on identifiable predetermined patterns from the buffered information items ($Inf_1$ to $Inf_n$) of the n buffered information items ($Inf_1$ to $Inf_n$), and upon identification of a predetermined pattern, generation of at least one control signal adapted to change a state of the processor, or generation of a signal from which the control signal is derived.

33. The method according to claim 32, comprising:

fixing a first predetermined reception time period depending on a first expected answer for use as the predetermined reception time period in the evaluation of a first answer of the processor performed by the watchdog, and fixing a second predetermined reception time period depending on a second expected answer for use as the predetermined reception time period in the evaluation of the second answer of the processor performed by the watchdog, wherein the predetermined first reception time period and the predetermined second reception time period overlap each other or do not overlap each other, and wherein the first predetermined reception time period has no effect for the evaluation of the second answer, and the second predetermined reception time period has no effect for the evaluation of the first answer.

34. The method according to claim 32, further comprising:

evaluation of the answer of the processor as "correct" or "not correct", wherein the answer is "correct" only if it additionally applies that, within the respective predetermined reception time period, also a number of answers received by the watchdog does not exceed, due to the respective received answer, a predetermined maximal number of to-be-received answers or additionally also at an end of the predetermined reception time period, the number of answers does not fall short of a predetermined minimal number of to-be-received answers, and wherein an answer is "not correct" if it alternatively applies that, within the respective predetermined reception time period, the number of the answers received by the watchdog exceeds, due to the respective received answer, the predetermined maximal number of to-be-received answers or, the number of the answers, at the end of the predetermined reception time period, falls short of the predetermined minimal number of to-be-received answers.

35. The method according to claim 32, further comprising:

evaluation of the answer of the processor in additional dependence on at least one information portion of a buffered information item ($Inf_j$) of the buffered information items ($Inf_1$ to $Inf_n$) of the result memory in addition to the dependence of this evaluation of the answer of the processor to the watchdog.

36. The method according to claim 32, further comprising:

evaluation of the answer of the processor in additional dependence on the buffered information items ($Inf_1$ to $Inf_n$) of the result memory in addition to the dependence of the evaluation of the answer of the processor to the watchdog.

37. The method according to claim 32, further comprising:

additional generation of at least one further evaluation by the second evaluation portion of the watchdog (VAL) depending on at least one buffered information item ($Inf_j$) of the buffered information items ($Inf_1$ to $Inf_n$) of the result memory, and storing the further evaluation as a further information portion of a buffered information item ($Inf_j$) of the buffered information items ($Inf_1$ to $Inf_n$) of the result memory.

38. The method according to claim 32, further comprising:

generating a second further evaluation depending on an occurrence of predetermined patterns among at least respectively a portion of at least two different buffered information items ($Inf_j$, $Inf_k$, with $1 \leq j \leq n$ and $1 \leq k \leq n$ and $k \neq j$) of the buffered information items ($Inf_1$ to $Inf_n$) of the result memory.

39. The method according to claim 32, further comprising:

at an end of the predetermined reception time period, setting all of the first information portions of the buffered information items ($Inf_1$ to $Inf_n$) of the result memory to a value corresponding to "not correct" or to a value corresponding to "correct".

40. The method according to claim 32, further comprising:

evaluation of the buffered information items ($Inf_1$ to $Inf_n$) of the results memory for setting a further evaluation result, and changing a content of a second result memory with m further buffered information items ($Inf_{mB}$ to $Inf_{mB}$) with a first information portion and optionally further information portions, wherein m is an integer larger than 1, and with respectively one result memory position, temporally after reception of a respective answer by the watchdog or temporally after an end of the predetermined reception time period by deletion of at least one further buffered information item ($Inf_k$) of the m further buffered information items ($Inf_{1_B}$ to $Inf_{mB}$) in the further result memory, and changing at least one logical result memory position of at least one buffered information item ($Inf_{jB}$) of m further buffered information items ($Inf_{1_B}$ to $Inf_{mB}$) in the further result memory and use of the further evaluation result as a new first information portion of a new further buffered information item ($Inf_1$) in the further result memory, further evaluation of at least two of the m further buffered information items ($Inf_{mB}$ to $Inf_{mB}$), and generation of the at least one control signal and/or at least one further control signal adapted to change the state of the processor, depending on the result of the further evaluation.

\* \* \* \* \*

UNITED STATES PATENT AND TRADEMARK OFFICE
CERTIFICATE OF CORRECTION

PATENT NO. : 10,678,620 B2  
APPLICATION NO. : 16/332278  
DATED : June 9, 2020  
INVENTOR(S) : Andre Sudhaus et al.

Page 1 of 1

It is certified that error appears in the above-identified patent and that said Letters Patent is hereby corrected as shown below:

In the Claims

Column 61, Line 21, replace "item (Inf jB) at" with — item (Inf j'B) at —.

Column 61, Line 63, replace "buffered information items (Inf mB)," with — buffered information items (Inf kB), —.

Column 63, Line 50, replace "second reception lime period are" with — second reception time period are —.

Column 64, Line 46, replace "Inf n) are continuously numbered" with — Inf mB) are continuously numbered —.

Column 65, Line 2, replace "information item (Inf jB) or as a new" with — information item (Inf j'B) or as a new —.

Column 68, Line 61, replace "buffered information items (Inf mB to Inf mB)" with — buffered information items (Inf 1B to Inf mB) —.

Column 69, Line 16, replace "information items (Inf mB to Inf mB), and" with — information items (Inf 1B to Inf mB), and —.

Signed and Sealed this  
Twentieth Day of October, 2020

Andrei Iancu  
*Director of the United States Patent and Trademark Office*